US008875969B2

(12) United States Patent
Pedicini et al.

(10) Patent No.: US 8,875,969 B2
(45) Date of Patent: Nov. 4, 2014

(54) FASTENER DRIVING APPARATUS

(75) Inventors: Christopher Pedicini, Nashville, TN (US); John Witzigreuter, Canton, GA (US)

(73) Assignee: Tricord Solutions, Inc., Nashville, TN (US)

( * ) Notice: Subject to any disclaimer, the term of this patent is extended or adjusted under 35 U.S.C. 154(b) by 1622 days.

(21) Appl. No.: 11/774,943

(22) Filed: Jul. 9, 2007

(65) Prior Publication Data

US 2008/0190988 A1 Aug. 14, 2008

Related U.S. Application Data

(60) Provisional application No. 60/906,120, filed on Mar. 9, 2007, provisional application No. 60/900,480, filed on Feb. 9, 2007.

(51) Int. Cl.
*B25C 1/04* (2006.01)
*F16K 15/02* (2006.01)
*B25C 1/06* (2006.01)

(52) U.S. Cl.
CPC . *B25C 1/04* (2013.01); *F16K 15/02* (2013.01); *B25C 1/06* (2013.01)
USPC .................. 227/130; 227/8; 227/10; 227/131

(58) Field of Classification Search
CPC .................................. B25C 1/04; F16K 15/02
USPC ........ 227/8, 10, 130, 131; 173/2, 11, 39, 207, 173/114, 48, 200; 123/46 H, 46 A; 417/520
See application file for complete search history.

(56) References Cited

U.S. PATENT DOCUMENTS

| | | | | |
|---|---|---|---|---|
| 787,960 | A | * | 4/1905 | Temple ........................... 60/542 |
| 974,267 | A | * | 11/1910 | Hennessy et al. ............. 173/201 |
| 1,071,387 | A | * | 8/1913 | Behr .............................. 173/201 |
| 1,829,609 | A | * | 10/1931 | Robinson ...................... 173/201 |
| 2,751,146 | A | * | 6/1956 | Tomlinson .................... 417/255 |
| 3,172,121 | A | | 3/1965 | Doyle et al. |
| 3,563,273 | A | * | 2/1971 | Mills ........................ 137/625.69 |
| 3,568,780 | A | * | 3/1971 | Matsuo ......................... 173/201 |
| 3,589,588 | A | | 6/1971 | Vasku |
| 3,747,633 | A | * | 7/1973 | Garrett ........................ 137/489.3 |
| 3,771,710 | A | * | 11/1973 | Perkins et al. ................. 227/130 |
| 3,821,992 | A | * | 7/1974 | Matsuo ......................... 173/200 |
| 3,878,902 | A | * | 4/1975 | Matsuo ........................... 173/14 |
| 3,924,691 | A | * | 12/1975 | Brannstrom et al. ........... 173/48 |
| 4,042,036 | A | | 8/1977 | Smith et al. |
| 4,215,808 | A | | 8/1980 | Sollberger et al. |

(Continued)

*Primary Examiner* — Michelle Lopez
(74) *Attorney, Agent, or Firm* — Aldenbaum Schloff and Bloom PLLC; Jay Schloff

(57) ABSTRACT

A fastener driving apparatus for driving fasteners into a substrate. The fastener driving apparatus is a combination of a motor driven linear motion converter; a compression cylinder; an expansion cylinder and a valve arrangement. The linear motion converter converts a rotational motion of a motor to a linear motion of a compression piston within the compression cylinder causing a gas within the compression cylinder to be compressed. The compressed gas is communicated to the expansion cylinder through the valve arrangement wherein the compressed gas expands causing an anvil coupled to an expansion piston within the expansion cylinder to move axially. The axial movement of the anvil causes a fastener to be driven into the substrate. The fastener driving apparatus is an ergonomically designed portable hand held tool providing comfort to a user, meeting safety standards and performance efficiency requirements.

27 Claims, 30 Drawing Sheets

(56) References Cited

U.S. PATENT DOCUMENTS

| | | |
|---|---|---|
| 4,688,645 A * | 8/1987 | Muller .................... 173/200 |
| 5,320,270 A | 6/1994 | Crutcher |
| 5,503,319 A | 4/1996 | Lai |
| 5,511,715 A | 4/1996 | Crutcher et al. |
| 5,720,423 A | 2/1998 | Kondo et al. |
| 5,836,400 A * | 11/1998 | Tupper et al. ............... 173/11 |
| 6,755,336 B2 | 6/2004 | Harper et al. |
| 6,755,630 B2 * | 6/2004 | Kim et al. .................. 417/501 |
| 6,769,593 B2 * | 8/2004 | Pedicini et al. ........... 227/131 |
| 6,782,853 B2 * | 8/2004 | Kanamaru et al. ......... 123/90.15 |
| 6,938,811 B2 | 9/2005 | Ehmig et al. |
| 7,182,062 B2 * | 2/2007 | Beer et al. .................. 123/305 |
| 7,424,870 B2 * | 9/2008 | Odoni et al. ............. 123/46 SC |
| 7,506,694 B2 * | 3/2009 | Stirm et al. ................. 173/178 |
| 7,520,252 B2 * | 4/2009 | Toulouse et al. ........... 123/46 H |
| 7,594,599 B2 * | 9/2009 | Webb ......................... 227/10 |
| 7,703,424 B2 * | 4/2010 | Nakamura et al. ......... 123/90.16 |
| 2002/0144498 A1 * | 10/2002 | Adams ........................ 60/39.6 |
| 2002/158102 A1 | 10/2002 | Patton et al. |
| 2007/0045377 A1 | 3/2007 | Towfighi |
| 2009/0056693 A1 * | 3/2009 | Pedicini et al. ............... 124/73 |

\* cited by examiner

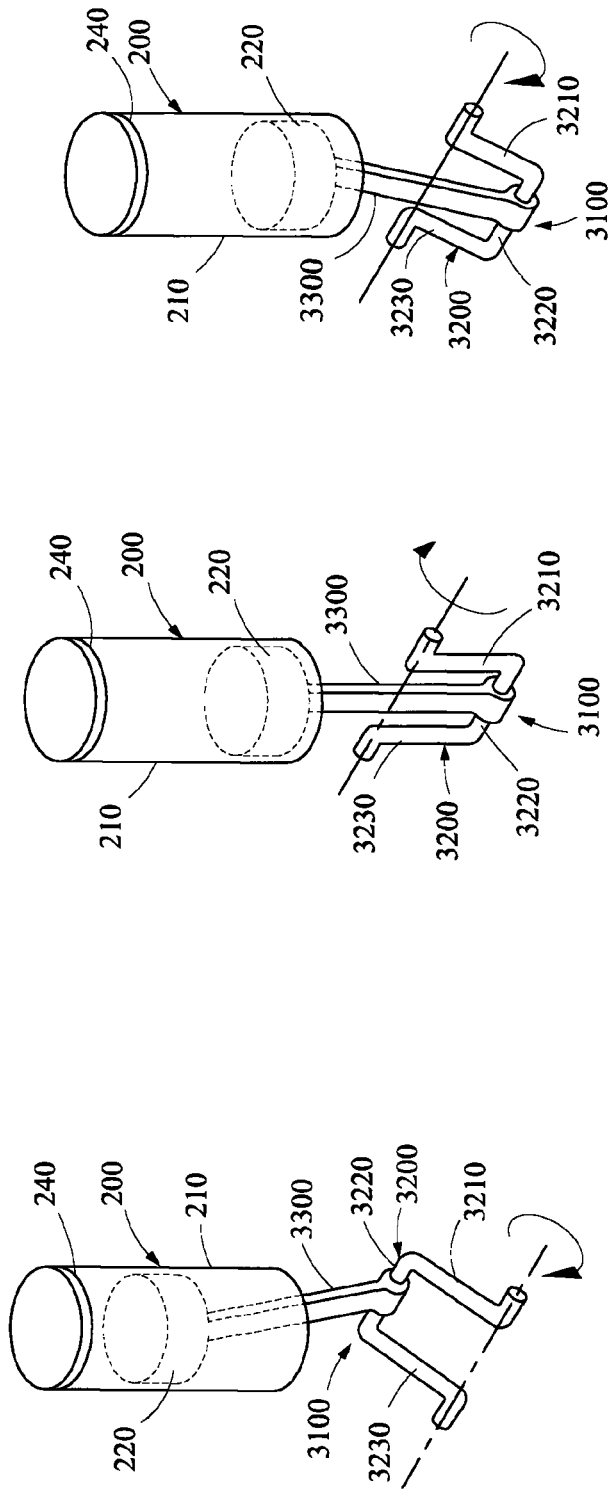

FASTENER DRIVING APPARATUS

CROSS REFERENCE TO RELATED APPLICATIONS

The present invention claims priority under 35 United States Code, Section 119 on the provisional application No. 60/906,120 filed on Mar. 9, 2007 and the provisional application No. 60/900,480 filed on Feb. 9, 2007.

FIELD OF THE INVENTION

The present invention relates to fastening mechanisms, and, more specifically, to fastener driving systems requiring operation as a portable hand tool.

BACKGROUND OF THE INVENTION

Fastener driving systems (such as fastener drive tools and nail guns) are common in the construction industry. Fastener driving systems have many advantages over hammers, such as the ability to drive a fastener instantly without splitting wood, and consistently setting a nail head below a substrate. Fastener driving systems are usually driven by electromagnet (s), compressed air or a small explosive charge. These power assisted means of driving fasteners can be either in the form of finishing nail systems used in baseboards or crown molding in house and household projects, or alternatively, in the form of common nail systems used to make walls or hang sheathing onto same. Such fastener driving systems may either be portable (i.e., not connected or tethered to an air compressor or wall outlet) or non-portable.

Various concepts and components are conceded and emphasized as attempts and develops over the years in the art of fastener driving systems and similar explosively actuated equipment. The most common fastener driving system uses a source of compressed air to actuate a cylinder to push the nail into a receiving member. For applications in which portability is not required, this is a very functional system and allows rapid delivery of fasteners for quick assembly. A disadvantage of such a fastener driving system is that the user is required to purchase an air compressor and associated air lines in order to use this system. A further disadvantage is the inconvenience of being tethered through an air hose to an air compressor.

To solve the problems of fastener driving systems actuated by compressed air, several types of portable nail guns operable by fuel cells have been developed. Typically, these guns have a cylinder in which a fuel is introduced along with oxygen from the air. The subsequent mixture is ignited with the resulting expansion of gases pushing the cylinder and thus driving the nail into the substrate. However, this design is complicated and is more expensive then a standard pneumatic nail gun. Such fuel cell driven units also have certain disadvantages: the chambering of an explosive mixture of fuel; the use of consumable fuel cartridges; a loud report; and the release of combustion products.

Another commercially available fastener driving system is nail guns using electrical energy to drive a stapler or wire brad. These units typically use a solenoid to drive the fastener or a ratcheting spring system. These units have limited application to short sized fasteners, are subjected to high reactionary forces on the user, and are limited in their repetition rate. The high reactionary force is a consequence of a comparatively long time it takes to drive the fastener into the substrate. Additionally, because of the use of mechanical springs or solenoids, the ability to drive larger fasteners or longer fasteners is severely restricted, thereby relegating these units to a small niche range of applications. Further, a disadvantage of the solenoid driven units is that the above-mentioned unit must be plugged into an electrical power source in order to have enough voltage to create the force needed to drive even short fasteners.

Yet another commercially available fastener driving system is a unit working on a flywheel mechanism and an associated clutch that interacts with an anvil for driving the fastener. This unit is capable of driving fasteners very quickly and in a variety of sizes. The primary drawback to such a unit is the large weight and size as compared to the pneumatic counterpart. Additionally, the drive mechanism is very complicated in configuration, thus requiring a high retail cost in comparison to the pneumatic nail gun.

Prior art teaches several other techniques of driving a nail or staple by different fastener driving systems. One of the techniques is based on a multiple impact design. In this design, a motor or other power source is connected to the impact anvil through either a lost motion coupling or other device. This allows the power source to make multiple impacts on the nail to drive it into the substrate. The disadvantage in this design is increased operator fatigue, as the actuation technique is a series of blows rather than a single drive motion. A further disadvantage is that the multiple impact design requires the use of an energy absorbing mechanism once the nail is seated, with such mechanism being needed to prevent the anvil from causing excessive damage to the substrate as it seats the fastener. Furthermore, the multiple impact designs are not efficient because of the constant motion reversal limiting the operator production speed.

A second technique includes the use of potential energy storage mechanisms in the form of a mechanical spring. In this technique, the spring is cocked (or activated) through an electric motor. Once the spring is sufficiently compressed, the energy is released from the spring into the anvil (or nail driving piece), thus pushing the nail into the substrate. There are several drawbacks existing to this technique. First, this technique comprises a complex system of compressing and controlling the spring and in order to store sufficient energy the spring has to be very heavy and bulky. Second, the spring suffers from fatigue, which gives the tool a very short life. Furthermore, metal springs have to move a significant amount of mass in order to decompress, which results low speed nail drivers that place a high reactionary force on a user.

U.S. Pat. No. 3,589,588 to Vasku, U.S. Pat. No. 5,503,319 to Lai, and U.S. Pat. No. 3,172,121 to R. H. Doyle, et al. are the examples of the use of potential energy storage mechanisms in the form of a mechanical spring. U.S. Pat. No. 4,215,808 to Sollberger discloses an improved design, which replaces the mechanical spring with an air spring, compressing air within a cylinder, and then releasing the compressed air by use of a gear drive.

Although some of the drawbacks of the above-mentioned technique using the potential energy storage mechanisms in the form of a mechanical spring were overcome by the use of air spring, the application of air spring is subject to other limitations. The primary drawback is the safety hazard in the event of anvil jamming on the downward stroke. If the fastener jams or buckles within the feeder and an operator tries to clear the jam, the operator may be subjected to the full force of the anvil, as the anvil is predisposed to the down position. Another disadvantage is the need to feed the fastener once the anvil clears the fastener on the backward stroke, which increases the time needed to operate the device and can result in jams and poor operations, especially with longer fasteners. A further disadvantage to the air spring results from the need to have the ratcheting mechanism as part of the anvil drive. This weight causes significant problems in controlling the fastener drive since the weight must be stopped at the end of the stroke. This added mass slows the fastener drive stroke and increases the reactionary force on the operator.

Additionally, because significant kinetic energy is contained within the air spring and piston assembly, the unit suffers from poor efficiency. This technique is also subject to a complicated drive system for coupling and uncoupling the air spring and ratchet from the drive train, which increases the production cost and reduces the system reliability.

U.S. Pat. No. 5,720,423 to Kondo again discloses an air spring which is compressed and then released to drive the nail. The drive or compression mechanism used in this technique is limited in stroke and thus is limited in the amount of energy which can be stored and introduced into the air stream. In order to get sufficient energy in the air stream to achieve good performance, use of a gas supply is provided which preloads the cylinder at a pressure higher then atmospheric pressure. Furthermore, the compression mechanism is bulky and complicated. Also, the timing of the motor is complicated by the small amount of time between the release of the piston and anvil assembly from the drive mechanism and its subsequent re-engagement. The anvil begins in the retracted position, which further complicates and increases the size of the drive mechanism. Furthermore, the method of activation by compressing the air to full energy and then releasing off the tip of the gear while under full load causes severe mechanism wear.

A third technique uses flywheels as energy storage means. The flywheels are used to launch a hammering anvil impacting the nail. The examples of this design are U.S. Pat. No. 4,042,036 to Smith et al., U.S. Pat. No. 5,511,715 to Crutcher et al. and U.S. Pat. No. 5,320,270 to Crutcher. The drawback of this technique is the problem of coupling the flywheel to the driving anvil. This technique includes the use of a friction clutching mechanism that is complicated, heavy and subject to wear. Further limitation of this approach is the difficulty in controlling the energy in the fastener driving system, as the mechanism requires enough energy to drive the fastener, but retains significant energy in the flywheel after the drive is complete, again increasing the technique complexity and size.

Accordingly, a need exists to provide an electric motor driven device for driving fasteners that is unencumbered by fuel cells or air hoses. What is also needed is a device providing a low reactionary feel and capable of driving full size fasteners, and that is simple in configuration, cost-effective and robust in operation. Further, what is needed is a device that is not fatiguing, is noiseless, portable, and non-hazardous to a user.

SUMMARY OF THE INVENTION

In view of the foregoing disadvantages inherent in the prior art, the general purpose of the present invention is to provide a fastener driving apparatus for driving fasteners into a substrate to include all the advantages of the prior art, and to overcome the drawbacks inherent therein.

In one aspect, the present invention provides a fastener driving apparatus incorporating a slider crank arrangement. The fastener driving apparatus comprises a power source; a motor electrically connected to the power source; a first cylinder; a slider crank arrangement driven by the motor; a second cylinder; and a valve arrangement operationally disposed between the first cylinder and the second cylinder. The first cylinder comprises a first piston reciprocally movable within the first cylinder. The first piston defines a gas chamber within the first cylinder and the gas chamber is capable of accommodating gas therein. The slider crank arrangement operationally coupled to the first piston and configured to cause the first piston to reciprocally move within the first cylinder.

The second cylinder comprises a cylinder guide, a second piston disposed within the cylinder guide. The second piston has a front face and a rear face, and an anvil coupled to the rear face of the second piston. The second piston is capable of linearly moving within the second cylinder thereby enabling the anvil to move in a driving direction. The valve arrangement defines a gas passageway for communicating the gas from the first cylinder to the second cylinder. The gas received within the gas chamber is compressed by the first piston in a single stroke of the slider crank arrangement in a manner such that the compressed gas is communicated into the second cylinder through the gas passageway of the valve arrangement. This causes the compressed gas to expand in the second cylinder, thereby causing the second piston to move linearly and enabling the anvil to drive a fastener into a substrate in the driving direction in the single stroke of the slider crank arrangement.

In another aspect, the present invention provides a fastener driving apparatus incorporating a rack and pinion arrangement. The fastener driving apparatus comprises a power source; a motor electrically connected to the power source; a first cylinder; a rack and pinion arrangement driven by the motor, a second cylinder; and a valve arrangement operationally disposed between the first cylinder and the second cylinder. The first cylinder comprises a first piston reciprocally movable within the first cylinder. The first piston defines a gas chamber within the first cylinder and the gas chamber is capable of accommodating gas therein. The rack and pinion arrangement is driven by the motor, the rack and pinion arrangement operationally coupled to the first piston and configured to cause the first piston to reciprocally move within the first cylinder.

The second cylinder comprises a cylinder guide, a second piston disposed within the cylinder guide. The second piston has a front face and a rear face, and an anvil coupled to the rear face of the second piston. The second piston is capable of linearly moving within the second cylinder thereby enabling the anvil to move in a driving direction. The valve arrangement defines a gas passageway for communicating the gas from the first cylinder to the second cylinder. The gas received within the gas chamber is compressed by the first piston in a single stroke of the rack and pinion arrangement in a manner, such that, the compressed gas is communicated into the second cylinder through the gas passageway of the valve arrangement. This causes the compressed gas to expand in the second cylinder, thereby causing the second piston to move linearly and enabling the anvil to drive a fastener into a substrate in the driving direction in the single stroke of the rack and pinion arrangement.

In yet another aspect, the present invention provides a valve arrangement for an electric motor driven fastener driving apparatus for communicating a gas from a first cylinder to a second cylinder of the fastener driving apparatus. The valve arrangement comprises a valve body having a central groove; a valve spool disposed within the central groove; at least one valve retainer configured to retain the valve spool in an initial closed position; a valve return spring disposed within the central groove and towards a rear end portion of the central groove; and a gas passageway configured from the central groove and continues to the second cylinder. The gas passageway configures a duct for communicating the gas from the gas chamber of the first cylinder to the second cylinder.

The valve spool comprises a front face portion, a rear face portion, a primary body portion, a secondary body portion gradually extending from the primary body portion in a manner, such that, the secondary body portion has a diameter less than a diameter of the primary body portion thereby configuring a chamfered portion there between, and a valve spool stem extending outwardly from the front face portion. The valve arrangement is disposed between the first cylinder and the second cylinder. The gas is compressed by a first piston within the first cylinder to a compression ratio of approximately 8:1. Such a compression causes the valve spool to snap open to an open position against a pressure applied by the valve retainer and the valve return spring in less than or equal to about 20 milliseconds in a manner such that the compressed gas from the first cylinder is communicated through the gas passageway to the second cylinder. Upon communicating the compressed gas to the second cylinder, a restoration pressure applied by the valve return spring to exceed the pressure of the compressed gas in the first cylinder and enable the valve return spring to restore the valve spool to the initial closed position.

In yet another aspect, the present invention provides a fastener driving apparatus capable of driving larger fasteners. The fastener driving apparatus comprises a power source; a motor electrically connected to the power source; a first cylinder; a slider crank arrangement driven by the motor; a second cylinder; and a valve arrangement operationally disposed between the first cylinder and the second cylinder. The first cylinder comprises a first piston reciprocally movable within the first cylinder. The first piston defines a gas chamber within the first cylinder, the gas chamber has a separator that divides the gas chamber into a primary gas chamber and a secondary gas chamber. The primary gas chamber and the secondary gas chamber are capable of accommodating gas therein. The slider crank mechanism operationally coupled to the first piston and configured to cause the first piston to reciprocally move within the first cylinder.

The second cylinder comprises a cylinder guide, a second piston disposed within the cylinder guide, the second piston having a front face and a rear face, and an anvil coupled to the rear face of the second piston. The second piston is capable of linearly moving within the second cylinder thereby enabling the anvil to move in a driving direction. The valve arrangement defines a gas passageway for communicating the gas from the first cylinder to the second cylinder. The gas received within the primary gas chamber is compressed by the first piston in multiple strokes of the slider crank arrangement in a manner such that the compressed gas is communicated into the secondary gas chamber in less than or equal to about 250 milliseconds and with a compression exponent greater than or equal to about 1.05. For every n revolutions of the slider crank arrangement, the valve arrangement is caused to open once in less than or equal to about 250 milliseconds, thereby causing the compressed gas in the secondary gas chamber to be communicated to the second cylinder through the gas passageway. This causes the compressed gas to expand in the second cylinder thereby causing the second piston to move linearly and enabling the anvil to drive a fastener into a substrate in the driving direction.

In yet another embodiment, the present invention provides a more compact and ergonomic fastener driving apparatus incorporating a crankshaft and connecting rod arrangement. The fastener driving apparatus comprises a power source; a motor electrically connected to the power source; a first cylinder; a crankshaft and connecting rod arrangement driven by the motor, a second cylinder; and a valve arrangement. The first cylinder is aligned in parallel to the second cylinder with the valve arrangement operationally disposed over the first cylinder and the second cylinder. The first cylinder comprises a first piston reciprocally movable within the first cylinder. The first piston defines a gas chamber within the first cylinder and the gas chamber is capable of accommodating gas therein. The crankshaft and connecting rod arrangement is driven by the motor, the crankshaft and connecting rod arrangement operationally coupled to the first piston and configured to cause the first piston to reciprocally move within the first cylinder.

The second cylinder comprises a cylinder guide, a second piston disposed within the cylinder guide. The second piston has a front face and a rear face, and an anvil coupled to the rear face of the second piston. The second piston is capable of linearly moving within the second cylinder thereby enabling the anvil to move in a driving direction. The valve arrangement defines a gas passageway for communicating the gas from the first cylinder to the second cylinder. The gas received within the gas chamber is compressed by the first piston in a single stroke of the crankshaft and connecting rod arrangement in a manner such that the compressed gas is communicated into the second cylinder through the gas passageway of the valve arrangement. This causes the compressed gas to expand in the second cylinder, thereby causing the second piston to move linearly and enabling the anvil to drive a fastener into a substrate in the driving direction in the single stroke of the crankshaft and connecting rod arrangement.

These together with other aspects of the present invention, along with the various features of novelty that characterize the invention, are pointed out with particularity in the claims annexed hereto and form a part of this disclosure. For a better understanding of the invention, its operating advantages, and the specific objects attained by its uses, reference should be made to the accompanying drawings and descriptive matter in which there are illustrated exemplary embodiments of the present invention.

BRIEF DESCRIPTION OF THE DRAWING FIGURES

The advantages and features of the present invention will become better understood with reference to the following detailed description and claims taken in conjunction with the accompanying drawings, wherein like elements are identified with like symbols, and in which:

FIG. 1 is a longitudinal cross-sectional view of the fastener driving apparatus 1000, incorporating a slider crank arrangement 100 illustrating a first piston 220 of a first cylinder 200 moving from a first position towards a second position and intake of gas into the first cylinder 200, according to an exemplary embodiment of the present invention;

Figure 7:
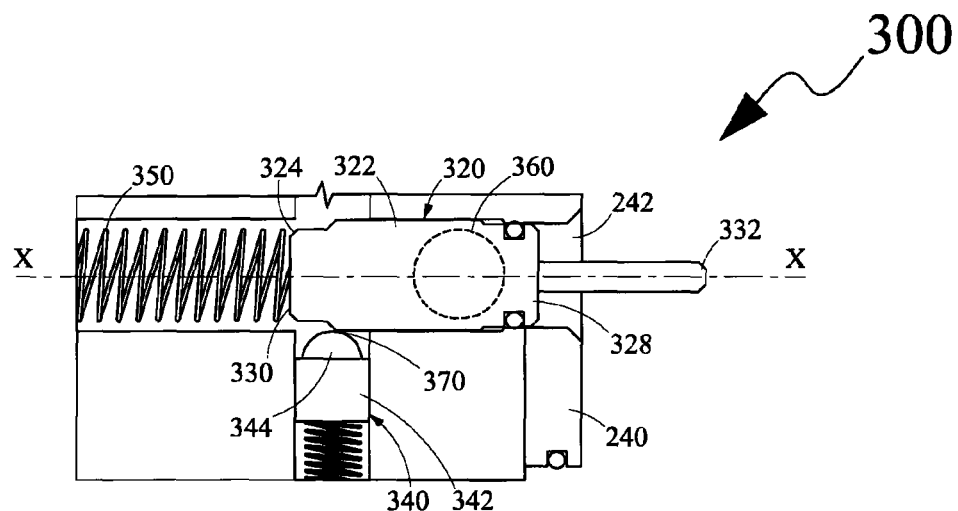
Figure 8:
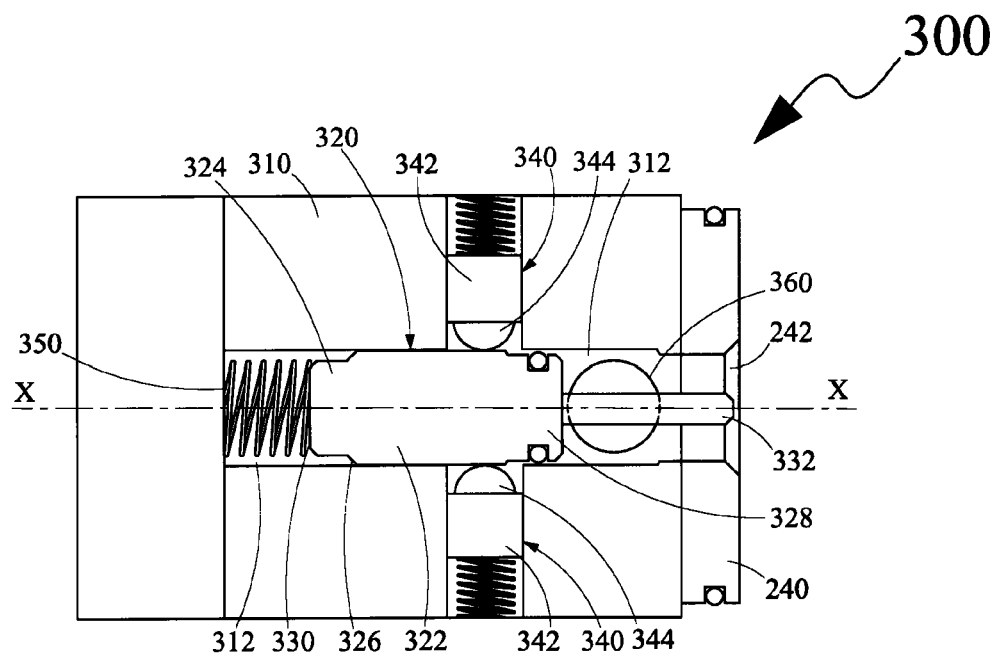
Figure 9:
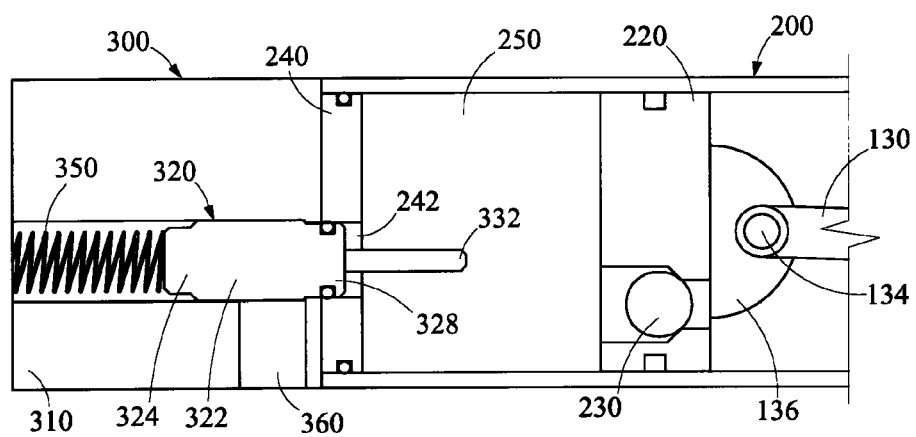
Figure 10:
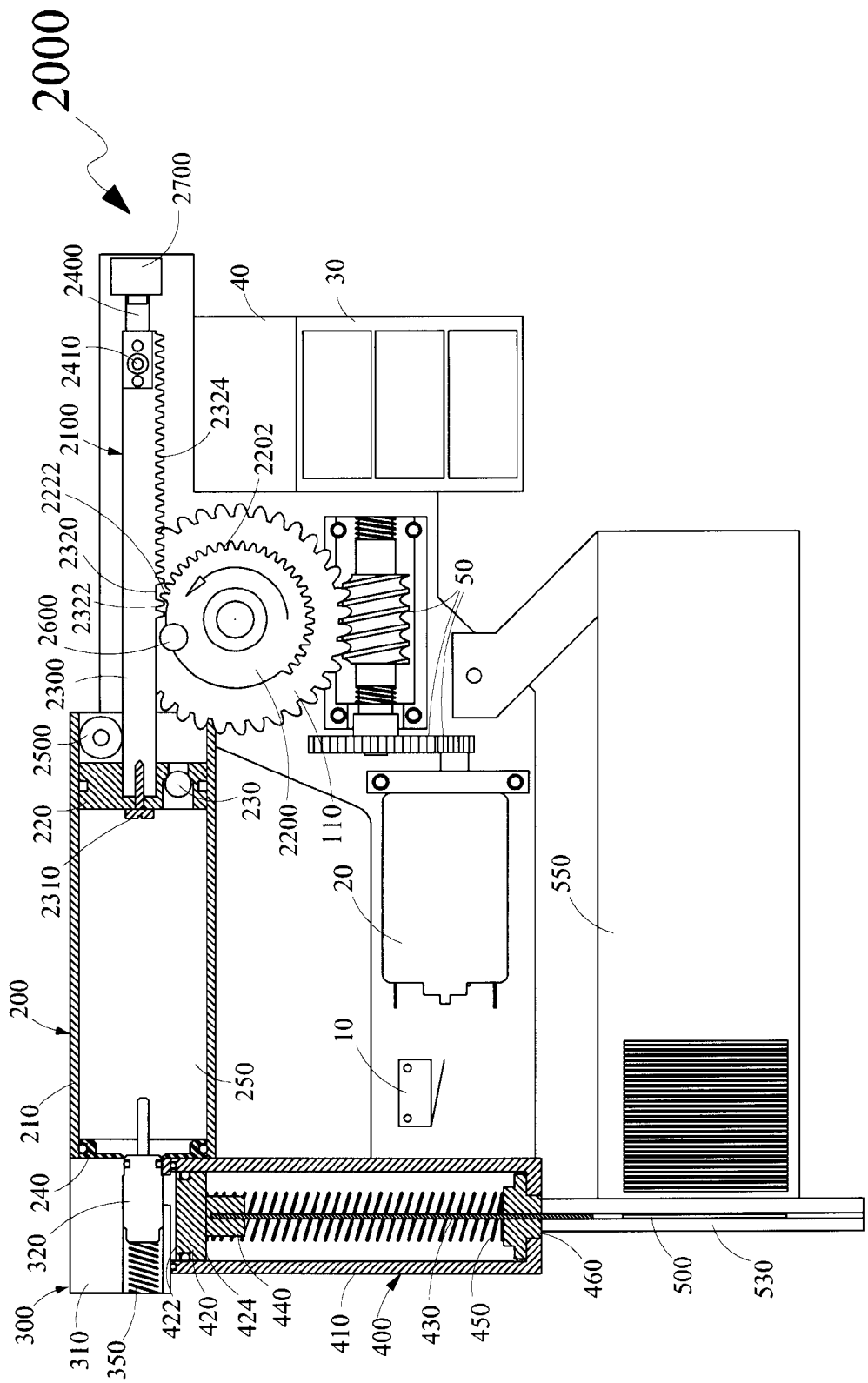
Figure 11:
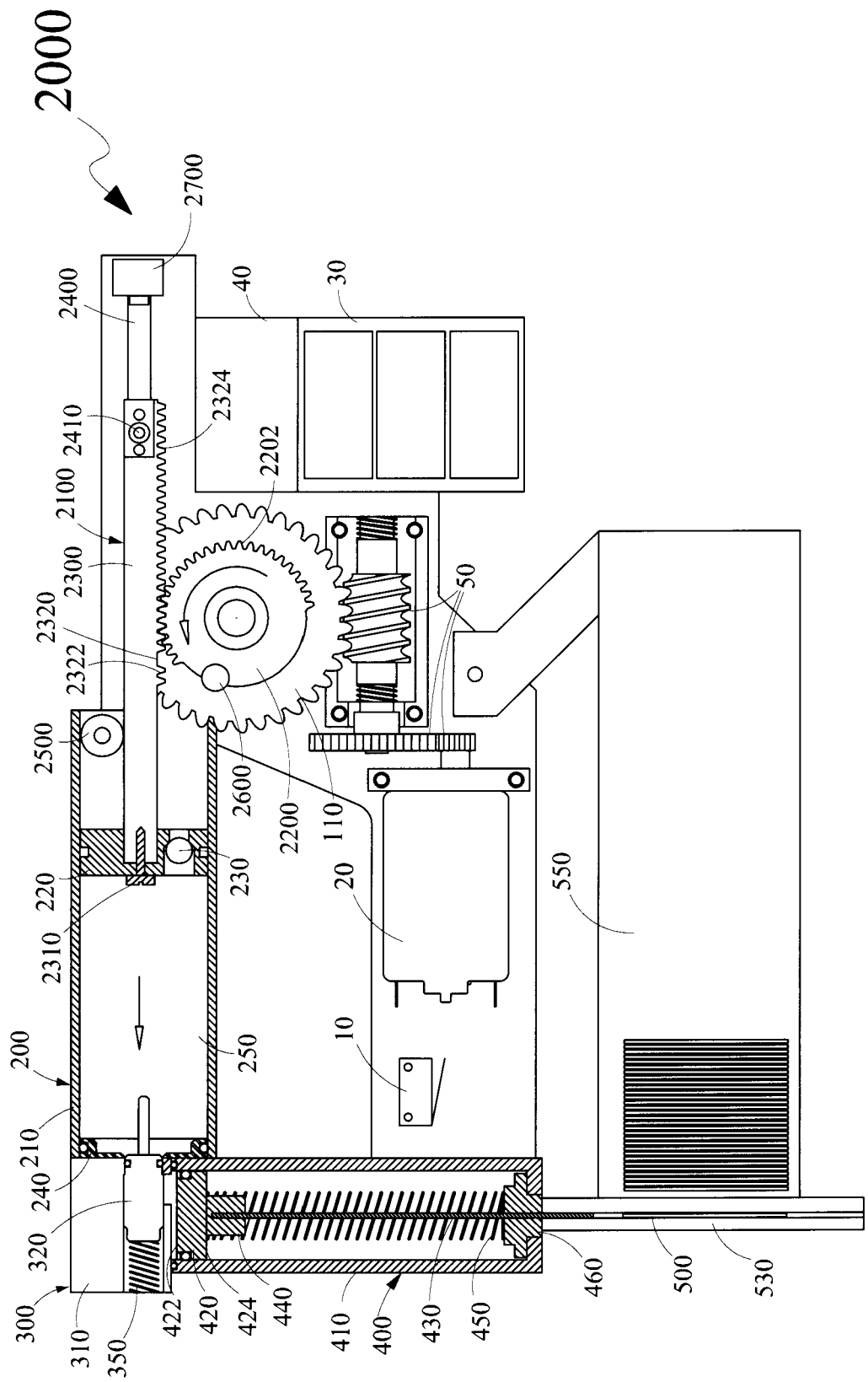
Figure 12:
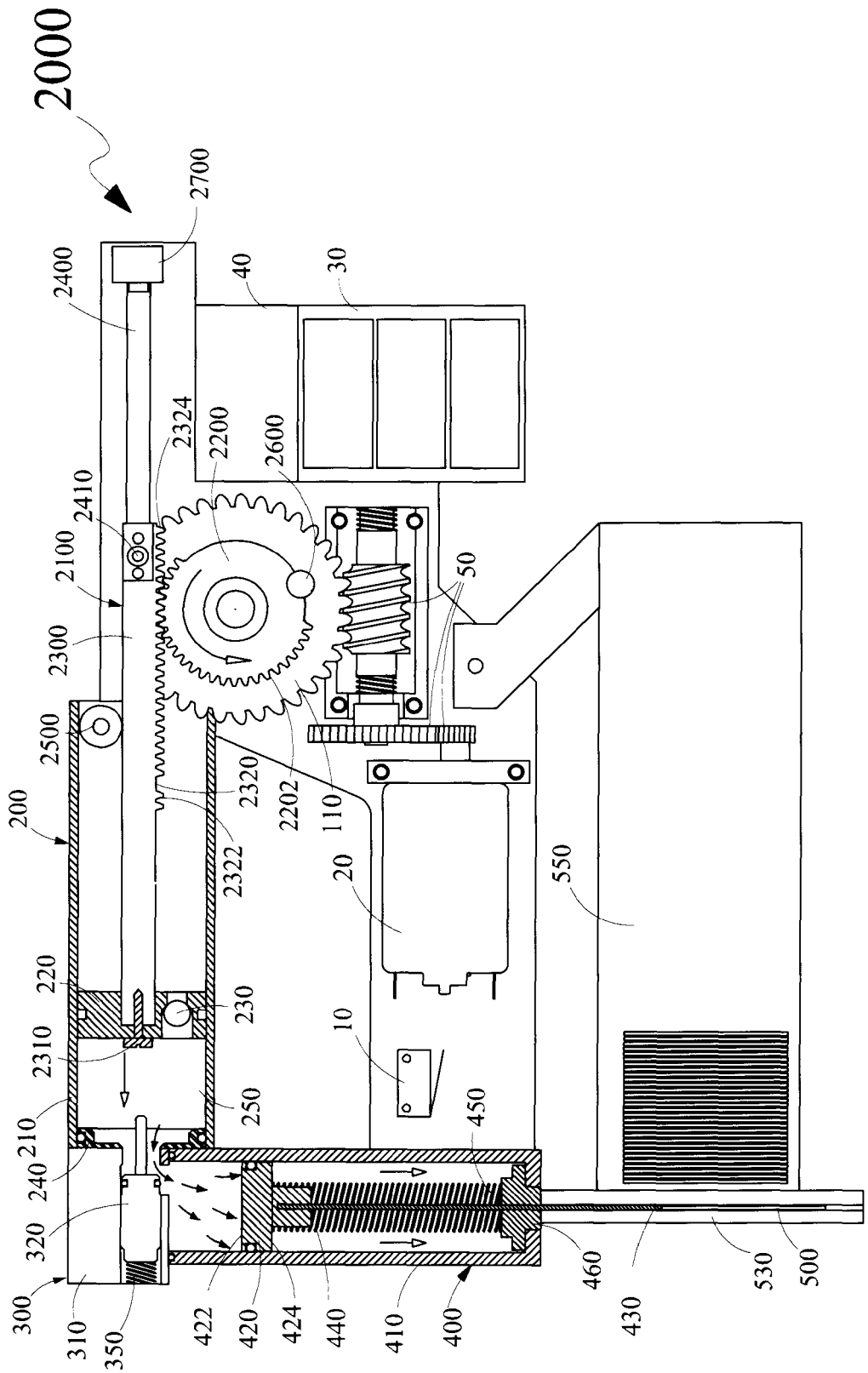
Figure 13:
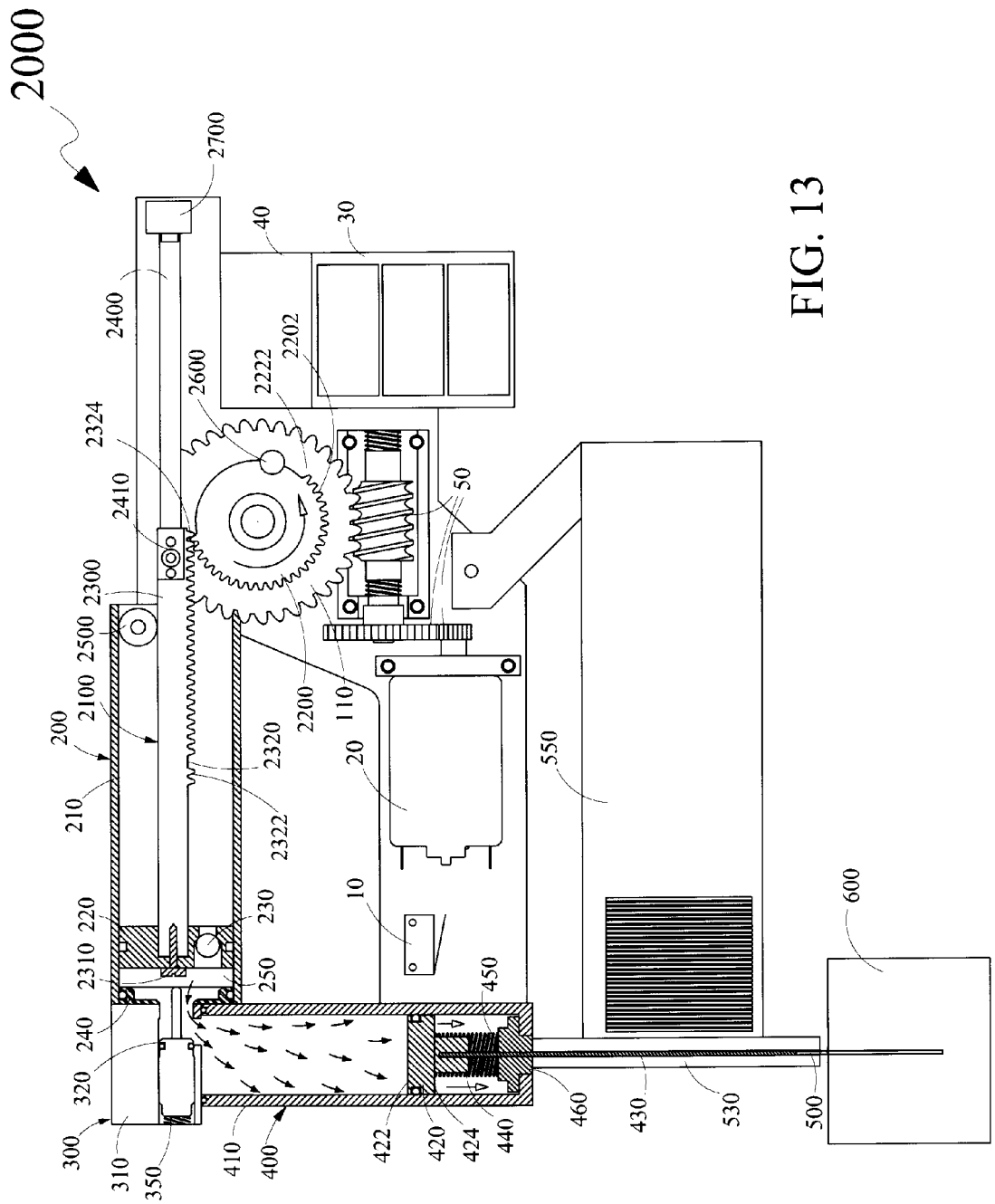
Figure 14:
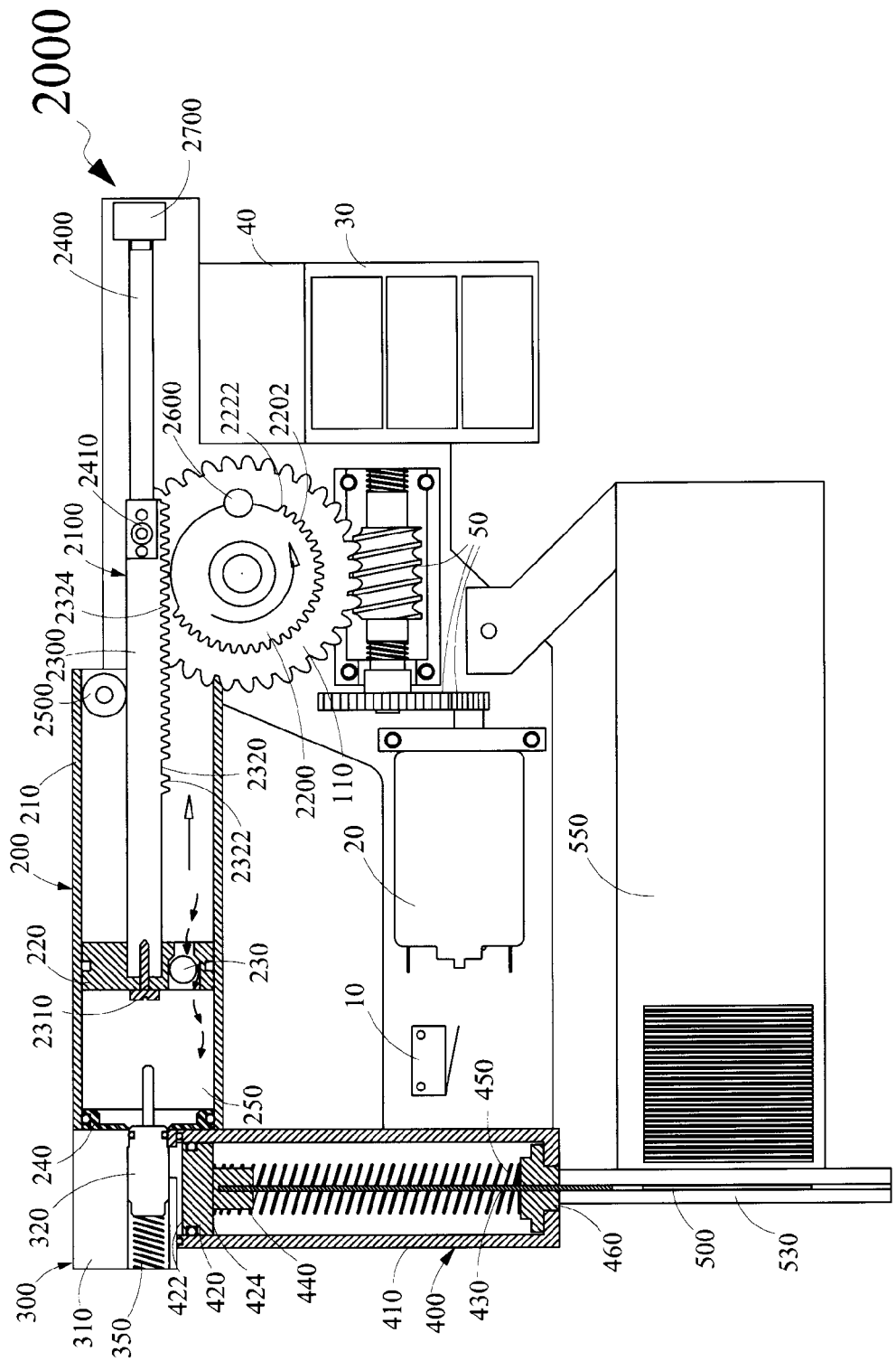
Figure 15:
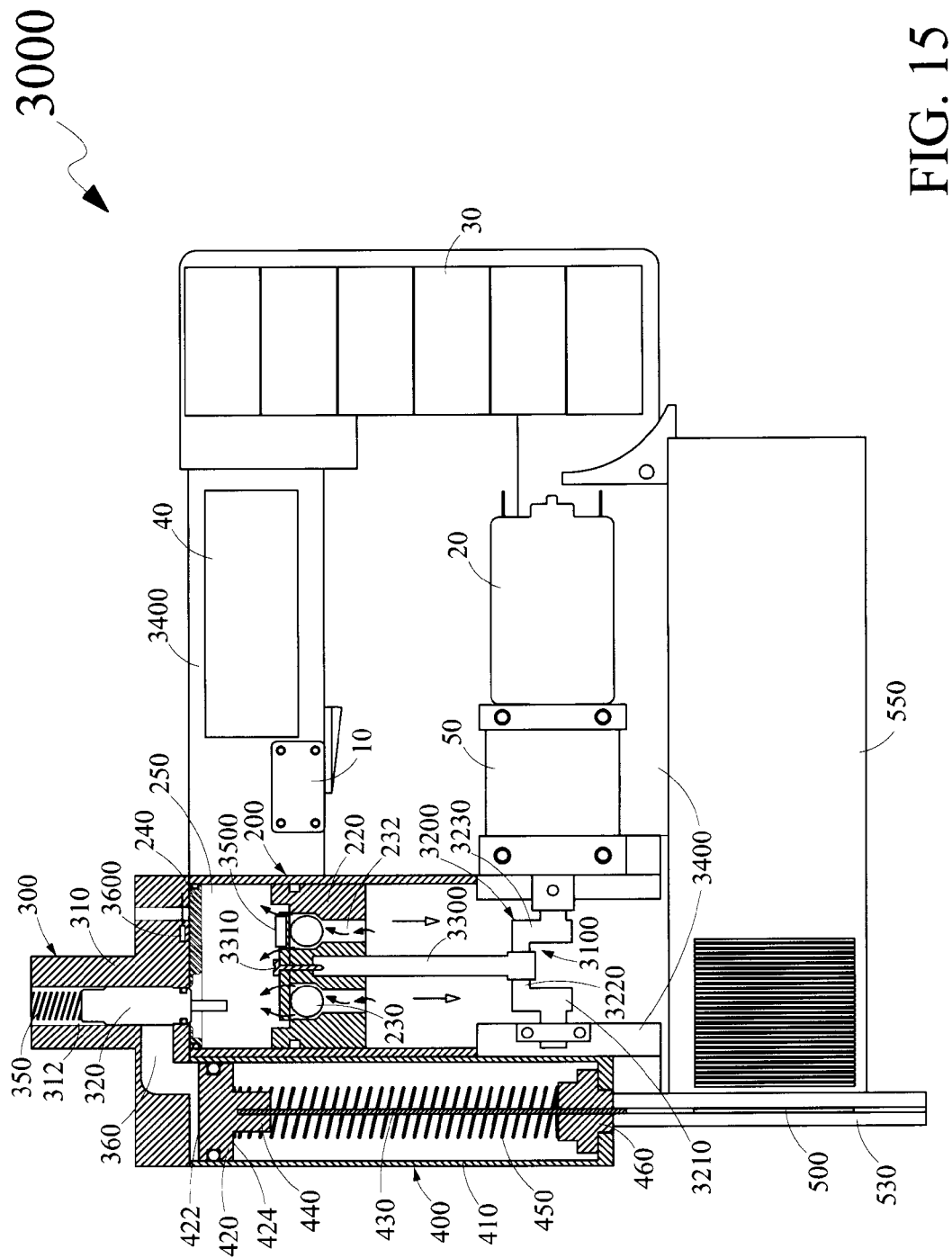
Figure 16:
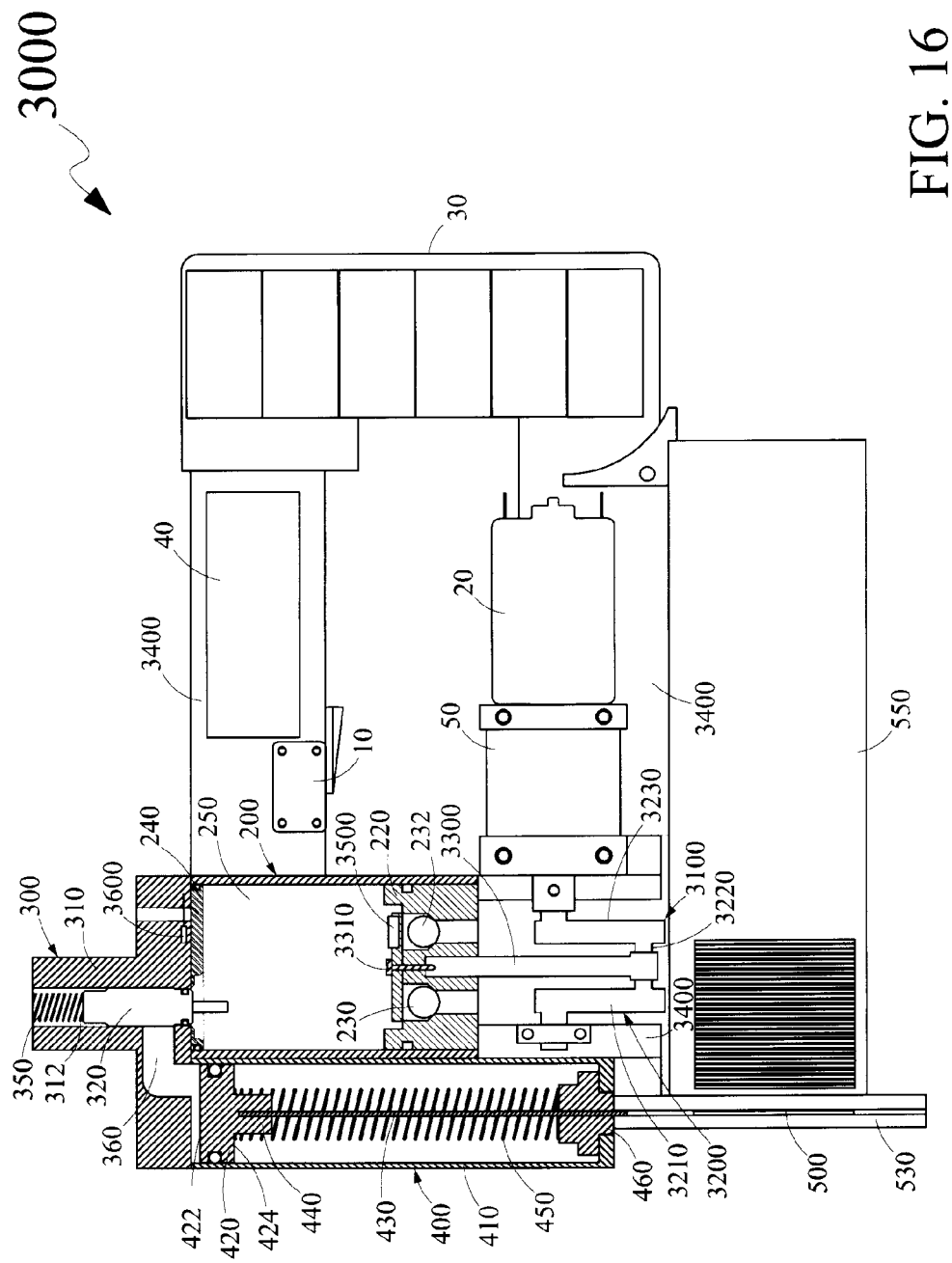
Figure 17:
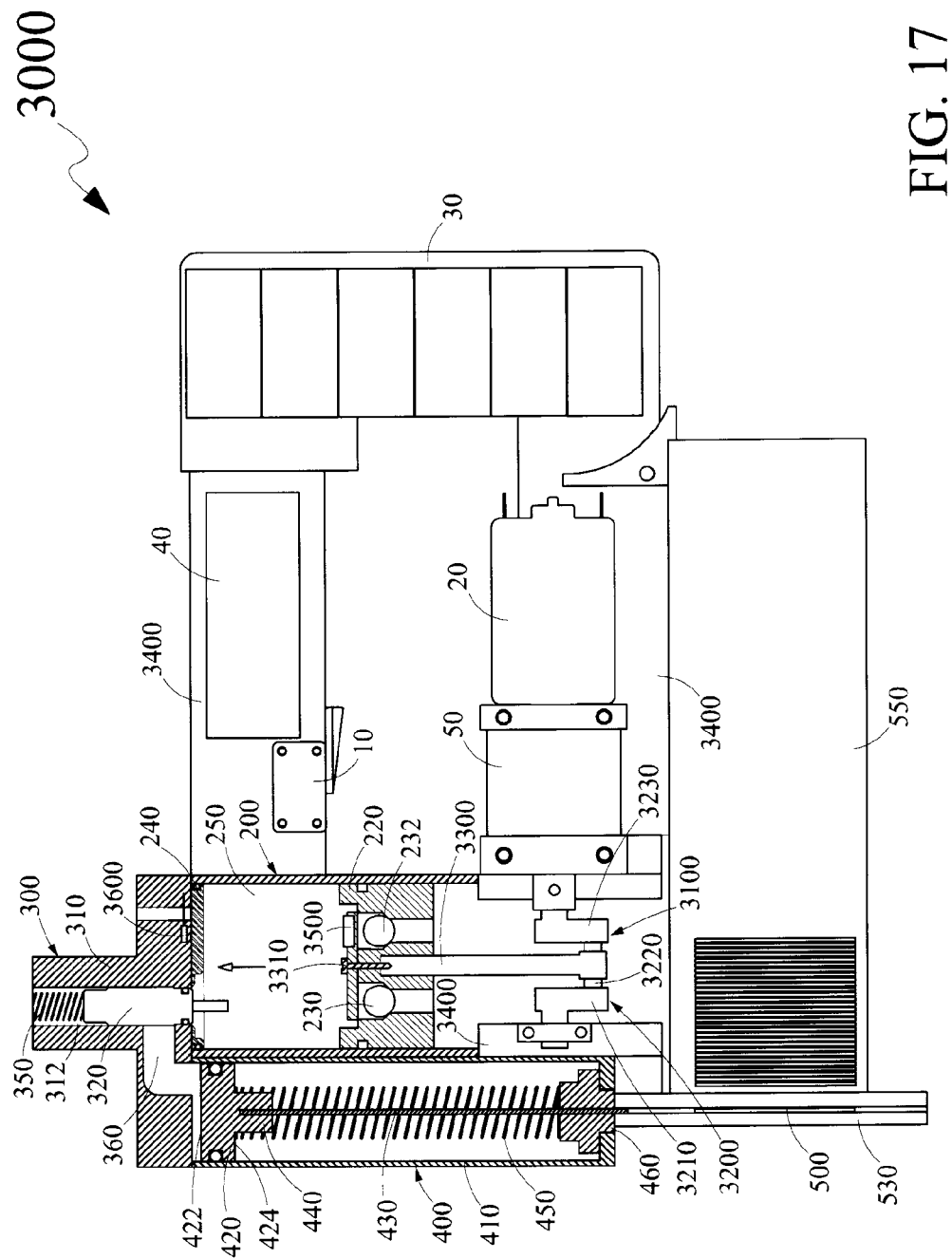
Figure 18:
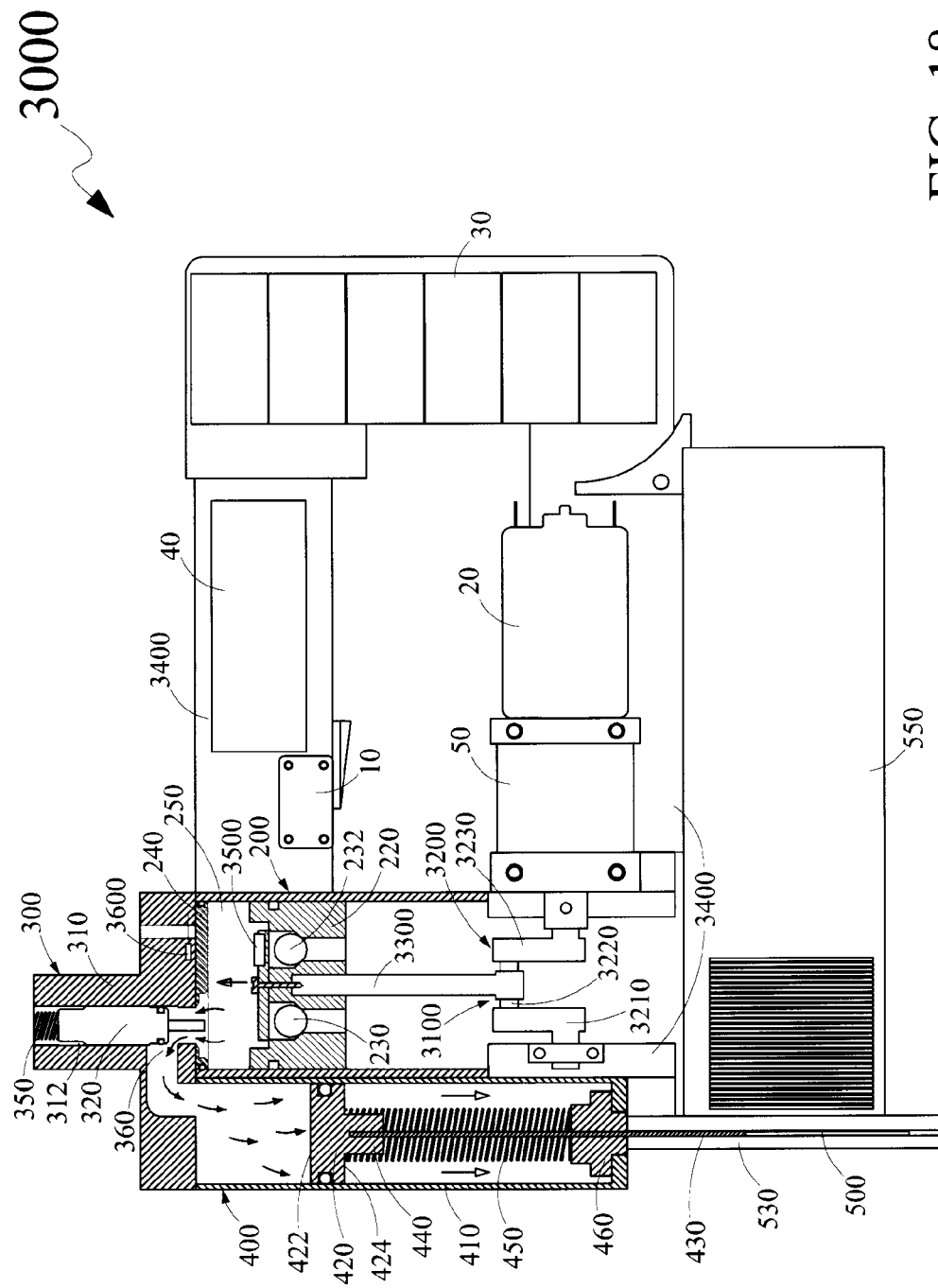
Figure 19:
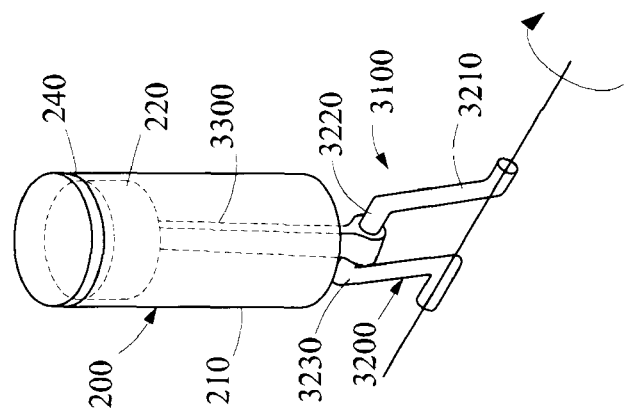
Figure 18:
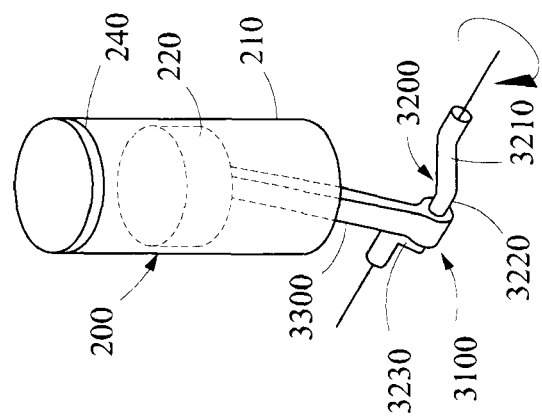
Figure 19:
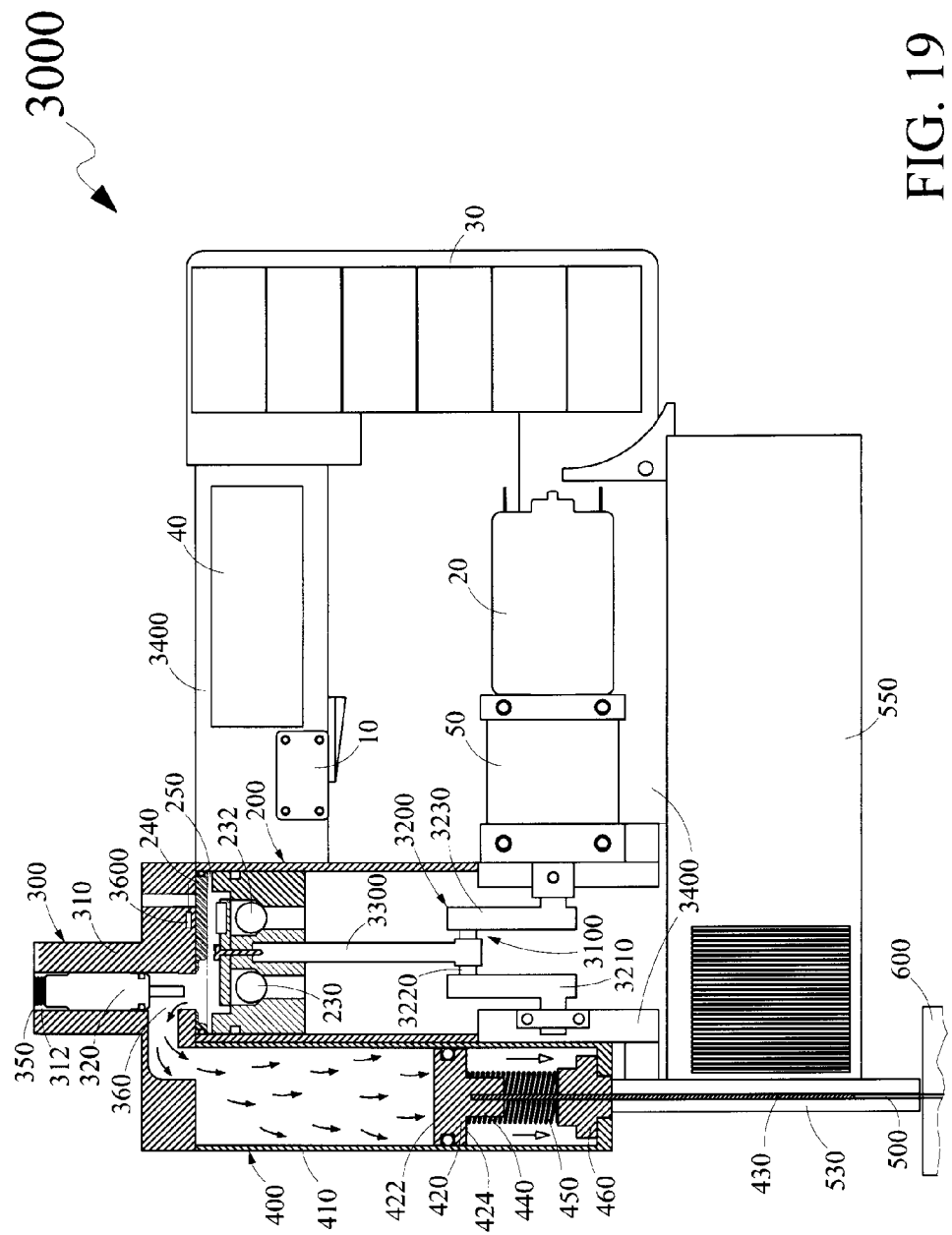
Figure 20:
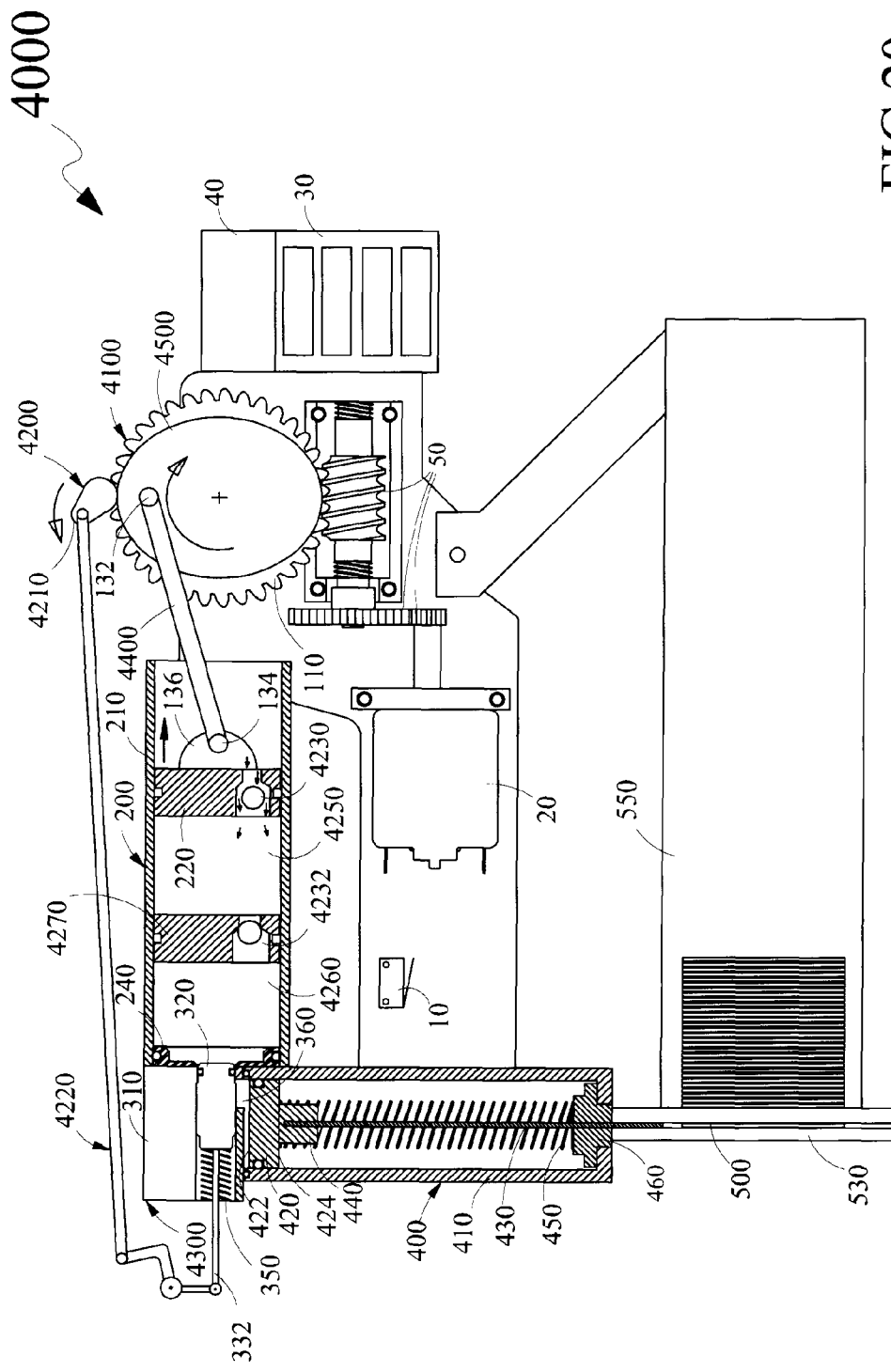
Figure 29:
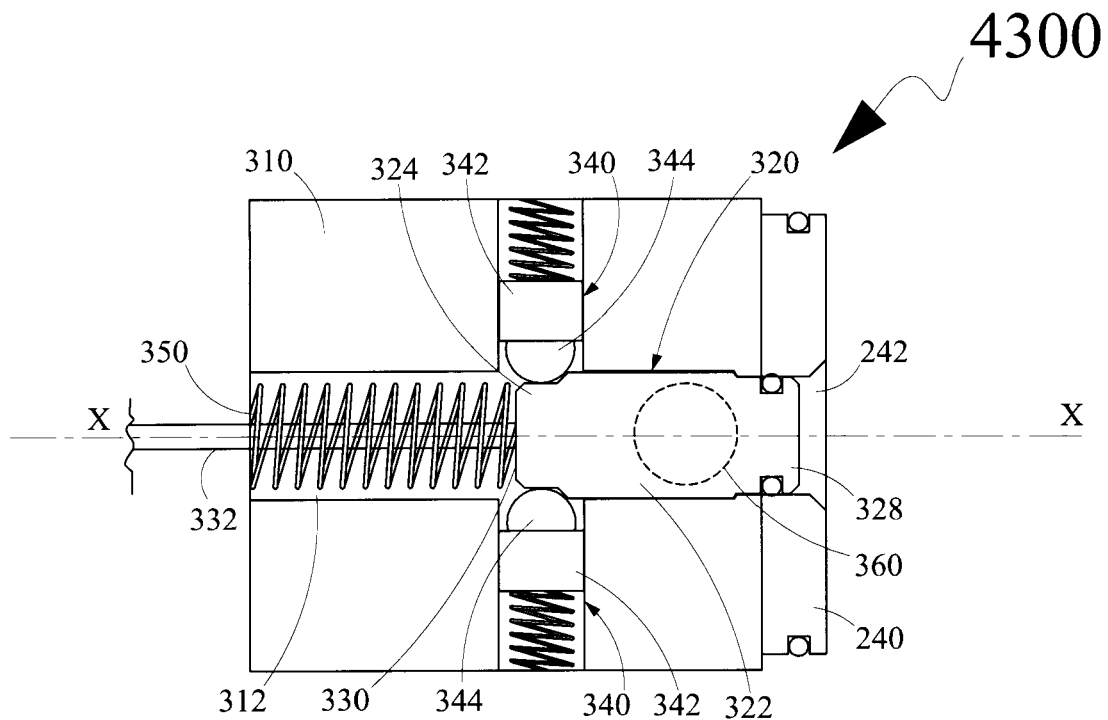
Figure 30:
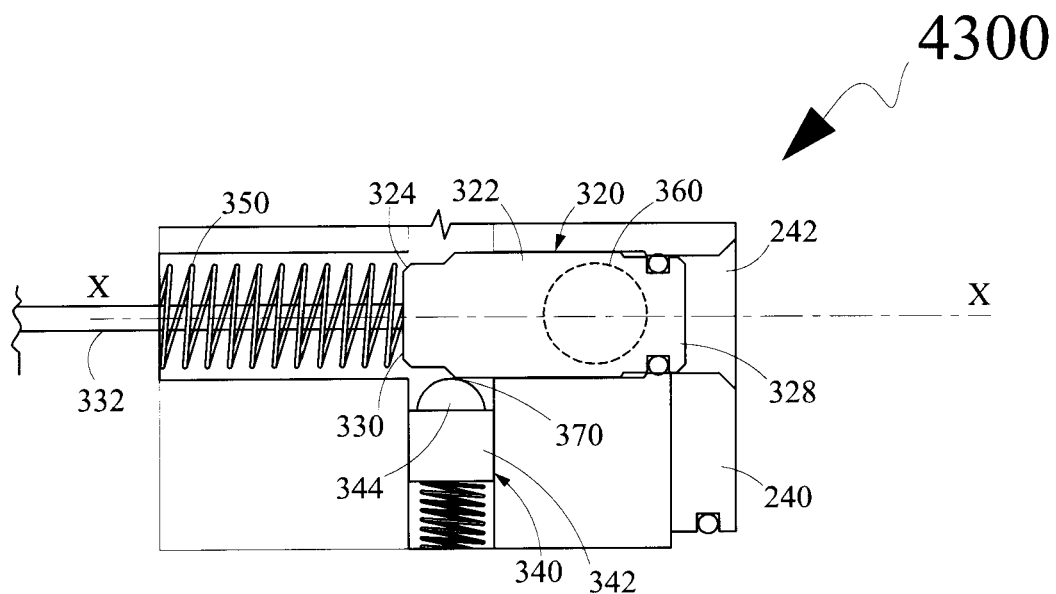
Figure 31:
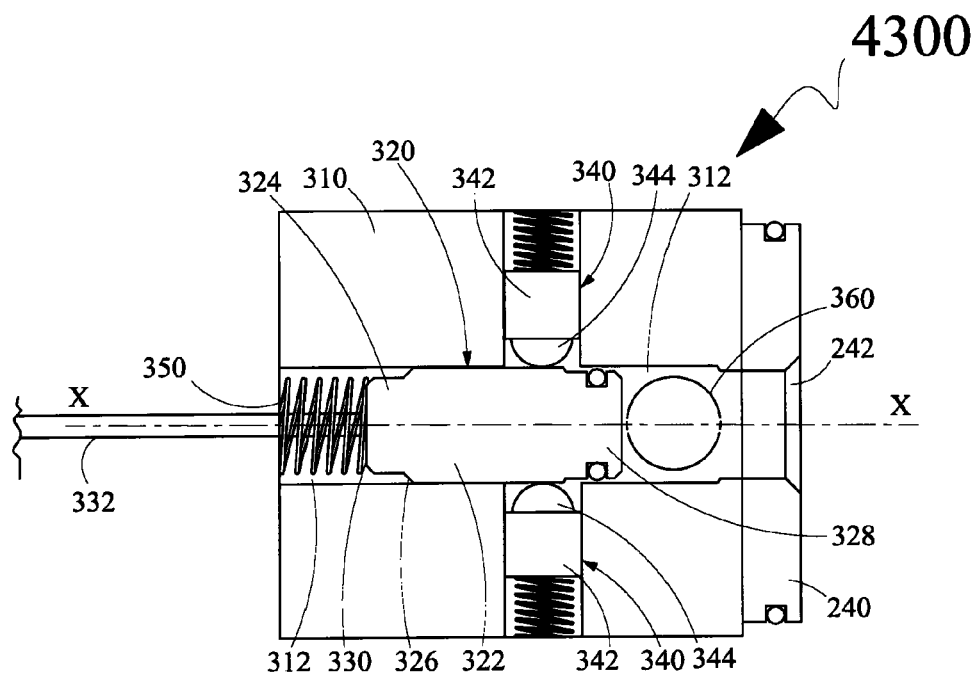
Figure 32:
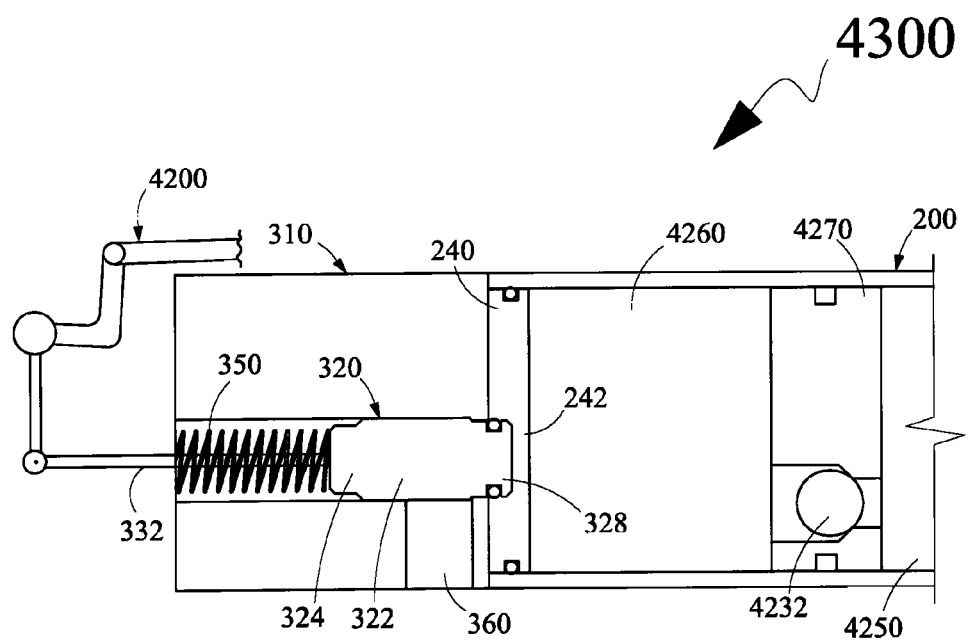

FIG. 7 is a partial top view of the valve arrangement 300, illustrating a tipping point 370 of the valve arrangement 300, according to an exemplary embodiment of the present invention;

FIG. 8 is a top view of the valve arrangement 300, illustrating an open position of the valve arrangement 300, according to an exemplary embodiment of the present invention;

FIG. 9 is a side view of the valve arrangement 300 coupled to first cylinder 200, illustrating a gas passageway 360, according to an exemplary embodiment of the present invention;

FIG. 10 is a longitudinal cross-sectional view of a fastener driving apparatus 2000 incorporating a rack and pinion arrangement 2100 in a first position, according to another exemplary embodiment of the present invention;

FIG. 11 is a longitudinal cross-sectional view of the fastener driving apparatus 2000 incorporating the rack and pinion arrangement 2100 in an intermediate position, according to another exemplary embodiment of the present invention;

FIG. 12 is a longitudinal cross-sectional view of the fastener driving apparatus 2000, incorporating the rack and pinion arrangement 2100 and illustrating a partially opened valve arrangement 300, according to another exemplary embodiment of the present invention;

FIG. 13 is a longitudinal cross-sectional view of the fastener driving apparatus 2000, incorporating the rack and pinion arrangement 2100 in a second position and illustrating a completely opened valve arrangement 300, according to another exemplary embodiment of the present invention;

FIG. 14 is longitudinal cross-sectional view of the fastener driving apparatus 2000, illustrating the valve arrangement 300 in a closed position, the rack and pinion arrangement 2100 moving from the second position towards the first position and intake of gas into a first cylinder 200, according to another exemplary embodiment of the present invention;

FIG. 15 is a longitudinal cross-sectional view of a fastener driving apparatus 3000 incorporating a crankshaft and connecting rod arrangement 3100 and illustrating the crankshaft and connecting rod arrangement 3100 moving from a first position towards a second position and intake of gas into a first cylinder 200, according to yet another exemplary embodiment of the present invention;

FIGS. 15A to 19A illustrate perspective views of the crankshaft and connecting rod arrangement 3100, according to yet another exemplary embodiment of the present invention;

FIG. 16 is a longitudinal cross-sectional view of a fastener driving apparatus 3000 illustrating a crankshaft and connecting rod arrangement 3100 in a second position, according to yet another exemplary embodiment of the present invention;

FIG. 17 is a longitudinal cross-sectional view of a fastener driving apparatus 3000 illustrating a crankshaft and connecting rod arrangement 3100 in an intermediate position, according to yet another exemplary embodiment of the present invention;

FIG. 18 is a longitudinal cross-sectional view of a fastener driving apparatus 3000 illustrating a crankshaft and connecting rod arrangement 3100 moving towards the first position and a valve arrangement 300 in a partially opened position, according to yet another exemplary embodiment of the present invention;

FIG. 19 is a longitudinal cross-sectional view of a fastener driving apparatus 3000 illustrating a crankshaft and connecting rod arrangement 3100 at the first position and the valve arrangement 300 in a completely opened position, according to yet another exemplary embodiment of the present invention;

FIGS. 20-23 are longitudinal cross-sectional views of a fastener driving apparatus 4000 illustrating a first stroke of the fastener driving apparatus 4000 incorporating a slider crank arrangement 4100 and a cam arrangement 4200, according to yet another exemplary embodiment of the present invention;

FIGS. 24-28 are longitudinal cross-sectional views of the fastener driving apparatus 4000 illustrating a second stroke of the fastener driving apparatus 4000 incorporating the slider crank arrangement 4100 and the cam arrangement 4200, according to yet another exemplary embodiment of the present invention;

FIG. 29 is a top view of a valve arrangement 4300, illustrating an initial closed position of the valve arrangement 4300, according to yet another exemplary embodiment of the present invention;

FIG. 30 is a partial top view of the valve arrangement 4300, illustrating a tipping point 370 of the valve arrangement 4300, according to yet another exemplary embodiment of the present invention;

FIG. 31 is a top view of the valve arrangement 4300, illustrating an open position of the valve arrangement 4300, according to yet another exemplary embodiment of the present invention; and FIG. 32 is a side view of the valve arrangement 4300 coupled to a secondary gas chamber 4260, illustrating a gas passageway 360, according to yet another exemplary embodiment of the present invention.

Like reference numerals refer to like parts throughout the description of several views of the drawings.

DETAILED DESCRIPTION OF THE INVENTION

The exemplary embodiments described herein detail for illustrative purposes are subject to many variations in structure and design. It should be emphasized, however, that the present invention is not limited to a particular fastener driving apparatus, as shown and described. It is understood that various omissions and substitutions of equivalents are contemplated as circumstances may suggest or render expedient, but these are intended to cover the application or implementation without departing from the spirit or scope of the claims of the present invention. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present invention provides a fastener driving apparatus for driving fasteners into a substrate. As used herein, "fasteners" refer to objects, such as nails, staples, and the like. The fastener driving apparatus is a combination of a motor driven linear motion converter; a compression cylinder; an expansion cylinder and a valve arrangement. As used herein, the linear motion converter converts a rotational motion of a motor to a linear motion of a piston. The linear motion converter is capable of compressing a gas inside the compression cylinder. The compressed gas is thereafter communicated to the expansion cylinder through the valve arrangement. The compressed gas is allowed to expand within the expansion cylinder, enabling an expansion piston of the expansion cylinder to exert pressure on a fastener, thereby driving the fastener into a substrate. The disclosed apparatus is ergonomically designed to meet the requirements of a portable hand tool that provides comfort to a user, while at the same time meeting the safety standards and performance efficiency requirements. The apparatus has reduced configurational complexities and avoids usage of fuel cells, reduces wear and tear of components of the apparatus, is robust in operation, may be mass manufactured in a-cost effective manner, and provides a portable, noiseless, non-fatiguing, non-hazardous hand held tool for users.

Referring to FIGS. 1-5, in one embodiment, a longitudinal cross-sectional view of a fastener driving apparatus 1000 incorporating a slider crank arrangement is shown. The fastener driving apparatus 1000 comprises a start switch 10; a motor 20; a power source 30; a control circuit 40; a gear reduction mechanism 50; a linear motion converter (in this embodiment, a slider crank arrangement 100); a first cylinder 200; a valve arrangement 300; and a second cylinder 400. The fastener driving apparatus 1000 is capable of driving a fastener 500 into a substrate 600 (See FIG. 5) by utilizing power of a gas compressed within the first cylinder 200. The compressed gas is communicated to the second cylinder 400 through the valve arrangement 300 and enables the compressed gas to expand in the second cylinder 400, thereby applying pressure to the fastener 500 for driving the fastener 500 into the substrate 600.

When a user presses the start switch 10 or any other similar trigger, power from the power source 30 is directed to the motor 20 through the control circuit 40 in a manner such that the motor 20 generates a rotational motion. The rotational motion generated by the motor 20 is communicated to the slider crank arrangement 100 using the gear reduction mechanism 50. The gear reduction mechanism 50 comprises a plurality of gears that transfers the rotational motion of a shaft (not shown) of the motor 20 to the slider crank arrangement 100. The slider crank arrangement 100 is coupled to the gear reduction mechanism 50. The coupling may be by way of a plurality of arrangements such as, but not limited to, a worm gear, a planetary gear, a spur gear, a helical gear or a timing belt. For the purposes of illustration, a worm gear 110 is shown in the figures. Accordingly, the slider crank arrangement 100 is coupled to the worm gear 110 in a manner such that the rotational motion of the shaft of the motor is transferred to the rotational motion of the worm gear 110. The worm gear 110 is coupled to a crank wheel 120. A first end 132 of a crank link 130 is coupled to the crank wheel 120. The rotational motion of the worm gear 110 imparts a rotational motion to the crank wheel 120 and in turn to the crank link 130.

The first cylinder 200 comprises a cylinder guide 210 and a first piston 220 disposed therein. The first piston 220 is coupled at a second end 134 of the crank link 130 using a connector 136 in a manner such that the rotational motion of the worm gear 110 and the crank wheel 120 is converted to linear reciprocal motion of the first piston 220 within the first cylinder 200 using the crank link 130. The first cylinder 200 further comprises a first cylinder end cap 240 towards a first end of the first cylinder 200. The first piston 220 defines a gas chamber 250 within the first cylinder 200 and between the first cylinder end cap 240 and the first piston 220. The gas chamber 250 is capable of accommodating gas therein. In one embodiment, the first cylinder 200 further comprises a check valve 230 disposed on the first piston 220. However, the check valve 230 may be positioned at a variety of locations in the first cylinder 200. The check valve 230 operates in a manner such that when the check valve 230 is in an open position, the check valve 230 enables the entry of gas into the gas chamber 250. Alternatively, when in a closed position, the check valve 230 prevents any exit of gas from the gas chamber 250.

The second cylinder 400 comprises a cylinder guide 410 and a second piston 420 disposed there within. The second piston 420 has a front face 422 and a rear face 424. The rear face 424 of the second piston 420 is coupled to an anvil 430 using a connector 440. The anvil 430 extends along a longitudinal axis of the second cylinder 400 into a fastener guide 530. The anvil 430 is capable of linearly moving within the second cylinder 400 and the fastener guide 530. The fastener guide 530 is configured to receive a fastener 500 from a fastener feeder 550 and the linearly moving anvil 430 is capable of applying pressure to the fastener 500 in the fastener guide 530. Additionally, the linear movement of the anvil 430 through the fastener guide 530 enables in jamb clearing. Such a jamb clearing removes the fastener fragments or other debris inside the fastener guide 530 with the linear movement of the anvil 430 through the fastener guide 530 and thereby avoids the need of any manual operation for cleaning the fastener guide 530.

The second cylinder 400 further comprises an anvil retracting mechanism 450 and an anvil drive bumper 460. The anvil drive bumper 460 is disposed at an end of the second cylinder 400 away from an end having the valve arrangement 300. In one embodiment, the anvil retracting mechanism 450 is a return spring and is coupled to the rear face 424 of the second piston 420 at one end and to the anvil drive bumper 460 at another end. Alternatively, the anvil retracting mechanism 450 may be an extension spring or rubber bungee attached to the front face 422 and to the valve arrangement 300. In a situation when the second cylinder 400 has not received the compressed gas from the first cylinder 200, the second piston 420 is positioned towards the valve arrangement 300 and the anvil retracting mechanism 450 is in a relaxed position i.e. the anvil retracting mechanism 450 is not compressed. Such a position is also referred to as the load-free position. The anvil retracting mechanism 450 is configured to retract the second piston 420 back to an original position towards the valve arrangement 300.

The first cylinder end cap 240 is coupled to the valve arrangement 300. Referring to FIGS. 6-9, the valve arrangement 300 is illustrated in detail. The first cylinder end cap 240 has a central hollow portion 242. The valve arrangement 300 comprises a valve body 310 having a central groove 312 extending along a longitudinal axis X-X of the valve body 310. The central groove 312 conforms to the central hollow portion 242 of the first cylinder end cap 240 at the front end portion, while the rear end portion of the central groove 312 is closed. A valve spool 320 is seated up against the valve body 310 within the central groove 312 along the longitudinal axis X-X and is capable of reciprocating linearly within the central groove 312. In one embodiment, the valve spool 320 has a cylindrical body having a stepped structure configured by a primary body portion 322 and a concentric secondary body portion 324.

The primary body portion 322 has a diameter greater than a diameter of the secondary body portion 324. The secondary body portion 324 gradually extends from the primary body portion 322 in a manner such that the graduation of the primary body portion 322 into the secondary body portion 324 configures a chamfered portion 326 (see FIG. 8). The valve spool 320 reciprocates within the central grove 312 of the valve body 310 along the longitudinal axis X-X. The valve spool 320 further has a front face portion 328, a rear face portion 330 and a valve spool stem 332 extending outwardly from the front face portion 328 along a longitudinal axis of the valve spool 320. In an initial state, the front face portion 328 is positioned in the central hollow portion 242 of the first cylinder end cap 240 in a manner such that the front face portion 328 closes the central hollow portion 242, while the valve spool stem 332 extends into the gas chamber 250 of the first cylinder 200.

The valve arrangement 300 further comprises a pair of valve retainers 340 positioned in an opposed relationship laterally along the central groove 312 of the valve body 310. In one embodiment, each valve retainer 340 is in the form of a cup 342 and retention ball 344. In the initial state, when the valve spool 320 is closing the central hollow portion 242 of the first cylinder end cap 240, the valve spool 320 is retained in such a position by the valve retainers 340. The valve retainers 340 are positioned in a manner such that the retention balls 344 are disposed at the chamfered portion 326 of the valve spool 320, thereby applying pressure on the valve spool 320 and preventing the valve spool 320 to deviate from the position closing the central hollow portion 242 of the first cylinder end cap 240. Additionally, the valve arrangement 300 comprises a valve return spring 350 disposed within the central groove 312 and towards the rear end portion of the central groove 312. The rear face portion 330 of the valve spool 320 is disposed on the valve return spring 350. The valve arrangement 300 further comprises a gas passageway 360 configured from the central groove 312 of the valve arrangement 300 and connected to the second cylinder 400. In the initial state, when the front face portion 328 of the valve spool 320 is disposed on the central hollow portion 242, the primary body portion 322 substantially closes the gas passageway 360. The gas passageway 360 is configured to define a duct for communicating the gas from the gas chamber 250 of the first cylinder 200 to the second cylinder 400.

Figure 1:
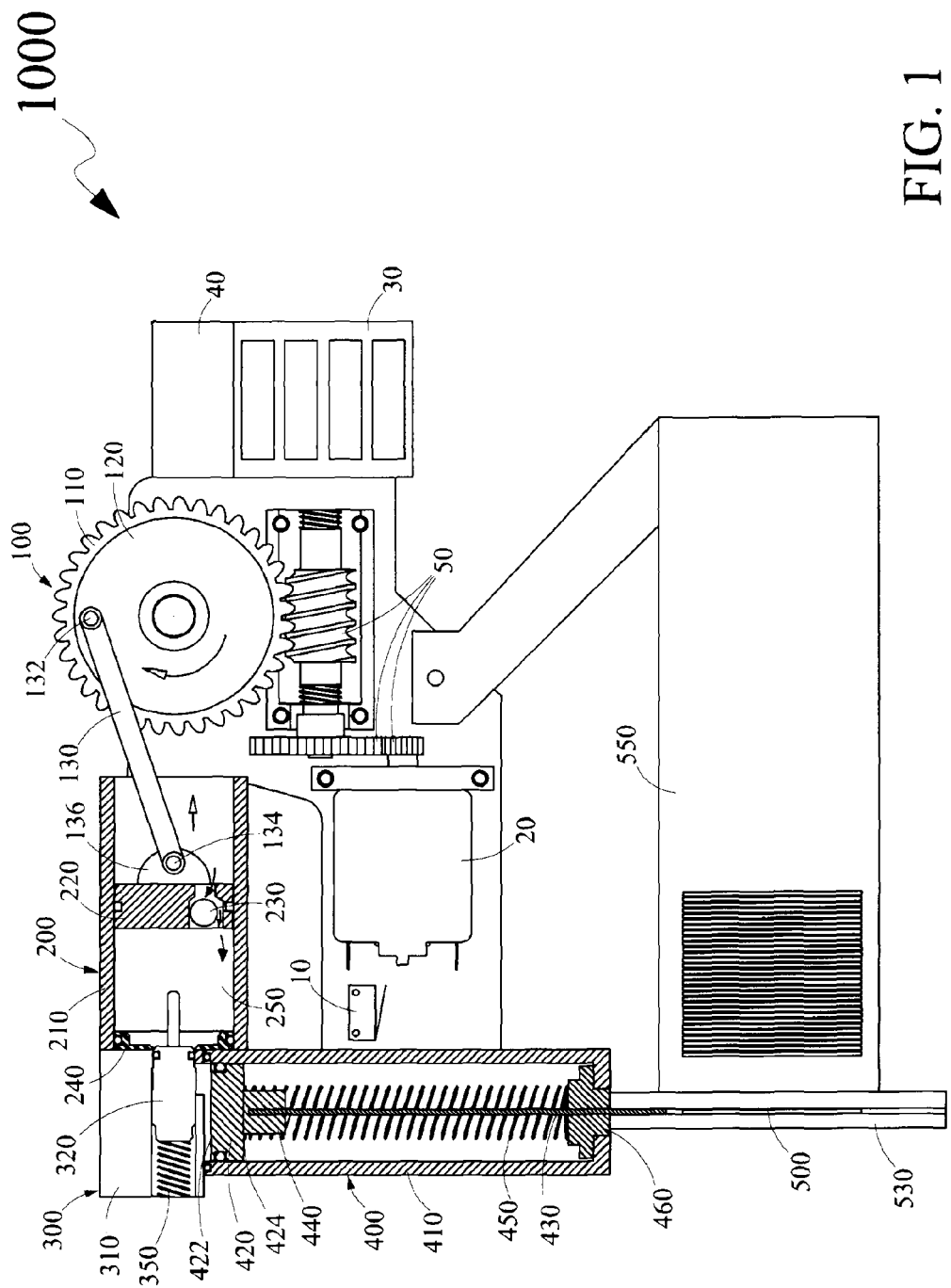
Figure 2:
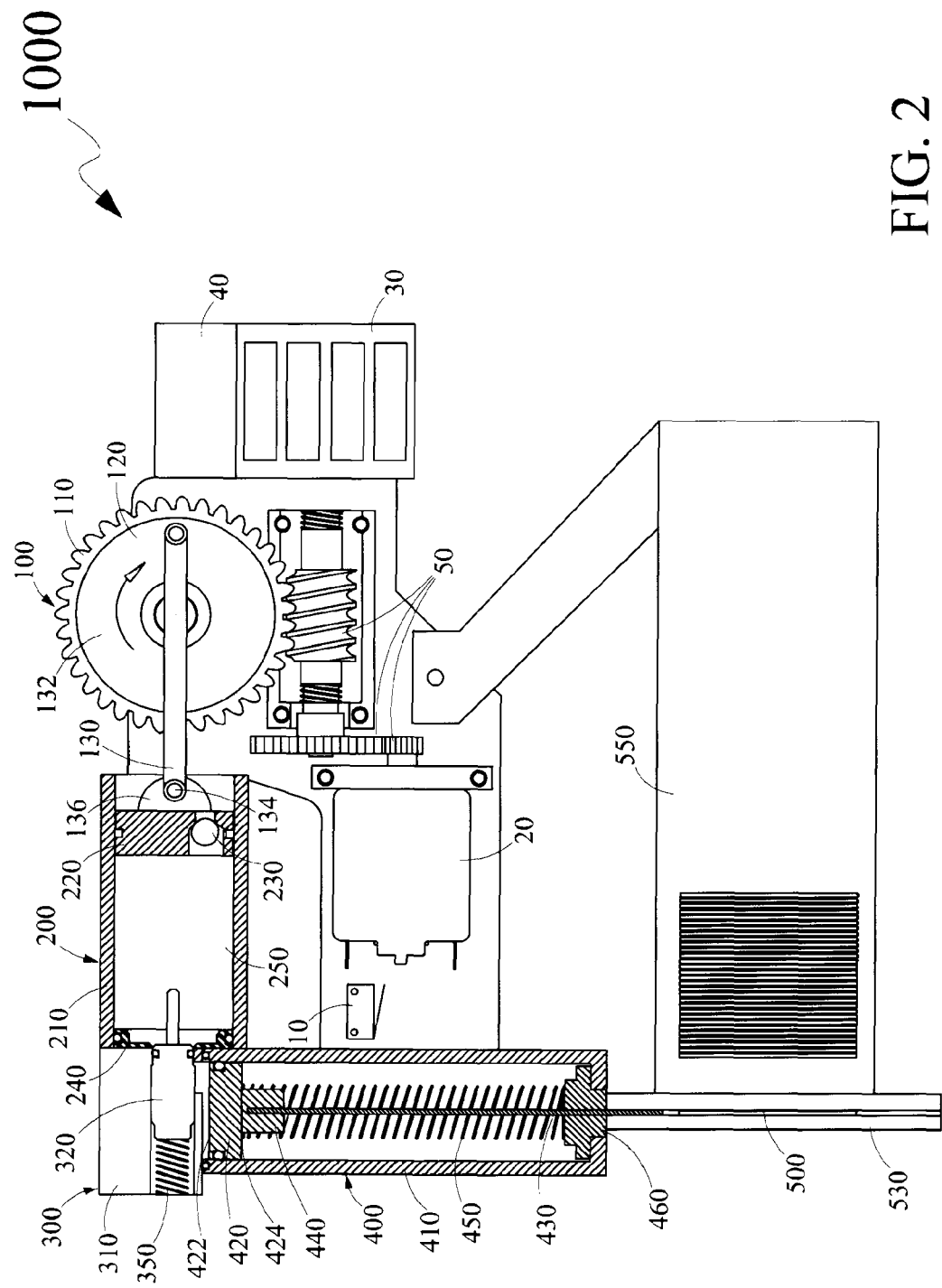
FIG. 2 is a longitudinal cross-sectional view of the fastener driving apparatus 1000, illustrating the first piston 220 reaching the second position, according to an exemplary embodiment of the present invention.

More specifically, FIG. 1 illustrates a longitudinal cross-sectional view of the fastener driving device 1000, showing an intake of gas into the gas chamber 250 of the first cylinder 200. Preferably, the gas used is the atmospheric air at atmospheric pressure thereby avoiding the usage of any pre-compressor for pressurizing the intake air. The cycle begins when the first piston 220 is at a first position close to a top dead center towards the first cylinder end cap 240 and the crank link 130 is substantially horizontal with respect to the first cylinder. With the start switch 10 pressed ON; the motor 20 is powered by the power source 30 using the control circuit 40. The control circuit 40 may be any apparatus for connecting power to the motor 20 for the purpose of initiating the operation of the fastener driving device 1000 and then removing the power to the motor 20 after the operation of the fastener driving device 1000 has substantially completed. The crank wheel 120 starts rotating (either clockwise or counterclockwise), causing the first piston 220 to move linearly away from the first cylinder end cap 240 within the cylinder guide 210. In this situation, the check valve 230 opens, causing atmospheric air to enter the gas chamber 250. The intake of atmospheric air through the check valve 230 continues until the time the crank wheel 120 has completed enough rotation such that the crank link 130 is once again horizontal. For an 18 gage nail, the volume of the gas in the gas chamber 250 ranges from 6 to 9 cubic inches at standard temperature and pressure conditions and, more preferably, 8 cubic inches. At this stage, the first piston 220 has reached a second position (See FIG. 2).

Figure 3:
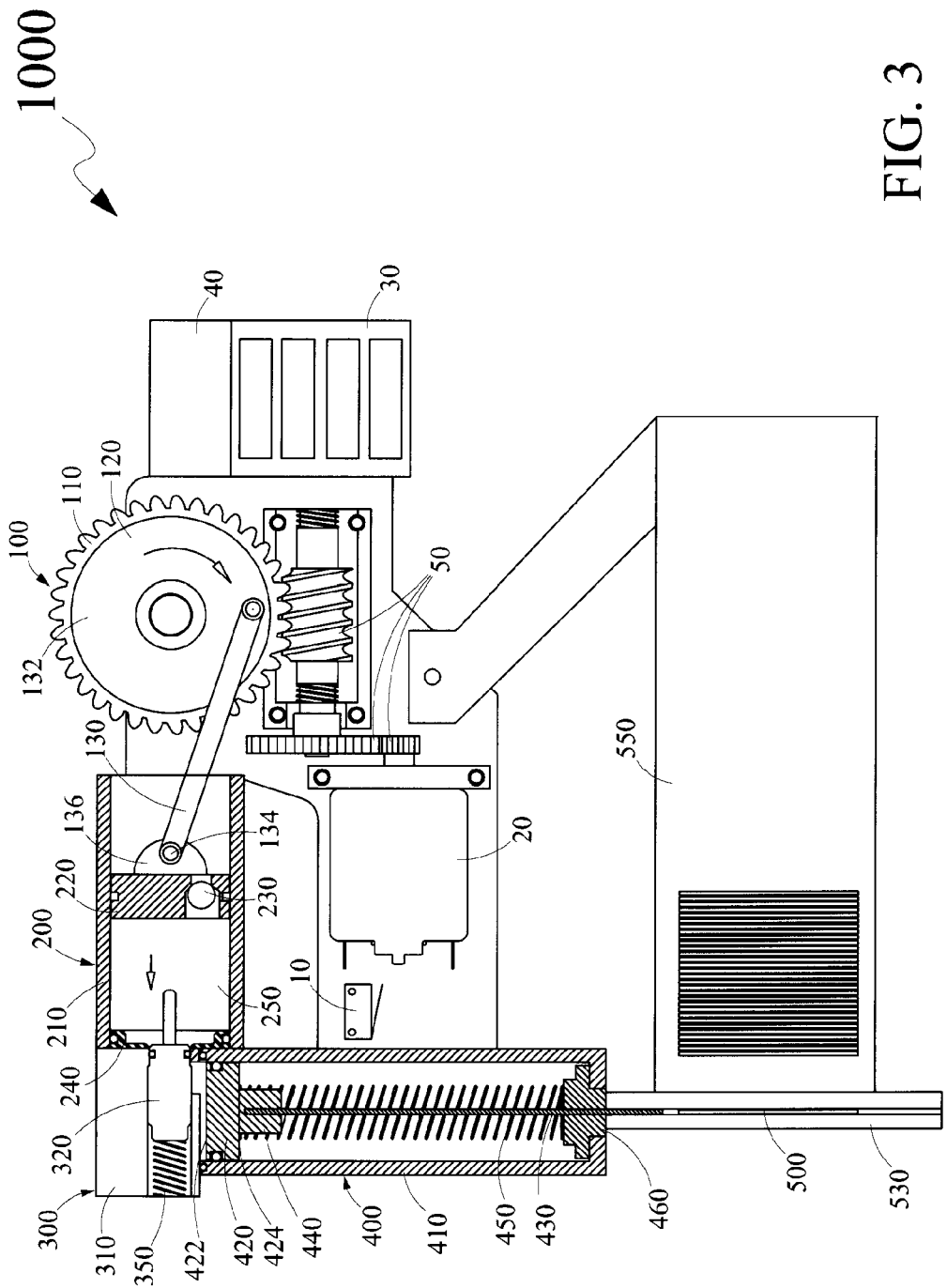
FIG. 3 is a longitudinal cross-sectional view of the fastener driving apparatus 1000, illustrating the first piston 220 moving from the second position towards the first position, according to an exemplary embodiment of the present invention.

With the continued rotation of the crank wheel 120, the crank link 130 continues its movement corresponding to the rotation of the wheel 120 another 180 degrees as shown in FIG. 3. The first piston 220 starts moving towards the first cylinder end cap 240 as the cycle continues. During this cycle, the check valve 230 is in the closed position, preventing any exit of air from the gas chamber 250. The first piston 220 continuously compresses the air in the gas chamber 250 while moving towards the first cylinder end cap 240. In this stage the valve spool 320 is also disposed in the central hollow portion 242 of the first cylinder end cap 240 in a manner, such that, the valve spool 320 closes the central hollow portion 242 and the gas passageway 360 is also closed. In such a position the valve arrangement 300 is more specifically illustrated in FIG. 6, wherein the valve retainers 340 and the retention balls 344 are disposed at the chamfered portion 326 of the valve spool 320. Such positioning of the retention balls 344 applies pressure on the valve spool 320 and prevents the valve spool 320 to deviate from the position closing the central hollow portion 242 of the first cylinder end cap 240. FIG. 9 illustrates a longitudinal side view of the valve arrangement 300 in conjunction with the first cylinder 200, showing the position of the valve spool stem 332 disposed inside the gas chamber 250 when the valve spool 320 is closing the central hollow portion 242 of the first cylinder end cap 240.

Referring to FIG. 3, an intermediate position of the first piston 220 between the second position and the first position of the first piston 220 in the first cylinder 200 is shown. The continued rotation of the crank wheel 120 causes the first piston 220 to continue proceeding towards the first cylinder end cap 240, thereby further compressing the gas in the gas chamber 250.

With a further continued rotation of the crank wheel 120, the first piston 220 continues proceeding towards the first cylinder end cap 240, thereby further compressing the gas in the gas chamber 250. The valve arrangement 300 opens either when the gas pressure inside the gas chamber 250 exceeds the maintaining pressure of the valve spool 320 of the valve arrangement 300 or when the first piston 220 strikes the valve spool stem 332 of the valve spool 320. The valve arrangement 300 remains open with the gas pressure from the gas chamber 250 until the force of the gas pressure drops below the restoring force of the valve return spring 350. Accordingly, the pressure inside the gas chamber 250 increases to an extent that the pressure of the gas in the gas chamber 250 exceeds the pressure applied by the valve retainers 340 and the valve return spring 350 on the valve spool 320. In such a situation, the gas inside the gas chamber 250 pushes the valve spool 320 to move linearly inside the central groove 312 of the valve body 310 in a manner such that the valve spool 320 opens central hollow portion 242. The position of the valve arrangement in this situation may be more specifically referred to in FIG. 7, when the valve spool 320 opens the central hollow portion 242, the retention balls 344 cross a tipping point 370. The tipping point 370, as used herein, refers to a point of contact between the retention balls 344 and the valve spool 320, when the valve retainers 340 and the retention balls 344 provide minimal resistance to the linear movement of the valve spool 320, thereby resulting in an opening of the gas passageway 360.

The movement of the first piston 220 creates the timing for opening of the valve spool 320 of the valve arrangement 300. The first piston 220 pushes the valve spool 320 to open the valve arrangement 300 before the first piston 220 reaches the first position (top dead center). The advantage of opening of the valve arrangement 300 while the first piston 220 is still advancing is that the pressure in the gas chamber 250 cannot force the first piston 220 back. Additionally, if the valve arrangement 300 opens too early, the pressure offered by the gas chamber 250 would be insufficient pressure to drive the second piston 420 for driving the fastener 500 into the substrate 600. Furthermore, if the valve arrangement 300 opens too late, first piston 220 starts to return before the anvil 430 drives the fastener 500 into the substrate 600.

The opening of the valve arrangement 300 on sufficiently compressing the gas in the gas chamber 250 includes several parameters that are important for the configurational features of the valve arrangement 300. The parameters are the pressure drop through the valve arrangement 300, the opening time of the valve arrangement 300 and the volume of air contained in gas passageway 360. In a preferred embodiment, the valve arrangement 300 is referred to as a snap acting valve. More specifically, the opening time of the valve spool 320, i.e. the time from being closed until the time the valve is at least 70 percent open, should be less than 20 milliseconds (0.020 seconds.) The valve spool 320 needs to open fully and quickly such that the energy of expansion is not lost to the spool 320 and the valve retainers 340. If the valve were to open in 0.100 seconds, for example, the energy of expansion would be lost to the valve spool 320 and the valve retainers 340, and the ability to transfer the energy from the compressed gas into the second cylinder 400 and to the anvil 430 would be greatly restricted. This would cause a larger reactionary force against the user and would make difficult the ability of the apparatus to drive fasteners. The valve arrangement 300 and more specifically, the valve spool 320 may be mechanically tripped during a single stroke of the first piston 220 by at least one of an electric motor, the first piston and a cam.

In one embodiment, the opening force that may drive a standard 18 gage 2" long fastener, for example a nail, fully into pine substrate is the force when the gas in the gas chamber 250 is compressed to approximately 160 psi with a volume of approximately 1.0 cubic inch. The volume of gas contained in gas passageway 360 should be less than 10 percent of the initial uncompressed volume of gas in the gas chamber 250, when the first piston 220 is in first position, for fully driving the fastener.

Thus the valves, which open quickly, fully and do not have too high volume in the gas passageway, enable driving of the fastener fully into the substrate. Furthermore, a high Cv (flow coefficient of a valve and relates the pressure drop across the valve to the flow through the valve) characteristic and snap action features of valve arrangement 300 with the low volume of gas contained within the gas passageway 360 result in a significant reduction of the compression energy and increases the life of the power source, such as a battery, by 30 percent. The high Cv valve arrangement gives a larger flow of gas through a valve arrangement at a given pressure drop than a low Cv valve arrangement. The configurational features of the valve arrangement 300 in combination with the high Cv results in very fast opening speed and very efficient conversion of the energy of the gas from the gas chamber 250 through the valve arrangement 300 such that the anvil 430 drives the fastener 500 into the substrate 600 in an efficient manner.

After the tipping point 370, the valve retainers 340 only provide a frictional force to the valve spool 320. This frictional force is far less than the direct force afforded by the valve retainers 340 on the valve spool 320. In the embodiment shown, once the retention balls 344 ride up the chamfered portion 326 on the valve spool 320, the force from the retention balls 344 to maintain the valve spool 320 in its position changes from 45 degrees (or the angle of the chamfered portion 326) to 90 degrees, which is perpendicular to the movement of the valve spool 320. This essentially removes the retention balls 344 and the valve retainers 340 from retaining the valve spool 320, as the valve retainers 340 acting perpendicular to the valve spool movement and can no longer restrain the valve spool 320. The only force maintaining the valve spool 320 in the closed position is the force from the valve return spring 350. This is substantially less than the compressed gas pressure that is applied to a face of the valve spool 320, thus the valve spool 320 snaps open.

Figure 4:
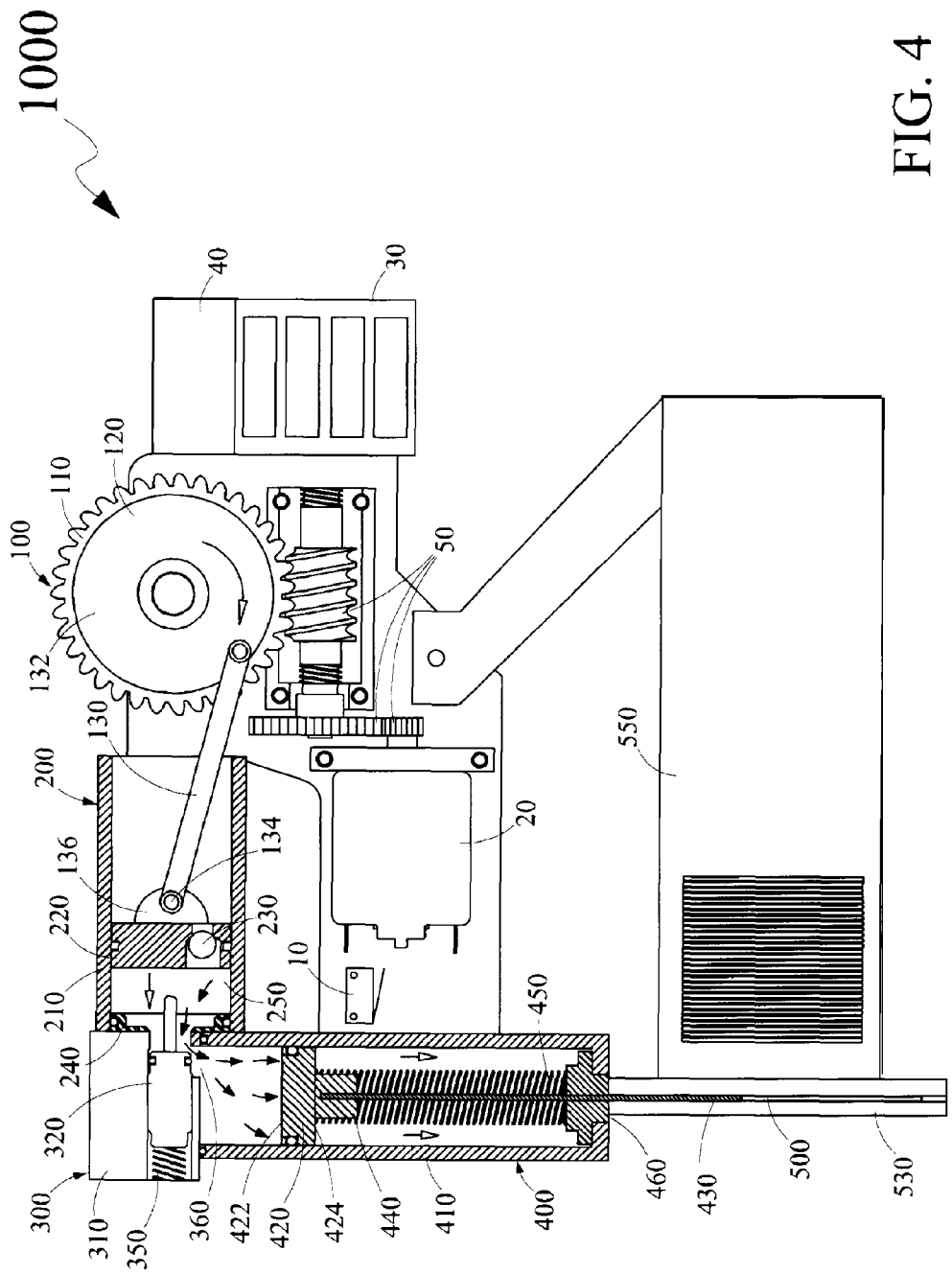
FIG. 4 is longitudinal cross-sectional view of the fastener driving apparatus 1000, illustrating a partially opened valve arrangement 300, according to an exemplary embodiment of the present invention.

The compressed gas in the gas chamber 250 of the first cylinder 200 starts passing into the second cylinder 400 through the gas passageway 360, as shown using arrows in FIG. 4. The compressed gas reaching the second cylinder starts expanding thereby applying pressure on the front face 422 of the second piston 420 which causes the second piston 420 to move axially towards the anvil drive bumper 460. The anvil 430 accordingly moves axially into the fastener guide 530. The anvil retracting mechanism 450 gets compressed, thereby storing energy into the anvil retracting mechanism 450.

Figure 5:
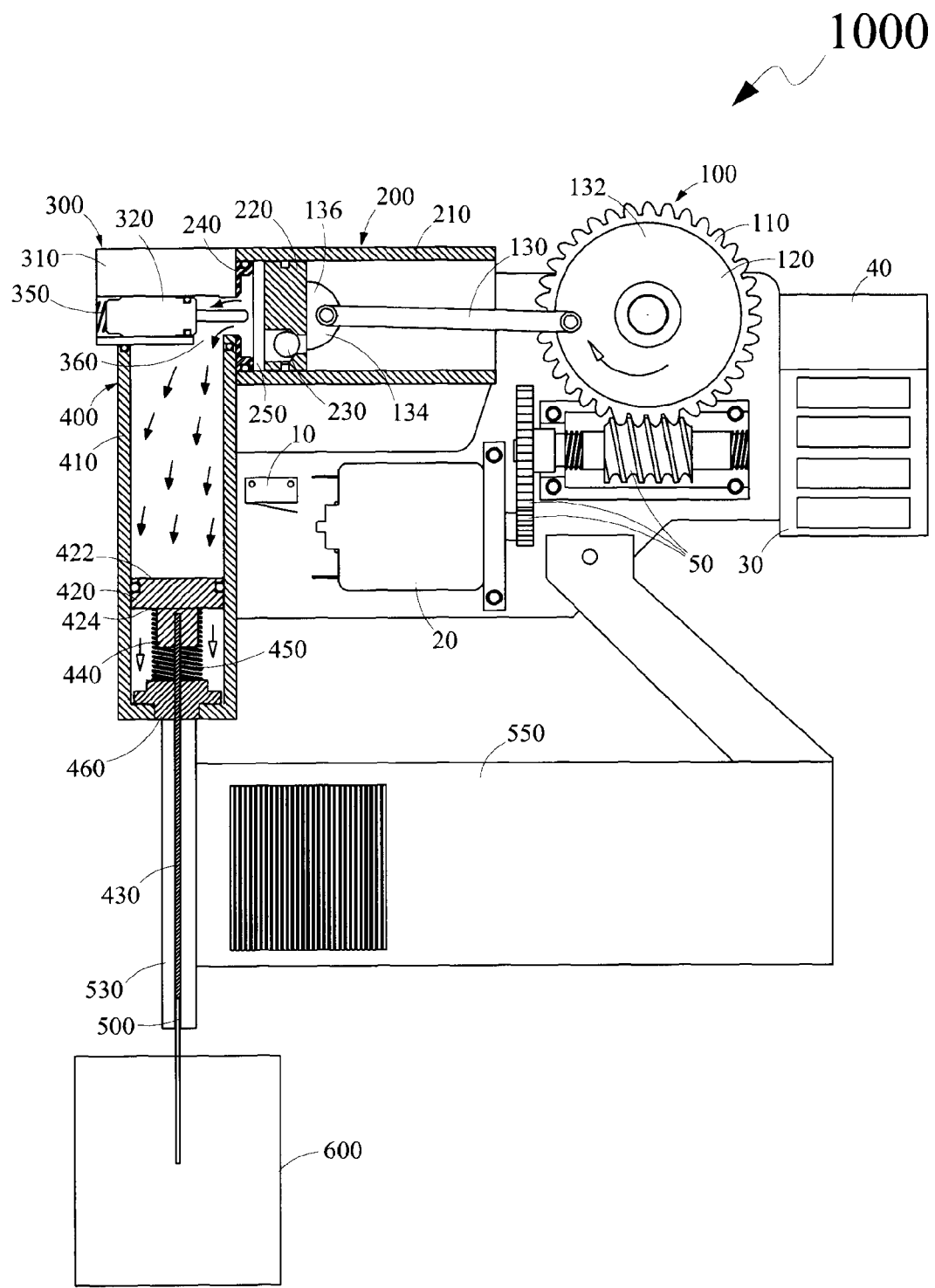
FIG. 5 is longitudinal cross-sectional view of the fastener driving apparatus 1000, illustrating a completely opened valve arrangement 300, according to an exemplary embodiment of the present invention.
Figure 6:
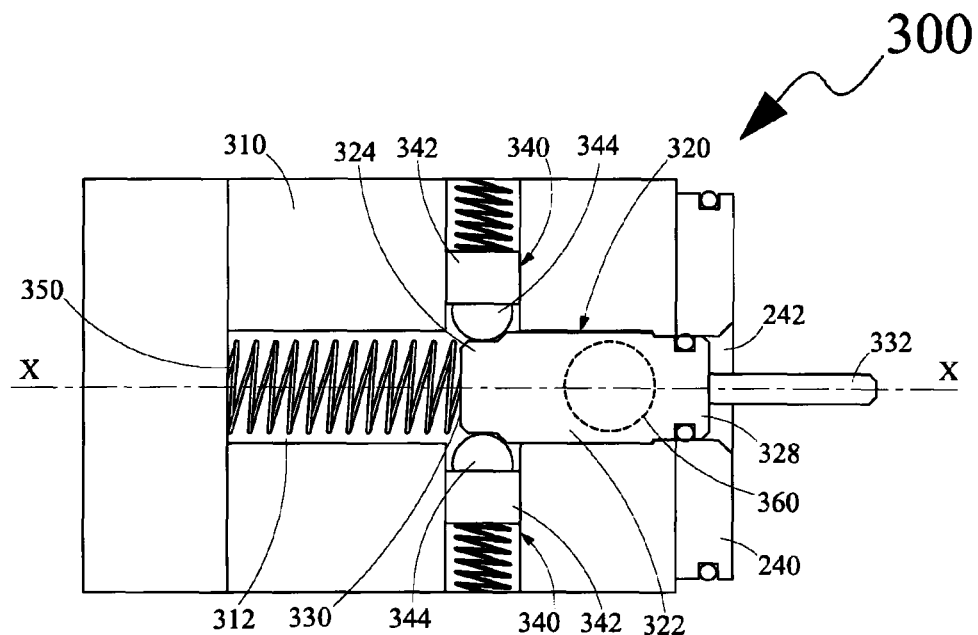
FIG. 6 is a top view of the valve arrangement 300, illustrating an initial closed position of the valve arrangement 300, according to an exemplary embodiment of the present invention.

Referring to FIG. 5, the further continued rotation of the crank wheel 120 causes the first piston 220 to continue proceeding towards the first cylinder end cap 240, thereby forcing the compressed gas in the gas chamber 250 to the second cylinder 400 through the gas passageway 360 which is fully open (see FIG. 8).

In another embodiment of the present invention, the first piston 220 applies pressure on the valve spool stem 332 while proceeding towards the first cylinder end cap 240, thereby causing the valve spool 320 to open up the gas passageway 360 in addition to the compressed gas pressure within the gas chamber 250. The valve spool stem 332 allows the first piston 220 to hold the valve spool 320 open even when the pressure in the gas chamber 250 drops. This further improves the efficiency of the valve arrangement 300 since the valve spool 320 is held open even if the pressure in the gas chamber 250 drops below the pressure required to hold the valve spool 320 open against the restoring force of the valve return spring 350.

Once the valve spool 320 is opened, it is maintained open by the compressed gas pressure from the gas chamber 250 until a force from the compressed gas pressure drops below the restoring force of the valve return spring 350. Finally, with the crank wheel 120 completing the second 180 degrees of rotation, the first piston 220 reaches the first position within the first cylinder 200. This causes the maximum amount of compressed gas in the gas chamber 250 to be delivered to the second cylinder 400 through the gas passageway 360. The compressed gas in the second cylinder 400 expands therein and applies pressure on the second piston 420 causing it to move axially further towards the anvil drive bumper 460. The anvil 430 axially moves further into the fastener guide 530 and applies pressure on the fastener 500 disposed from the fastener feeder 550 into the fastener guide 530. Due to the applied pressure by the anvil 430, the fastener 500 is driven into the substrate 600 such that the fastener driving device 1000 completes a single stroke.

The single stroke compression enables compressing the gas in the gas chamber 250 such that the compression exponent of the gas inside the gas chamber 250 is greater then 1.0. The compression exponent greater than 1.0 yields higher gas pressure for a given compression ratio and increases the volumetric efficiency of the configurational aspect of the fastener driving device 1000 by allowing more energy to be stored in a volume of gas compared to the compression done via a normal multi-stroke compressor in which the heat of compression is lost to the environment. In the present embodiment, the fastener driving apparatus 2000 has an efficient design such that the single stoke operation is sufficiently short (in terms of time) to yield a compression exponent of approximately 1.1.

Upon completion of the stroke, i.e. upon the first piston 220 reaching the first position, a maximum amount of compressed gas is delivered to the second cylinder 400. The pressure inside the gas chamber 250 falls below the pressure applied by the valve return spring 350 which thereby applies pressure on the valve spool 320 causing the valve spool 320 to return to the closed position (i.e. the valve spool 320 is disposed back into the central hollow portion 242 of the first cylinder end cap 240.) Accordingly, with each triggering (i.e., powering of the switch 10), one fastener 500 is punched into the substrate 600. The fastener driving apparatus 1000 is ready for the next operation.

The fastener driving apparatus 1000 further comprises a plurality of sensors (not shown) that aides the control circuit 40 in knowing where exactly is the first piston 220 at certain points in the cycle. The sensors may be placed on the first piston 220, any gear of the gear reduction 50 or on the valve arrangement 300. When the control circuit 40 picks up one of these sensors, the control circuit 40 knows the position of the first piston 220 within the first cylinder 200. In one embodiment, the sensor is placed in the valve arrangement 300 and a magnet (not shown) is disposed on a piston head of the first piston 220. This allows the control circuit 40 to know when the first piston 220 is approaching or leaving the first position (top dead center). When a cycle is underway and upon receiving feedback from a sensor, the control circuit 40 may apply the brake to the motor 20 to stop the operation of the fastener driving apparatus 1000 in a predetermined location.

In yet another embodiment, the fastener driving apparatus 1000 may be coupled with a clutch (not shown). Generally the operation begins with the motor 20 activating, moving the slider crank arrangement 100, firing the valve arrangement 300 and then stopping. If a clutch is used, the motor 20 may be allowed to run continuously. For example, when a nosepiece (i.e., a fastener guide 530) of the fastener driving apparatus 1000 is positioned against the substrate 600, the motor 20 may be started. In this way, energy necessary to drive a fastener into the substrate 600 is in the motor 20 before being transferred to the slider crank arrangement 100.

When the user pulls the start switch (trigger), this engages the clutch, which in turn engages the slider crank arrangement 100. Because the motor is not starting from a "dead stop," energy can be extracted right away and much more quickly. Motors generally have the most power in the midrange of their operating range of revolutions per minute (RPMs). These motors deliver no power at the start (as they are not rotating yet) and are less efficient at lower RPMs than at higher RPMs. If the fastener driving apparatus 1000 is engaged in this fashion, the fastener driving apparatus has a much more responsive feel. For example, by using the fastener driving apparatus 1000 of the present invention, the time from a trigger pull to driving an 18 gage 2" long fastener may be reduced from about 100 milliseconds to about 50 milliseconds while creating a much more responsive tool feel to the professional user.

Referring to FIGS. 10-14, in another embodiment, a longitudinal cross-sectional view of a fastener driving apparatus 2000 incorporating a rack and pinion arrangement 2100 is shown. The fastener driving apparatus 2000 is similar to the configurational aspects of the fastener driving apparatus 1000 and comprises a switch 10; a motor 20; a power source 30; a control circuit 40; a gear reduction mechanism 50; a linear motion converter, for example, a rack and pinion arrangement 2100 in this embodiment; a first cylinder 200; a valve arrangement 300; and a second cylinder 400. The fastener driving apparatus 2000 is capable of driving a fastener 500 into a substrate 600 by utilizing power of a gas compressed within the first cylinder 200. The compressed gas is communicated to the second cylinder 400 through the valve arrangement 300 and enables the compressed gas to expand in the second cylinder 400, thereby applying pressure to the fastener 500 for driving the fastener 500 into the substrate 600.

When a user presses the start switch 10, power from the power source 30 is directed to the motor 20 through the control circuit 40 in a manner such that the motor 20 generates a rotational motion. The rotational motion generated by the motor 20 is communicated to the linear motion converter, which is the rack and pinion arrangement 2100 in this embodiment, using the gear reduction mechanism 50. The gear reduction mechanism 50 comprises a plurality of gears as shown in FIGS. 10-14, and transfers the rotational motion of a shaft (not shown) of the motor 20 to the rack and pinion arrangement 2100. The rack and pinion arrangement 2100 comprises a pinion 2200 coupled to a worm gear 110, each disposed upon the same shaft (not shown), that is coupled to one of the gears of the gear reduction mechanism 50; a rack 2300 coupled to the first piston 220 about a first end portion (not shown) of the rack 2300; a first return spring 2400 coupled to the rack 2300 with a return spring connector 2410 about a second end portion (not shown) of the rack 2300; and a support bearing 2500 positioned between a cylinder guide 210 of the first cylinder 200 and the rack 2300. The rack 2300 may be coupled to the first piston 220 by a variety of mechanisms including, but not limited to, press fitting, screwing, pinning, or the like. In the present embodiment the rack 2300 is coupled to the first piston 220 with a screw 2310. The first return spring 2400 is responsible for retracting the rack 2300 and first piston 220 toward a first position (bottom dead center) of the first cylinder 200. The first return spring 2400 is a constant force spring (similar to a tape measure).

The first return spring 2400 extends when the rack and pinion arrangement 2100 moves towards a second position (top dead center) under the gear reduction mechanism 50 drive. The first return spring 2400 returns the rack 2300 to a first position (bottom dead center) when the pinion 2200 disengages from the rack 2300. The support bearing 2500 supports the rack 2300 against the pinion 2200 and keeps the rack 2300 in alignment with the first piston 220 about the first cylinder 200. The rack 2300 has rack teeth 2324 configured on a partial length on one side of the rack 2300. The pinion 2200 has pinion teeth 2202 configured on a partial length of a circumference of the pinion 2200. With the application of pressure by the support bearing 2500, at least one tooth from the rack teeth 2324 of the rack 2300 mesh with at least one tooth from the pinion teeth 2202 of the pinion 2200.

The first cylinder 200 further comprises a first cylinder end cap 240 towards an end of the first cylinder 200. The first piston 220 defines a gas chamber 250 within the first cylinder 200 and between the first cylinder end cap 240 and the first piston 220. The gas chamber 250 is capable of accommodating gas therein. The first cylinder 200 further comprises a check valve 230 disposed on the first piston 220. The check valve 230 is configured to operate in a manner such that when the check valve 230 is in an open position, the check valve 230 enables the entry of gas into the gas chamber 250 of the first cylinder 200 and when in a closed position, the check valve 230 prevents any exit of gas from the gas chamber 250.

The first cylinder end cap 240 is coupled to the valve arrangement 300. Referring to FIGS. 6-9, the valve arrangement 300 is illustrated in detail. The first cylinder end cap 240 has a central hollow portion 242. The valve arrangement 300 comprises a valve body 310 having a central groove 312 extending along a longitudinal axis X-X of the valve body 310. The central groove 312 conforms to the central hollow portion 242 of the first cylinder end cap 240 at the front end portion, while the rear end portion of the central groove 312 is closed. A valve spool 320 is seated up against the valve body 310 within the central groove 312 along the longitudinal axis X-X and is capable of reciprocating linearly within the central groove 312. In one embodiment, the valve spool 320 has a cylindrical body having a stepped structure configured by a primary body portion 322 and a concentric secondary body portion 324.

The primary body portion 322 has a diameter greater than a diameter of the secondary body portion 324. The primary body portion 322 gradually extends into the secondary body portion 324 in a manner such that the graduation of the primary body portion 322 into the secondary body portion 324 configures a chamfered portion 326 (see FIG. 8). The valve spool 320 reciprocates within the central grove 312 of the valve body 310 along the longitudinal axis X-X. The valve spool 320 further has a front face portion 328, a rear face portion 330 and a valve spool stem 332 extending outwardly from the front face portion 328 along a longitudinal axis of the valve spool 320. In an initial state, the front face portion 328 is positioned in the central hollow portion 242 of the first cylinder end cap 240 in a manner such that the front face portion 328 closes the central hollow portion 242, while the valve spool stem 332 extends into the gas chamber 250 of the first cylinder 200.

The valve arrangement 300 further comprises a pair of valve retainers 340 positioned in an opposed relationship laterally along the central groove 312 of the valve body 310. In one embodiment, each valve retainer 340 is in the form of a cup 342 and retention ball 344. In the initial state, when the valve spool 320 is closing the central hollow portion 242 of the first cylinder end cap 240, the valve spool 320 is retained in such a position by the valve retainers 340. The valve retainers 340 are positioned in a manner such that the retention balls 344 are disposed at the chamfered portion 326 of the valve spool 320, thereby applying pressure on the valve spool 320 and preventing the valve spool 320 to deviate from the position closing the central hollow portion 242 of the first cylinder end cap 240.

Additionally, the valve arrangement 300 comprises a valve return spring 350 disposed within the central groove 312 and towards the rear end portion of the central groove 312. The rear face portion 330 of the valve spool 320 is disposed on the valve return spring 350. The valve arrangement 300 further comprises a gas passageway 360 configured from the central groove 312 of the valve arrangement 300 and connected to the second cylinder 400. In the initial state, when the front face portion 328 of the valve spool 320 is disposed on the central hollow portion 242, the primary body portion 322 closes the gas passageway 360. The gas passageway 360 is configured to define a duct for communicating the gas from the gas chamber 250 of the first cylinder 200 to the second cylinder 400.

The second cylinder 400 comprises a cylinder guide 410 and a second piston 420 disposed there within. The second piston 420 has a front face 422 and a rear face 424. The rear face 424 of the second piston 420 is coupled to an anvil 430 using a connector 440. The anvil 430 extends along a longitudinal axis of the second cylinder 400 into a fastener guide 530. The anvil 430 is capable of linearly moving through the second cylinder 400 and the fastener guide 530. The fastener guide 530 is configured to receive a fastener 500 from a fastener feeder 550 and the linearly moving anvil 430 is capable of applying pressure to the fastener 500 in the fastener guide 530. The second cylinder 400 further comprises an anvil retracting mechanism (return spring) 450 and an anvil drive bumper 460. Additionally, the linear movement of the anvil 430 through the fastener guide 530 enables in jamb clearing. Such a jamb clearing removes the fastener fragments or other debris inside the fastener guide 530 with the linear movement of the anvil 430 through the fastener guide 530 and thereby avoids the need of any manual operation for cleaning the fastener guide 530.

The anvil drive bumper 460 is disposed at an end of the second cylinder 400 away from an end having the valve arrangement 300. The anvil retracting mechanism 450 is coupled to the rear face 424 of the second piston 420 at one end and to the anvil drive bumper 460 at another end. In a situation when the second cylinder 400 has not received the compressed gas from the first cylinder 200, the second piston 420 is positioned towards the valve arrangement 300 and the anvil retracting mechanism 450 is in a relaxed position i.e. the anvil retracting mechanism 450 is not compressed. Such a position is also referred to as the load-free position. The anvil retracting mechanism 450 is configured to retract the second piston 420 back to an original position towards the valve arrangement 300.

More specifically, FIG. 10 shows a longitudinal cross-sectional view of the fastener driving apparatus 2000, illustrating the rack and pinion arrangement 2100 in a first position. The first position as used herein refers to the position of the first piston 220 at bottom dead center and the first piston 220 is near to the support bearing 2500 with the check valve 230 being closed. In the first position, the gas chamber 250 is occupied with a volume of gas proportional to the amount of work to be done by the first piston 220 within the first cylinder 200, for example, the amount of work required for driving an 18 gage 2" long fastener. In one embodiment, the volume of the gas in the gas chamber 250 ranges from 6 to 9 $in^3$ at standard temperature and pressure conditions and, more preferably, 7 $in^3$. Preferably, the gas used is the atmospheric air at atmospheric pressure which thereby simplifies the design of the fastener driving apparatus 2000, as using air greater than atmospheric pressure might otherwise require another pre-compressor to increase the pressure of the air inside the gas chamber 250.

In the first position of the rack and pinion arrangement 2100, when the start switch 10 is switched ON, power is directed from the power source 30 to the motor 20 through the control circuit 40. The control circuit 40 may be any apparatus for connecting power to the motor 20 for the purpose of initiating the operation of the fastener driving apparatus 2000 and then removing the power to the motor 20 after the operation of the fastener driving apparatus 2000 has substantially completed. The first return spring 2400 is in a relaxed position, when the first piston 220 and the rack 2300 are at the first position and are about to move from the first position of the first cylinder 200 towards a second position. The second position as used herein refers to the position of the first piston 220 at top dead center towards the first cylinder end cap 240 of the first cylinder 200. In one embodiment, the first return spring 2400 is a constant force spring, similar to a spring used in tape measuring devices.

Referring now to FIG. 11, illustrated is a longitudinal cross-sectional view of the fastener driving apparatus 2000, incorporating the rack and pinion arrangement 2100 in an intermediate position of the first piston 220 between the first position and the second position. On receiving power from the power source 30, the motor 20 directs the shaft (not shown) to rotate, transferring energy through the gear reduction 50 and worm gear 110 to the rack and pinion arrangement 2100 of the fastener driving apparatus 2000. More specifically, the worm gear 110 (coupled to the pinion 2200) rotates the pinion 2200 such that the teeth of the pinion 2200 mesh with the teeth in the rack 2300. With the counterclockwise rotation of the pinion 2200 (using the rotation of the motor 20 and the gear reduction mechanism 50) the rack 2300 that is in mesh with the pinion 2200 begins to move linearly causing the first piston 220 to move linearly within the first cylinder 200 towards the second position. At the intermediate position the air inside the gas chamber 250 of the first cylinder 200 is compressed with a linear forward motion of the first piston 220 and rack 2300. The linear forward motion of the first piston 220 and rack 2300 is the movement of the first piston 220 and rack 2300 from the first position of the first piston 220 towards the second position of the first piston 220.

The rack 2300 further has a toothless portion 2320 such that one or more teeth substantially removed behind the initial engagement teeth 2322 of the rack 2300. The toothless portion 2320 is responsible for improving the alignment/engagement tolerance for the engagement between the rack 2300 and the pinion 2200 when the pinion teeth 2202 of the pinion 2200 start meshing with the rack teeth 2324 of the rack 2300. The toothless portion 2320 improves the wear characteristics for the pinion teeth 2202 of the pinion 2200 and the rack teeth 2324 of the rack 2300. This configuration increases the engagement tolerance of the pinion 2200 to the rack 2300 by more than 50 percent, thereby greatly reducing the likelihood that the pinion teeth 2202 of the pinion 2200 and the rack teeth 2324 of the rack 2300 mesh in an interfering fashion.

More particularly, when an initial engagement tooth 2222 of the pinion 2200 comes around to engage the initial engagement teeth 2322 of the rack 2300 and there is misalignment between the position of the initial engagement teeth 2322 of the rack 2300 with respect to the initial engagement tooth 2222 of the pinion 2200, there may be a possibility that the initial engagement tooth 2222 may hit the rack teeth 2324 of the rack 2300 instead of hitting the initial engagement teeth 2322 of the rack 2300 which results in improper engaging and meshing. Thus, the toothless portion 2320 is responsible for more tolerance when the pinion teeth 2202 mesh with the rack teeth 2324.

By limiting the teeth at a back end of the rack 2300, the rack 2300 cannot be driven forward enough to advance the first piston 220 into the first cylinder end cap 240. If there were enough teeth on the rack 2300, and the rack and pinion arrangement 2100 engaged in the wrong spot for example, then the first piston 220 could be driven through impact of the first cylinder end cap 240 and cause potential damage to the fastener driving apparatus 2000. Accordingly, even if there were more teeth on the pinion 2200, it may not force the rack 2300 and the first piston 220 forward. Therefore, even if the pinion 2200 does not engage properly, the worst it may do is to move against the last tooth of the rack 2300, but it may not advance the rack 2300 and the first piston 220 to impact the face of the valve arrangement 300.

Further, in the intermediate position of the first piston 220, the movement of the rack 2300 along with the first piston 220 towards the valve arrangement 300 compresses the gas in the gas chamber 250 and stretches the relaxed first return spring 2400. The gas in the gas chamber 250 is held between the first piston 220 and the first cylinder end cap 240 until the valve arrangement 300 opens. During this cycle, the check valve 230 is in the closed position, preventing any exit of gas from the gas chamber 250. The first piston 220 continuously compresses the gas in the gas chamber 250 while moving towards the first cylinder end cap 240. In this stage the valve spool 320 is also disposed in the central hollow portion 242 of the first cylinder end cap 240 in a manner such that the valve spool 320 closes the central hollow portion 242 and the gas passageway 360 is also closed. Such a position of the valve arrangement 300 is more specifically illustrated, in FIG. 6, wherein the valve retainers 340 and specifically the retention balls 344 are disposed at the chamfered portion 326 of the valve spool 320. Such a positioning of the retention balls 344 applies pressure on the valve spool 320 and prevents the valve spool 320 to deviate from the position closing the central hollow portion 242 of the first cylinder end cap 240.

Referring now to FIG. 12, illustrated is a longitudinal cross-sectional view of the fastener driving apparatus 2000, incorporating the rack and pinion arrangement 2100 and depicting a partially opened valve arrangement 300. The valve arrangement 300 opens either when the gas pressure inside the gas chamber 250 exceeds the maintaining force of the valve spool 320 of the valve arrangement 300 or when the first piston 220 strikes the valve spool stem 332 of the valve spool 320. The valve arrangement 300 remains open with the gas pressure from the gas chamber 250 until the force of the gas pressure drops below the restoring force of the valve return spring 350 and the valve spool stem 332 no longer is in contact with the first piston.

In the above mentioned condition, when the valve arrangement 300 is partially open, the further movement of the pinion 2200, the rack 2300 and the first piston 220 move linearly forward towards the second position. Such a movement of the rack 2300 along with the first piston 220 towards the valve arrangement 300 (i.e. the second position) compresses the air inside the gas chamber 250. Accordingly, the pressure inside the gas chamber 250 increases to an extent that the pressure of the gas in the gas chamber 250 exceeds the pressure applied by the valve retainers 340 and the valve return spring 350 on the valve spool 320. In such a situation, the gas inside the gas chamber 250 pushes the valve spool 320 to move linearly inside the central groove 312 of the valve body 310 such that, the valve spool 320 opens central hollow portion 242. The position of the valve arrangement in this situation may be more specifically referred to in FIG. 7, when the valve spool 320 opens the central hollow portion 242, and the retention balls 344 cross a tipping point 370. The tipping point 370, as used herein, refers to a point of contact between the retention balls 344 and the valve spool 320, when the valve retainers 340 and the retention balls 344 provide minimal resistance to the linear movement of the valve spool 320, thereby resulting in an opening of the gas passageway 360.

At the tipping point 370, the retention balls 344 provide minimal resistance to the linear movement of the valve spool 320, thereby resulting in an opening of the gas passageway 360. This enables the compressed gas within the gas chamber 250 to be released into the second cylinder 400 through the valve arrangement 300 and, more specifically, through the gas passageway 360. In another embodiment of the present invention, the first piston 220 applies pressure on the valve spool stem 332 while proceeding towards the first cylinder end cap 240, thereby causing the valve spool 320 to open up the gas passageway 360 in addition to the compressed gas pressure within the gas chamber 250. The valve spool stem 332 allows the first piston 220 to hold the valve spool 320 open even when the pressure in the gas chamber 250 drops. Thus, the valve spool stem 332 improves the efficiency of the valve arrangement 300 since the valve spool 320 is held open even if the pressure in the gas chamber 250 drops below the pressure required to hold the valve spool 320 open against the restoring force of the valve return spring 350.

A further advantage of the valve spool stem 332 is that the valve spool stem 332 avoids allowing the valve spool 320 to remain in a closed position. Suppose the valve spool 320 remained closed during a cycle and the pinion 2200 has released the rack 2300, the rack 2300 and first piston 220 would be thrown violently towards support bearing 2500, since the pressure of the gas inside the gas chamber 250 would have increased and the first return spring 2400 would pull the rack 2300 and the first piston 220 towards the support bearing 2500 and thereby causing a potential damage to the fastener driving apparatus 2000.

The compressed gas reaching the second cylinder starts expanding, thereby applying pressure on the front face 422 of the second piston 420 which causes the second piston 420 to move axially towards the anvil drive bumper 460. The anvil 430 accordingly moves axially into the fastener guide 530. The anvil retracting mechanism 450 gets compressed thereby storing energy into the anvil retracting mechanism 450. In this position, when the releasing of compressed gas into the second cylinder 400 occurs, the pinion teeth 2202 of the pinion 2200 still have good engagement with the rack teeth 2324 of the rack 2300. The engagement of the pinion teeth 2202 of the pinion 2200 and the rack teeth 2324 of the rack 2300, in the linear forward motion of the rack 2300 and the first piston 220 provides higher contact ratio between the pinion 2200 and the rack 2300. This higher contact ratio provides the advantage of substantially reducing the wear on the pinion teeth 2202 of the pinion 2200 and the rack teeth 2324 of the rack 2300. The pinion 2200 and the rack 2300 maintain a contact ratio of approximately greater then 0.1 until the valve arrangement 300 releases the compressed air into the second cylinder 400.

The movement of the first piston 220 creates the timing for opening of the valve spool 320 of the valve arrangement 300. The first piston 220 pushes the valve spool 320 to open the valve arrangement 300 before the first piston 220 reaches the first position (top dead center). The advantage of opening of the valve arrangement 300 while the first piston 220 is still advancing is that the pressure in the gas chamber 250 cannot force the first piston 220 back. Additionally, if the valve arrangement 300 opens too early, the pressure offered by the gas chamber 250 would be insufficient pressure to drive the second piston 420 for driving the fastener 500 into the substrate 600. Furthermore, if the valve arrangement 300 opens too late, the rack 2300 and first piston 220 starts to return before the anvil 430 drives the fastener 500 into the substrate 600, such that the energy for driving the fastener 500 is lost since the return of the rack 2300 and the first piston 220 allows the gas to expand back into the gas chamber 250.

The opening of the valve arrangement 300 on sufficiently compressing the air in the gas chamber 250 includes several parameters that are important for the configurational features of the valve arrangement 300. The parameters are the pressure drop through the valve arrangement 300, the opening time of the valve arrangement 300 and the volume of air contained in gas passageway 360. The valve arrangement 300 in this embodiment is a snap acting valve having an opening speed of less than 20 milliseconds from initial cracking to greater then substantially 70 percent of full flow. The opening time of the valve arrangement 300 is met by applying an opening force of approximately a minimum of 1.5 to 2 times of the force required to maintain valve arrangement 300 and more specifically when the valve spool 320 in the closed position.

As used herein, the opening force is the force applied by the compressed gas of the gas chamber 250 to open the valve arrangement 300. In one embodiment, the opening force that may drive a standard 18 gage 2" long fastener, for example, a nail, fully into pine substrate is the force when the gas in the gas chamber 250 is compressed to approximately 160 psi with a volume of approximately 1.0 cubic inch. The volume of gas contained in gas passageway 360 should be less than 10 percent of the initial uncompressed volume of gas in the gas chamber 250, when the first piston 220 is in first position, for fully driving the fastener.

Accordingly, the valves, which open quickly, fully and do not have too high volume in the gas passageway, enable driving of the fastener fully into the substrate. Furthermore, a high Cv (flow coefficient of a valve and relates the pressure drop across the valve to the flow through the valve) characteristic and snap action features of valve arrangement 300 with the low volume of gas contained within the gas passageway 360 result in a significant reduction of the compression energy and increase the life of the power source, such as a battery, by 30 percent. The high Cv valve arrangement gives a larger flow of gas through a valve arrangement at a given pressure drop than a low Cv valve arrangement. The configurational features of the valve arrangement 300 in combination with the high Cv results in very fast opening speed and very efficient conversion of the energy of the gas from the gas chamber 250 through the valve arrangement 300 such that the anvil 430 drives the fastener 500 into the substrate 600 in an efficient manner.

In one embodiment of the present disclosure, the valve spool 320 weighs approximately 1 oz, a valve return spring 350 is compressed to approximately 3 lbs, and valve retainers 340 result in an opening force of approximately 24 lbs. The front face portion 328 of the valve spool 320 has a diameter approximately 0.437 in. The internal pressure in the gas chamber 250 upon reaching approximately 160 psi, results in a force of 24 lbs on the diameter of the front portion 328 of the valve spool 320. This moves the valve spool 320 past the tipping point 370 (a displacement of approximately 0.06 inches) at which the maintaining force (less than 24 lbs) drops to 3 lbs. The tipping point is clearly shown in FIG. 7 in which the o-ring (not shown) on the valve spool 320 has not moved past the gas passageway 360 thus leaving the gas under compression in the gas chamber 250. The o-ring is an elastomeric element that functions as a sealing member to allow clearance between the valve spool 320 and the valve body 310. The opening force on the valve spool 320 is approximately 21 lbs. The additional stroke of the valve spool 320 to the fully open position shown in FIG. 8 is 0.5 inches. This distance is traversed in less then approximately 5 milliseconds, resulting in nearly instantaneous communication of the compressed gas in the gas chamber 250 through the gas passageway 360 and to the second cylinder 400.

Referring now to FIG. 13, illustrated is a longitudinal cross-sectional view of the fastener driving apparatus 2000, incorporating the rack and pinion arrangement 2100 and depicting a completely opened valve arrangement 300. The further continued rotation of the pinion 2200 causes the rack 2300 and the first piston 220 to continue proceeding towards the first cylinder end cap 240 and forcing the gas in the gas chamber 250 to the second cylinder 400 through the gas passageway 360, which is fully open (See FIG. 8). This causes the maximum amount of compressed gas in the gas chamber 250 to be delivered to the second cylinder 400 through the gas passageway 360. The compressed gas in the second cylinder 400 expands therein and further applies pressure on the second piston 420 causing it to move axially further towards the anvil drive bumper 460. The anvil 430 further moves axially into the fastener guide 530 and applies pressure on the fastener 500 disposed from the fastener feeder into the fastener guide 530. Due to the applied pressure by the anvil 430, the fastener 500 is punched into the substrate 600.

Once the rack and pinion arrangement 2100 reaches the second position, the fastener driving apparatus 2000 almost completes a single stroke. The single stroke compression enables compressing the gas in the gas chamber 250 such that the compression exponent of the air inside the gas chamber 250 is greater than 1. The compression exponent greater than 1 yields higher gas pressure for a given compression ratio and increases the volumetric efficiency of the configurational aspect of the fastener driving apparatus 2000 by allowing more energy to be stored in a volume of gas compared to the compression done via a normal multi-stroke compressor in which the heat of compression is lost to the environment. In the present embodiment, the fastener driving apparatus 2000 has an efficient design such that the single stoke operation is sufficiently short (in terms of time) to yield a compression exponent of approximately 1.1. Further, in the second position the first return spring 2400 is stretched (energized) completely due to the further forward linear motion of the rack and pinion arrangement 2100.

Upon completion of the stroke (i.e. the first piston 220 reaching the first position) a maximum amount of compressed gas is delivered to the second cylinder 400. Thereafter, the pressure inside the gas chamber 250 falls below the pressure applied by the valve return spring 350 which thereby applies pressure on the valve spool 320 causing the valve spool 320 to return to the closed position. That is, the valve spool 320 is disposed back into the central hollow portion 242 of the first cylinder end cap 240. This is illustrated in FIG. 14, wherein a longitudinal cross-sectional view of the fastener driving apparatus 2000, incorporating the rack and pinion arrangement 2100 and depicting the closure of the valve arrangement 300, is shown. The rack 2300 and the first piston 220 moves linearly from the second position towards the first position by the pull exerted by the first return spring 2400. In this situation, check valve 230 on the first piston 220 opens for intake of the gas into the gas chamber 250 of the first cylinder 200. During the closure of the valve arrangement 300, the second piston 420 also retracts to an original position towards the valve arrangement 300. The anvil 430 coupled to the second piston 420 is also retracted back from the fastener guide 530. More specifically, the first position, the second position, and the return to the first position of the rack and pinion arrangement 2100 constitute a single cycle of operation for the fastener driving apparatus 2000.

The fastener driving apparatus 2000 further comprises a plurality of sensors, i.e. a pinion sensor (not shown), that aides the control circuit 40 in knowing where exactly is the first piston 220 at certain points in the cycle. Further, a rack sensor (not shown) enables the control circuit 40 in knowing the starting position of the first piston 220 and that the rack and pinion arrangement 2100 is ready for another cycle. The sensors may also be placed on the first piston 220, any gear or of the gear reduction 50 or on the valve arrangement 300. When the control circuit 40 picks up one of these sensors, the control circuit 40 knows the position of the first piston 220 within the first cylinder 200. In this embodiment, when the rack teeth 2324 of the rack 2300 disengage from the pinion teeth 2202 of the pinion 2200, a sensor (not shown) detects the disengagement of the teeth with the help of a magnet 2600 disposed on the pinion 2200, such that the control circuit 40 turns off the power source 30. The backward motion of the rack 2300 towards the bumper 2700 preferably is detected by using an additional sensor (not shown) such that the sensor marks the completion of a cycle and ready for another cycle.

Further, the disengagement of the rack 2300 and the pinion 2200 move the rack and pinion arrangement 2100 backward. The backward motion of the rack and pinion arrangement 2100 is movement of the first piston 220 from the second position towards the first position. More specifically, the first return spring 2400 enables backward movement of the rack and pinion arrangement 2100. The first return spring 2400 does not play a direct part in the compression of the air in the gas chamber 250 and has a size such that the total energy of the first return spring 2400 is less then approximately 15 percent of the energy required to drive the fastener 500. In this embodiment, the first return spring 2400 is designed to have total return energy of approximately 0.5 ft lbs on the first piston 220. The first return spring 2400 is preferably a constant force spring located external to the first cylinder 200. The constant force provides more stability and better position control of the rack 2300 during the cycle.

In the backward movement of the rack and pinion arrangement 2100, gas is allowed to enter the first cylinder 200 rapidly with the help of check valve 230. More specifically, the air pushes the check valve ball away from the sealed position and flows through the check valve 230 replenishing the gas chamber 250. The amount/volume of air intake into the gas chamber 250 should be proportional to the amount of work to be done by the rack and pinion arrangement 2100, for example, amount of work/energy required for driving an 18 gage nail.

Furthermore, the excess energy from the rack 2300 is absorbed by the bumper 2700 disposed at an end of the first return spring 2400. The bumper 2700 absorbs the kinetic energy caused by the backward motion of the rack 2300. The bumper 2700 may be preferably made from an elastomer. The check valve 230 remains open till the time the pressure in the gas chamber 250 is less then the outside atmospheric pressure and closes when pressure in the gas chamber 250 increases more than the outside atmospheric pressure. The intake of gas into the gas chamber 250 continues until the first piston 220 is about to reach the first position. Once the first piston 220 reaches the first position within the first cylinder 200 the amount/volume of air intake into the gas chamber 250 is proportional to the amount of work to be done and the fastener driving apparatus 2000 is ready for the next cycle of operation.

In yet another embodiment, the fastener driving apparatus 2000 may be coupled with a clutch (not shown). Generally the operation begins with the motor 20 starting to rotate, moving the rack and pinion arrangement 2100, firing the valve arrangement 300 and then stopping. If a clutch is used, the motor 20 may be allowed to run continuously. For example, when a nosepiece (i.e., a fastener guide 530) of the fastener driving apparatus 2000 is positioned against the substrate 600, the motor 20 may be started. In this way, all the energy needed is in the motor 20 before transferred to the rack and pinion arrangement 2100. When the user pulls the start switch (trigger), this engages the clutch which engages the rack and pinion arrangement 2100. Because the motor is not starting from a "dead stop," energy can be extracted right away and much more quickly. Motors generally have the most power in the midrange of their operating range of revolutions per minute (RPMs). These motors deliver no power at the start (as they are not rotating yet) and are less efficient at lower RPMs than at higher RPMs. If the fastener driving apparatus 2000 is engaged in this fashion, the fastener driving apparatus 2000 has a much more responsive feel. For example, by using the fastener driving apparatus 2000 of the present invention, the time from a trigger pull to driving an 18 gage fastener may be reduced from about 100 milliseconds to about 50 milliseconds while creating a much more responsive tool feel to the professional user.

Referring to FIGS. 15-19, in yet another embodiment, the present invention provides a more compact and ergonomic fastener driving apparatus. The fastener driving apparatus in this embodiment configures a compression cylinder placed parallelly along an expansion cylinder with a valve arrangement disposed over the compression cylinder and the expansion cylinder. The valve arrangement is disposed in a manner such that the valve arrangement acts as a medium for communicating gas between the compression cylinder and the expansion cylinder.

FIGS. 15-19, show a longitudinal cross-sectional view of a fastener driving apparatus 3000 illustrating a crankshaft and connecting rod arrangement 3100. The fastener driving apparatus 3000 comprises a switch 10; a motor 20; a power source 30; a control circuit 40; a gear reduction mechanism 50; a linear motion converter, for example a crankshaft and connecting rod arrangement 3100 in this embodiment; a first cylinder 200; a valve arrangement 300 and a second cylinder 400. As used herein, the first cylinder 200 is the compression cylinder wherein a gas is compressed and the second cylinder 400 is the expansion cylinder wherein the compressed gas is allowed to expand. The fastener driving apparatus 3000 is capable of driving a fastener 500 into a substrate 600 by utilizing power of a gas compressed within the first cylinder 200. The compressed gas is communicated to the second cylinder 400 through the valve arrangement 300 and enables the compressed gas to expand in the second cylinder 400, thereby applying pressure to the fastener 500 for driving the fastener 500 into the substrate 600.

When a user presses the start switch 10, power from the power source 30 is directed to the motor 20 through the control circuit 40 in a manner such that the motor 20 generates a rotational motion. The rotational motion generated by the motor 20 is communicated to the linear motion converter, which is the crankshaft and connecting rod arrangement 3100 in this embodiment, using the gear reduction mechanism 50. The gear reduction mechanism 50 comprises a plurality of gears (not shown) that transfers the rotational motion of a shaft (not shown) of the motor 20 to the crankshaft and connecting rod arrangement 3100. The crankshaft and connecting rod arrangement 3100 comprises a crankshaft 3200 and a connecting rod 3300 coupled to the crankshaft 3200 (See FIGS. 15A-19A). The crankshaft 3200 comprises a first portion 3210, a middle portion 3220 and a second portion 3230. The first portion 3210, the middle portion 3220 and the second portion 3230 are configured in a manner such that the configuration constitutes a 'U' shaped structure. The crankshaft 3200 is coupled to the connecting rod 3300 about the middle portion 3220.

The crankshaft 3200 is further coupled to a body 3400 of the fastener driving apparatus 3000 about the first portion 3210 of the crankshaft 3200 and to the gear reduction mechanism 50 about the second portion 3230 of the crankshaft 3200. The connecting rod 3300 has a first end portion (not shown) coupling the first piston 220 using a connector 3310 and a second end portion (not shown) coupling the middle portion 3220 of the crankshaft 3200. More specifically, the first portion 3210 and the second portion 3230 have a horizontal protruding members (not shown) which are responsible for the coupling of the first portion 3210 with the body 3400 of the fastener driving apparatus 3000 and the second portion 3230 with the gear reduction mechanism 50. Further, one of the gears of the gear reduction mechanism 50 is coupled to the second portion 3230 of the crankshaft 3200 for transmitting the rotational motion generated by the motor 20 to the crankshaft and connecting rod arrangement 3100 which enables the movement of the crankshaft and connecting rod arrangement 3100 for the operation of the fastener driving apparatus 3000.

The first cylinder 200 comprises a cylinder guide (not shown) and a first piston 220 disposed therein. The first piston 220 is coupled to connecting rod 3300 in a manner, such that, the rotational motion of the crankshaft 3200 is converted to linear reciprocal motion of the first piston 220 within the first cylinder 200. The first cylinder 200 further comprises a first cylinder end cap 240 towards an end of the first cylinder 200. The first piston 220 defines a gas chamber 250 within the first cylinder 200 and between the first cylinder end cap 240 and the first piston 220. The gas chamber 250 is capable of accommodating gas therein. The first cylinder 200 further comprises check valves 230 and 232 disposed on the first piston 220. The check valves 230 and 232 are configured to operate in a manner such that when the check valves 230 and 232 are in an open position, the check valves 230 and 232 enables the entry of gas into the gas chamber 250 of the first cylinder 200 and when in a closed position, the check valves 230 and 232 prevents any exit of gas from the gas chamber 250. Additionally, the first piston 220 is disposed with a magnet 3500. A sensor 3600 disposed on the valve arrangement 300 in combination with the magnet 3500 enables in knowing the various positions of the first piston 220 in the first cylinder 200 during the reciprocal movement of the first piston 220.

The first cylinder end cap 240 is coupled to the valve arrangement 300. Referring to FIGS. 6-9, the valve arrangement 300 is illustrated in detail. The first cylinder end cap 240 has a central hollow portion 242. The valve arrangement 300 comprises a valve body 310 having a central groove 312 extending along a longitudinal axis X-X of the valve body 310. The central groove 312 conforms to the central hollow portion 242 of the first cylinder end cap 240 at the front end portion, while the rear end portion of the central groove 312 is closed. A valve spool 320 is seated up against the valve body 310 within the central groove 312 along the longitudinal axis X-X and is capable of reciprocating linearly within the central groove 312. In one embodiment, the valve spool 320 has a cylindrical body having a stepped structure configured by a primary body portion 322 and a concentric secondary body portion 324.

The primary body portion 322 has a diameter greater than a diameter of the secondary body portion 324. The primary body portion 322 gradually extends into the secondary body portion 324 in a manner such that the graduation of the primary body portion 322 into the secondary body portion 324 configures a chamfered portion 326 (see FIG. 8). The valve spool 320 reciprocates within the central groove 312 of the valve body 310 along the longitudinal axis X-X. The valve spool 320 further has a front face portion 328, a rear face portion 330 and a valve spool stem 332 extending outwardly from the front face portion 328 along a longitudinal axis of the valve spool 320. In an initial closed position, the front face portion 328 is positioned in the central hollow portion 242 of the first cylinder end cap 240 in a manner, such that, the front face portion 328 closes the central hollow portion 242, while the valve spool stem 332 extends into the gas chamber 250 of the first cylinder 200.

The valve arrangement 300 further comprises a pair of valve retainers 340 positioned in an opposed relationship laterally along the central groove 312 of the valve body 310. In one embodiment, each valve retainer 340 is in the form of a cup 342 and retention ball 344. In the initial closed position, when the valve spool 320 is closing the central hollow portion 242 of the first cylinder end cap 240, the valve spool 320 is retained in such a position by the valve retainers 340. The valve retainers 340 are positioned in a manner such that the retention balls 344 are disposed at the chamfered portion 326 of the valve spool 320, thereby applying pressure on the valve spool 320 and preventing the valve spool 320 to deviate from the position closing the central hollow portion 242 of the first cylinder end cap 240.

Additionally, the valve arrangement 300 comprises a valve return spring 350 disposed within the central groove 312 and towards the rear end portion of the central groove 312. The rear face portion 330 of the valve spool 320 is disposed on the valve return spring 350. The valve arrangement 300 further comprises a gas passageway 360 configured from the central groove 312 of the valve arrangement 300 and connected to the second cylinder 400. In the initial closed position, when the front face portion 328 of the valve spool 320 is disposed on the central hollow portion 242, the primary body portion 322 closes the gas passageway 360. The gas passageway 360 is configured to define a duct for communicating the gas from the gas chamber 250 of the first cylinder 200 to the second cylinder 400.

The second cylinder 400 comprises a cylinder guide 410 and a second piston 420 disposed there within. The second piston 420 has a front face 422 and a rear face 424. The rear face 424 of the second piston 420 is coupled to an anvil 430 using a connector 440. The anvil 430 extends along a longitudinal axis of the second cylinder 400 into a fastener guide 530. The anvil 430 is capable of linearly moving through the second cylinder 400 and the fastener guide 530. The fastener guide 530 is configured to receive the fastener 500 from a fastener feeder 550 and the linearly moving anvil 430 is capable of applying pressure to the fastener 500 in the fastener guide 530.

The second cylinder 400 further comprises an anvil retracting mechanism (return spring) 450 and an anvil drive bumper 460. The anvil drive bumper 460 is disposed at an end of the second cylinder 400 away from an end having the valve arrangement 300. The anvil retracting mechanism 450 is coupled to the rear face 424 of the second piston 420 at one end and to the anvil drive bumper 460 at another end. In a situation when the second cylinder 400 has not received the compressed gas from the first cylinder 200, the second piston 420 is positioned towards the valve arrangement 300 and the anvil retracting mechanism 450 is in a relaxed position i.e. the anvil retracting mechanism 450 is not compressed. Such a position is also referred to as the load-free position. In another embodiment, the anvil retracting mechanism comprises a bungee retraction (not shown), whereby the bungee is attached to the front face 422 of the second piston 420 and to the end of the second cylinder 400 that has the valve arrangement 300. In yet another embodiment of the present invention, the retraction of the anvil may be accomplished by air power in the manner employed by standard pneumatic nailers.

Referring now to FIG. 15, illustrated is a longitudinal cross-sectional view of the fastener driving device 3000, incorporating the crankshaft and connecting rod arrangement 3100 moving from a first position (top dead center) to a second position (bottom dead center). Upon pressing a start switch 10, causes power to be directed from the power source 30 to the motor 20 through the control circuit 40 for starting an operational cycle of the fastener driving device 3000. The operational cycle is the various operational phases involved in the operation of the fastener driving device 3000 for driving a single fastener into a substrate. The control circuit 40 may be any apparatus for connecting power to the motor 20 for the purpose of initiating an operational cycle of the fastener driving device 3000 and then removing the power to the motor 20 after the operational cycle of the fastener driving device 3000 has substantially completed.

The rotational motion of the crankshaft 3200 causes the first piston 220 to move linearly within the first cylinder 200 from the first position towards the second position. More specifically, the shaft of the motor 20 which is coupled to the gear reduction mechanism 50 transmits the rotational motion of the motor 20 to the gear reduction mechanism 50 that further transmitted to the crankshaft 3200 which is coupled to the gear reduction mechanism 50 about the second portion 3230. In the above mentioned condition the crankshaft 3200 rotates in the clockwise direction and the position of the crankshaft and connecting rod arrangement 3100 with respect to first piston 220 is clearly illustrated in the FIG. 15A. This movement of the piston causes the check valves 230 and 232 of the first piston 220 to open for intake of the gas into the gas chamber 250 thereby closing the central hollow portion 242 and the gas passageway 360. The first piston 220 starts moving from the first position towards the second position, such that, the gas chamber 250 of the first cylinder 200 is occupying air through the open check valves 230 and 232 disposed on the first piston 220.

Referring now to FIG. 16, illustrated is a longitudinal cross-sectional view of the fastener driving apparatus 2000, incorporating the crankshaft and connecting rod arrangement 3100 in the second position. The second position as used herein refers to the position of the first piston 220 at bottom dead center and away from the first cylinder end cap 240. In the above mentioned condition, the crankshaft 3200 (coupled to the connecting rod 3300) further rotates in clockwise direction, such that, the first piston 220 reaches the second position and the position of the crankshaft and connecting rod arrangement 3100 with respect to first piston 220 is clearly illustrated in the FIG. 16A. The movement of the first piston 220 towards the second position closes the check valves 230 and 232. The closing of the check valves 230 and 232 prevents any exit of gas from the gas chamber 250. The gas chamber 250 is now occupied with a volume of gas proportional to the amount of work to be done by the first piston 220 within the first cylinder 200. The gas used is the atmospheric air at atmospheric pressure which thereby simplifies the design of the fastener driving apparatus 3000, as using air greater than atmospheric pressure might otherwise require another pre-compressor to increase the pressure of the air inside the gas chamber 250.

Referring now to FIG. 17, illustrated is a longitudinal cross-sectional view of the fastener driving apparatus 3000, incorporating the crankshaft and connecting rod arrangement 3100 in an intermediate position, between the first position and the second position. More specifically, the further clockwise rotation of the crankshaft 3200 imparts movement to the connecting rod 3300, such that, the first piston 220 begins to move linearly from the second position to the intermediate position within the first cylinder 200. The position of the crankshaft and connecting rod arrangement 3100 with respect to first piston 220 is clearly illustrated in the FIG. 17A. At the intermediate position the air inside the gas chamber 250 of the first cylinder 200 is compressed with a linear forward motion of the first piston 220.

In the above mentioned condition, the check valves 230 and 232 are in the closed position, preventing any exit of gas from the gas chamber 250. Further, in the intermediate position the valve spool 320 is disposed in the central hollow portion 242 of the first cylinder end cap 240 in a manner such that the valve spool 320 closes the central hollow portion 242 and the gas passageway 360. The force offered by the compressed gas within the gas chamber 250 to the valve spool 320 is less than the force applied by valve return spring 350 on the valve spool 320. In such a position, the valve arrangement 300 is more specifically illustrated in FIG. 6, wherein the valve retainers 340 and the retention balls 344 are disposed at the chamfered portion 326 of the valve spool 320. Such positioning of the retention balls 344 applies pressure on the valve spool 320 and prevents the valve spool 320 to deviate from the position closing the central hollow portion 242 of the first cylinder end cap 240. The gas in the gas chamber 250 is held between the first piston 220 and the valve arrangement 300 until the valve arrangement 300 opens.

Referring to FIG. 18, illustrated is a longitudinal cross-sectional view of the fastener driving apparatus 3000, incorporating the crankshaft and connecting rod arrangement 3100 moving from the intermediate position towards the first position with a partially opened valve arrangement 300. The valve arrangement 300 opens either when the force offered by the compressed gas within the gas chamber 250 to the valve spool 320 has exceeded the force applied by valve return spring 350 on the valve spool 320 or when the first piston 220 strikes the valve spool stem 332 of the valve spool 320.

In the above mentioned condition, the valve arrangement 300 is partially opened with the force of the compressed gas within the gas chamber 250. More specifically, the further clockwise rotation of the crankshaft 3200 imparts movement to the connecting rod 3300 such that the first piston 220 begins to move linearly from the intermediated position towards the first position compressing the gas in the gas chamber 250 to an extent that the valve arrangement 300 opens. The position of the crankshaft and connecting rod arrangement 3100 with respect to first piston 220 is clearly illustrated in the FIG. 18A. In such a situation, the gas inside the gas chamber 250 pushes the valve spool 320 to move linearly inside the central groove 312 of the valve body 310 in a manner such that the valve spool 320 opens central hollow portion 242. The position of the valve arrangement in this situation may be more specifically referred to in FIG. 7, when the valve spool 320 opens the central hollow portion 242, the retention balls 344 cross a tipping point 370. The tipping point 370, as used herein, refers to a point of contact between the retention balls 344 and the valve spool 320, when the valve retainers 340 and the retention balls 344 provide minimal resistance to the linear movement of the valve spool 320, thereby resulting in an opening of the gas passageway 360.

After the tipping point 370, the valve retainers 340 only provide a frictional force to the valve spool 320. This frictional force is far less than the direct force afforded by the valve retainers 340 on the valve spool 320. In the embodiment shown, once the retention balls 344 ride up the chamfered portion 326 on the valve spool 320, the force from the retention balls 344 to maintain the valve spool 320 in its position changes from 45 degrees (or the angle of the chamfered portion 326) to 90 degrees, which is perpendicular to the movement of the valve spool 320. This essentially removes the retention balls 344 and the valve retainers 340 from retaining the valve spool 320, as the valve retainers 340 acting perpendicular to the valve spool movement and can no longer restrain the valve spool 320. The only force maintaining the valve spool 320 in the closed position is the force from the valve return spring 350. This is substantially less than the compressed gas pressure that is applied to a face of the valve spool 320, thus the valve spool 320 snaps open.

Further, this enables the compressed gas within the gas chamber 250 to be released into the second cylinder 400 through the valve arrangement 300 and, more specifically, through the gas passageway 360. The compressed gas reaching the second cylinder 400 starts expanding, thereby applying pressure on the front face 422 of the second piston 420 which causes the second piston 420 to move axially towards the anvil drive bumper 460. The anvil 430 accordingly moves axially into the fastener guide 530 for applying pressure on the fastener 500 disposed within the fastener guide 530. The fastener 500 further moves towards the substrate 600 when the anvil 430 applies pressure on the fastener 500. The axial movement of the second piston 420 towards the anvil drive bumper 460 compresses the anvil retracting mechanism 450 thereby storing energy into the anvil retracting mechanism 450.

Referring now to FIG. 19, illustrated is a longitudinal cross-sectional view of the fastener driving apparatus 3000, incorporating the crankshaft and connecting rod arrangement 3100 in the first position with a completely opened valve arrangement 300. In this conditioned, the first piston 220 continue to proceed towards the first cylinder end cap 240 thereby further compressing the gas in the gas chamber 250. This results in a further increase in the pressure in the gas chamber 250, causing the valve spool 320 to move further within the central groove 312 and completely open the gas passageway 360 of the valve arrangement 300. More specifically, the further clockwise rotation of the crankshaft 3200 imparts movement to the connecting rod 3300, such that, the first piston 220 reaches the first position by compressing the gas in the gas chamber 250 to an extent that the valve arrangement 300 completely opens.

The position of the crankshaft and connecting rod arrangement 3100 with respect to first piston 220 is clearly illustrated in the FIG. 19A, The complete opening of the valve arrangement 300 causes the maximum amount of compressed gas in the gas chamber 250 to be delivered to the second cylinder 400 through the gas passageway 360. The compressed gas in the second cylinder 400 expands therein and further applies pressure on the second piston 420 causing it to move axially further towards the anvil drive bumper 460. The anvil 430 further moves axially into the fastener guide 530 and applies pressure on the fastener 500 disposed from the fastener feeder 550 into the fastener guide 530. Due to the applied pressure by the anvil 430, the fastener 500 is punched into the substrate 600.

Once the crankshaft and connecting rod arrangement 3100 reaches the first position, the fastener driving apparatus 3000 almost completes the operational cycle in a single stroke. The single stroke compression enables in compressing the gas inside the gas chamber 250, such that, the compression exponent of the gas inside the gas chamber 250 is greater then 1. In the present embodiment, the fastener driving apparatus 3000 has an efficient design, such that, the single stoke operation is sufficiently short (in terms of time) to yield a compression exponent of approximately 1.1.

The fastener driving apparatus 3000 further comprises a plurality of sensors (not shown) that aides the control circuit 40 in knowing where exactly is the first piston 220 at certain points in the operational cycle. The sensors may be placed on the first piston 220, any gear or of the gear reduction mechanism 50 or on the valve arrangement 300. When the control circuit 40 picks up one of these sensors, the control circuit 40 knows the position of the first piston 220 within the first cylinder 200. In this embodiment, the various positions of the first piston 220 within the first cylinder 200 is determined with the help of the magnet 3500 disposed on the first piston 220 and the sensor 3600 disposed on the valve arrangement 300, such that, the control circuit 40 turns off the power source 30 when the first piston 220 reaches the first position.

Further, in the above mentioned conditioned the second piston 420 compresses the anvil retracting mechanism 450 thereby storing more energy into the anvil retracting mechanism 450. Furthermore, the excess energy from the second piston 420, the connector 440 and the anvil 430 is absorbed by the anvil drive bumper 460 disposed at the end of the second cylinder 400. The anvil drive bumper 460 absorbs the kinetic energy caused by the axial movement of the second piston 420, the connector 440 and the anvil 430 towards the anvil drive bumper 460 when the valve arrangement 300 is in fully opened conditioned. The anvil drive bumper 460 may be preferably made from an elastomer. Once the first piston 220 reaches the first position within the first cylinder 200 the fastener driving apparatus 3000 is ready for the next cycle of operation.

In yet another embodiment, the fastener driving apparatus 3000 may be coupled with a clutch (not shown). Generally the operation begins with the motor 20 starting to rotate, moving the crankshaft and connecting rod arrangement 3100, firing the valve arrangement 300 and then stopping. If a clutch is used, the motor 20 may be allowed to run continuously. For example, when a nosepiece (i.e., a fastener guide 530) of the fastener driving apparatus 3000 is positioned against the substrate 600, the motor 20 may be started. In this way, all the energy needed is in the motor 20 before being transferred to the crankshaft and connecting rod arrangement 3100. When the user pulls the start switch (trigger), this engages the clutch which in turn engages the crankshaft and connecting rod arrangement 3100. Because the motor 20 is not starting from a "dead stop," energy can be extracted right away and much more quickly.

Motors generally have the most power in the midrange of their operating range of revolutions per minute (RPMs). These motors deliver no power at the start (as they are not rotating yet) and are less efficient at lower RPMs than at higher RPMs. If the fastener driving apparatus 3000 is engaged in this fashion, the fastener driving apparatus 3000 has a much more responsive feel. For example, by using the fastener driving apparatus 3000 of the present invention, the time from a trigger pull to driving an 18 gage fastener may be reduced from about 100 milliseconds to about 50 milliseconds while creating a much more responsive tool feel to the professional user.

In yet another embodiment, the present the present invention provides a fastener driving apparatus capable of driving larger fasteners. The design of such a fastener driving apparatus generally requires a large amount of starting gas. To meet the requirement of the large amount of starting gas, the present invention incorporates a slider crank arrangement to stroke more than once in a first cylinder of the fastener driving apparatus for creating more compressed gas. For example, if a fastener such as a nail requires 14 cubic inch of gas compressed to a compression ratio of 8:1, then it would be advantageous to use the slider crank arrangement with the first cylinder volume slightly larger than half of the required volume and to stroke the slider crank arrangement twice.

To accomplish this, the first cylinder is to be configured having a primary gas chamber and a secondary gas chamber. The secondary gas chamber is in close proximity with the primary gas chamber, with the chambers being separated by a check valve. The primary gas chamber is used for accommodating the slider crank arrangement for compressing the gas within the primary gas chamber and the secondary gas chamber is used for storing the compressed gas of the primary gas chamber with a compression exponent greater than unity. The first cylinder is coupled to a second cylinder through a valve arrangement disposed between the first cylinder and the second cylinder. In one embodiment, the valve arrangement is cam driven valve which enables in communicating compressed gas between the first cylinder and the second cylinder upon compressing the gas in the first cylinder.

Referring to FIGS. 20-28, in another embodiment, a longitudinal cross-sectional view of a fastener driving apparatus 4000 incorporating a cam arrangement 4200 coupled to a slider crank arrangement 4100, is shown. The fastener driving apparatus 4000 comprises a switch 10; a motor 20; a power source 30; a control circuit 40; a gear reduction mechanism 50; a linear motion converter, for example a slider crank arrangement 4100; a first cylinder 200, a valve arrangement 4300 and a second cylinder 400. The fastener driving apparatus 4000 is capable of driving a fastener 500 into a substrate 600 by utilizing power of a gas compressed within the first cylinder 200. The compressed gas is communicated to the second cylinder 400 through the valve arrangement 4300 and enables the compressed gas to expand in the second cylinder 400 thereby applying pressure to the fastener 500 for driving the fastener 500 into the substrate 600.

When a user presses the start switch 10, power from the power source 30 is directed to the motor 20 through the control circuit 40 in a manner such that the motor 20 generates a rotational motion. The rotational motion generated by the motor 20 is communicated to the slider crank arrangement 4100, using the gear reduction mechanism 50. The gear reduction mechanism 50 comprises a plurality of gears (not shown) that transfers the rotational motion of a shaft (not shown) of the motor 20 to the slider crank arrangement 4100 which is further transferred to the cam arrangement 4200.

The slider crank arrangement 4100 comprises a crank wheel 4500 coupled to a crank link 4400 about a first end 132. The crank wheel 4500 is coupled to a worm gear 110 of the gear reduction mechanism 50 in a manner such that a rotational motion of the worm gear 110 is transferred into a rotational motion of the crank wheel 4500. The rotational motion of the crank wheel 4500 further imparts movement to the crank link 4400. The worm gear 110 receives the rotational motion from the motor 20 through the gear reduction mechanism 50. Further, the rotational motion of the crank wheel 4500 is transferred to the cam arrangement 4200 for operating the valve arrangement 4300.

The first cylinder 200 comprises a first cylinder guide 210 and a first piston 220 capable of reciprocally movable within the first cylinder 200. The first piston 220 is coupled to the crank link 4400 about a second end 134 of the crank link 4400 using a connector 136 in a manner such that the rotational motion of the worm gear 110 and the crank wheel 4500 is converted to a linear reciprocal motion of the first piston 220 within the first cylinder 200 using the crank link 4400. The first cylinder 200 further comprises a first cylinder end cap 240 disposed about a first end of the first cylinder 200. The first piston 220 defines a gas chamber within the first cylinder 200 and between the first cylinder end cap 240 and the first piston 220.

The gas chamber comprises a separator 4270 dividing the gas chamber into a primary gas chamber 4250 and a secondary gas chamber 4260. The primary gas chamber 4250 and the secondary gas chamber 4260 are capable of accommodating gas therein. The primary gas chamber 4250 is inline with the secondary gas chamber 4260 with the separator 4270 disposed between the primary gas chamber 4250 and the secondary gas chamber 4260. More specifically, the first piston 220 and the separator 4270 between the first cylinder guide 210 configures the primary gas chamber 4250; and the first cylinder end cap 240 and the separator 4270 between the first cylinder guide 210 configures the secondary gas chamber 4260. Furthermore, the first piston 220 is capable of reciprocally moving within the primary gas chamber 4250.

In an embodiment, the first cylinder 200 further comprises a first check valve 4230 disposed on the first piston 220 and a second check valve 4232 disposed on the separator 4270. The first check valve 4230 operates in a manner such that, when the first check valve 4230 is in an open position, the first check valve 4230 enables the entry of gas into the primary gas chamber 4250. Alternatively, when in a closed position, the first check valve 4230 prevents any exit of gas from the primary gas chamber 4250. The second check valve 4232 operates in a manner such that, when the pressure in the primary gas chamber 4250 exceeds the pressure of the secondary gas chamber 4260 the second check valve 4232 is in an open position enabling the entry of gas into the secondary gas chamber 4260 from the primary gas chamber 4250. Additionally, in a closed position, when the pressure of the secondary gas chamber 4260 exceeds the pressure of the primary gas chamber 4250, the second check valve 4232 prevents any exit of gas from the secondary gas chamber 4260 to the primary gas chamber 4250.

The first cylinder end cap 240 is coupled to the valve arrangement 4300. Referring to FIGS. 29-32, the valve arrangement 4300 is illustrated in detail. The first cylinder end cap 240 has a central hollow portion 242. The valve arrangement 4300 comprises a valve body 310 having a central groove 312 extending along a longitudinal axis X-X of the valve body 310. The central groove 312 conforms to the central hollow portion 242 of the first cylinder end cap 240 at the front end portion, while the rear end portion of the central groove 312 has a hole (not shown). A valve spool 320 is seated up against the valve body 310 within the central groove 312 along the longitudinal axis X-X and is capable of reciprocating linearly within the central groove 312. In one embodiment, the valve spool 320 has a cylindrical body having a stepped structure configured by a primary body portion 322 and a concentric secondary body portion 324.

The primary body portion 322 has a diameter greater than a diameter of the secondary body portion 324. The primary body portion 322 gradually extends into the secondary body portion 324 in a manner such that the graduation of the primary body portion 322 into the secondary body portion 324 configures a chamfered portion 326 there between (see FIG. 30). The valve spool 320 reciprocates within the central groove 312 of the valve body 310 along the longitudinal axis X-X. The valve spool 320 further has a front face portion 328, a rear face portion 330 and a valve spool stem 332 extending outwardly from the rear face portion 330 along a longitudinal axis of the valve spool 320. The valve spool stem 332 passes through the hole disposed on the rear end portion of the central groove 312 and couples to the cam arrangement 4200. In an initial closed position, the front face portion 328 of the valve spool 320 is positioned in the central hollow portion 242 of the first cylinder end cap 240 in a manner such that, the front face portion 328 closes the central hollow portion 242.

The valve arrangement 4300 further comprises a pair of valve retainers 340 positioned in an opposed relationship laterally along the central groove 312 of the valve body 310. In one embodiment, each valve retainer 340 is in the form of a cup 342 and retention ball 344. In the initial state, when the valve spool 320 is closing the central hollow portion 242 of the first cylinder end cap 240, the valve spool 320 is retained in such a position by the valve retainers 340. The valve retainers 340 are positioned in a manner such that the retention balls 344 are disposed at the chamfered portion 326 of the valve spool 320, thereby applying pressure on the valve spool 320 and preventing the valve spool 320 to deviate from the position closing the central hollow portion 242 of the first cylinder end cap 240.

Additionally, the valve arrangement 4300 comprises a valve return spring 350 disposed within the central groove 312 and towards the rear end portion of the central groove 312. The rear face portion 330 of the valve spool 320 is disposed on the valve return spring 350. The valve arrangement 4300 further comprises a gas passageway 360 configured from the central groove 312 of the valve arrangement 4300 and extends to the second cylinder 400. In the initial closed position, when the front face portion 328 of the valve spool 320 is disposed on the central hollow portion 242, the primary body portion 322 substantially closes the gas passageway 360. The gas passageway 360 is configured to define a duct for communicating the gas from the secondary gas chamber 4260 to the second cylinder 400 through the valve arrangement 4300 with the help of cam arrangement 4200.

The cam arrangement 4200 has a first end coupled to the crank wheel 4500 of the slider crank arrangement 4100 and a second end coupled to the valve spool stem 332 of the valve spool 320. The cam arrangement 4200 enables in linear reciprocal movement of the valve spool 320 within the central groove 312 in a manner such that, the cam arrangement 4200 enables the opening and closing of the valve arrangement 4300. The cam arrangement 4200 comprises a cam 4210 coupled to the crank wheel 4500. The cam 4210 is coupled to a plurality of cam links 4220 for transferring the movement of the cam 4210 to the valve spool stem 332.

More specifically, the cam 4210 is coupled to the slider crank arrangement 4100 in a manner, such that, the rotation of the cam 4210 is determined by the number of strokes of the first piston 220 used for compressing the gas in the primary gas chamber 4250. In the present embodiment, two strokes are used to compress the gas in the primary gas chamber 4250. Thus, the cam 4210 is allowed to make one revolution for every two revolutions of the crank wheel 4500 (i.e. two strokes of the slider crank arrangement 4100). The completion of one revolution of the cam 4210 pulls the valve spool stem 332 for linearly moving the valve spool 320 from the initial closed position to an open position and thereby opening the gas passageway 360, such that, the opening of the gas passageway 360 results in the communication of gas between the first cylinder 200 and the second cylinder 400.

The second cylinder 400 comprises a second cylinder guide 410 and a second piston 420 disposed there within. The second piston 420 has a front face 422 and a rear face 424. The rear face 424 of the second piston 420 is coupled to an anvil 430 using a connector 440. The anvil 430 extends along a longitudinal axis of the second cylinder 400 into a fastener guide 530. The anvil 430 is capable of linearly moving through the second cylinder 400 and the fastener guide 530. The fastener guide 530 is configured to receive a fastener 500 from a fastener feeder 550 and the linearly moving anvil 430 is capable of applying pressure to the fastener 500 in the fastener guide 530.

The second cylinder 400 further comprises an anvil retracting mechanism (return spring) 450 and an anvil drive bumper 460. The anvil drive bumper 460 is disposed at an end of the second cylinder 400 away from an end having the valve arrangement 4300. The anvil retracting mechanism 450 is coupled to the rear face 424 of the second piston 420 at one end and to the anvil drive bumper 460 at another end. In a situation when the second cylinder 400 has not received the compressed gas from the secondary gas chamber 4260, the second piston 420 is positioned towards the valve arrangement 4300 and the anvil retracting mechanism 450 is in a relaxed position i.e. the anvil retracting mechanism 450 is not compressed. Such a position is also referred to as the load-free position.

An operational cycle of the fastener driving apparatus 4000 may comprise a plurality of strokes of the first piston 220 within the primary gas chamber 4250. The plurality of strokes of the first piston 220 compresses the gas in the primary gas chamber 4250 and then the compressed gas is transferred to the secondary gas chamber 4260 through the second check valve 4232 and stored therein. The operation of the fastener driving apparatus 4000 mainly depends on a compression exponent of the compressed gas stored in the secondary gas chamber 4260.

Additionally, the compression exponent depends on the number of strokes of the first piston 220. The plurality of strokes lowers the compression exponent, since; the plurality of strokes takes more time due to the 180 degrees of the strokes that are used to replenish the gas in the primary gas chamber 4250 and with the passage of time the compressed gas stored in the secondary gas chamber 4260 cools, thereby resulting in decreasing the compression exponent of the compressed gas in the secondary gas chamber 4260. The compression exponent is related to the pressure and temperature of the compressed gas. For example, a given volume of gas with a compression exponent of 1.3 has a higher temperature than the same volume of air having a compression exponent of 1.2. The higher temperature and pressure enables in storing more energy in the compressed gas stored in the secondary gas chamber 4260.

The operational cycle of the fastener driving apparatus 4000 is the various operational stages involved in driving a single fastener 500 into the substrate 600. The present embodiment of the fastener driving apparatus 4000 is only beneficial if the gas in the secondary gas chamber 4260 remains compressed with an exponent greater than 1.0. The advantage of the present embodiment is lost if the compressed gas is allowed to cool and returning the compression exponent to 1.0 or less. Thereby, to maintain a compression exponent greater than 1.0, it is advantageous to limit the number of strokes of the slider crank arrangement 4100. It is preferred to keep the number of strokes of the first piston 220 to be less than 5.

In the present embodiment, the operational cycle of the fastener driving apparatus 4000 comprises two stokes of the first piston 220 in the primary gas chamber 4250. The two strokes of the first piston 220 involve a first stroke and a second stroke. The first stroke and the second stroke are responsible for compressing the gas in the primary gas chamber 4250 such that the compressed gas is communicated to the secondary gas chamber 4260 wherein the compression exponent of the gas in the secondary gas chamber is greater than 1.05. Further, the functioning of the fastener driving apparatus 4000 requires the compressed gas having the compression exponent greater than 1.05 to be transferred and stored in the secondary gas chamber 4260.

The first stroke comprises moving the first piston 220 from a first position towards a second position which enables in opening the first check valve 4232 for intake of gas into the primary gas chamber 4250 (the second check valve 4232 and the valve arrangement 4300 are in closed position); at the second position enabling the closure of the first check valve 4230 and storing gas within the primary gas chamber 4250; moving the first piston from the second position towards the first position and enabling compressing the gas in the primary gas chamber 4250; and upon substantially nearing the first position, enabling the second check valve 4232 to open causing the compressed gas in the primary gas chamber 4250 to be transferred to the secondary gas chamber 4260. As used herein the first position refers to the position of the first piston 220 within the first cylinder 200 near to the separator 4270 and the second position refers to the position of the first piston 220 near to the slider crank arrangement 4100 towards the bottom dead center of the first cylinder 200.

The second stroke comprises moving the first piston 220 from a first position towards a second position which enables in opening the first check valve 4232 for intake of gas into the primary gas chamber 4250 (the second check valve 4232 and the valve arrangement 4300 are in closed position); at the second position enabling the closure of the first check valve 4230 and storing gas within the primary gas chamber 4250; moving the first piston from the second position towards the first position and enabling compressing the gas in the primary gas chamber 4250; and upon substantially nearing the first position, enabling the second check valve 4232 to open causing the compressed gas in the primary gas chamber 4250 to be transferred to the secondary gas chamber 4260 and wherein the valve arrangement 4300 is opened to allow the compressed gas to expand in the second cylinder 400 thereby causing the second piston 420 to move and enable the anvil 430 to drive the fastener 500 into the substrate 600.

Referring to FIGS. 20-23, the first stroke of the fastener driving apparatus 4000 incorporating the cam arrangement 4200 and the slider crank arrangement 4100 is shown. In the first stroke, when the start switch 10 is switched ON, power is directed from the power source 30 to the motor 20 through the control circuit 40. The control circuit 40 may be any apparatus for connecting power to the motor 20 for the purpose of initiating the operational cycle of the fastener driving apparatus 4000 and then removing the power to the motor 20 after the operational cycle of the fastener driving apparatus 4000 has substantially completed.

Preferably, the gas used is the atmospheric air at atmospheric pressure thereby avoiding the usage of any pre-compressor for pressurizing the intake air. More specifically, referring to FIG. 20, a starting of the first stroke is shown, when the first piston 220 is moving from the first position to an intermediate position. Upon receiving power from the power source 30, the motor 20 directs the shaft (not shown) to rotate, transferring energy through the gear reduction 50 and worm gear 110 to the slider crank arrangement 4100 of the fastener driving apparatus 4000. More specifically, the worm gear 110 (coupled to crank wheel 4500) rotates the crank wheel 4500 such that the crank wheel 4500 starts rotating (either clockwise or counterclockwise), causing the first piston 220 to move linearly away from separator 4270 (from the first position) within the first cylinder 200.

At the start of the first stroke, the first check valve 4230 opens, causing atmospheric air to enter the primary gas chamber 4250. The intake of atmospheric air through the first check valve 4230 continues until the time the crank wheel 4500 has substantially completed 180 degrees of rotation and the crank link 4400 is once again horizontal. The volume of the gas in the primary gas chamber 4250 ranges from 6 to 9 cubic inches at standard temperature and pressure conditions and, more preferably, 7 cubic inches. Additionally, the crank wheel 4500 (coupled to the cam arrangement 4200) rotates the cam 4210 such that the cam arrangement 4200 enables opening and closing of the valve arrangement 4300. In the present embodiment, the cam 4210 is coupled to the crank wheel in a manner such that the two rotations of the crank wheel 4500 cause one rotation of the cam 4210. The completion of one rotation of the cam 2210 results in the opening of the valve arrangement 4300. The crank wheel 4500 rotates in a clockwise direction thereby rotating the cam 2210 in an anticlockwise direction.

Figure 21:
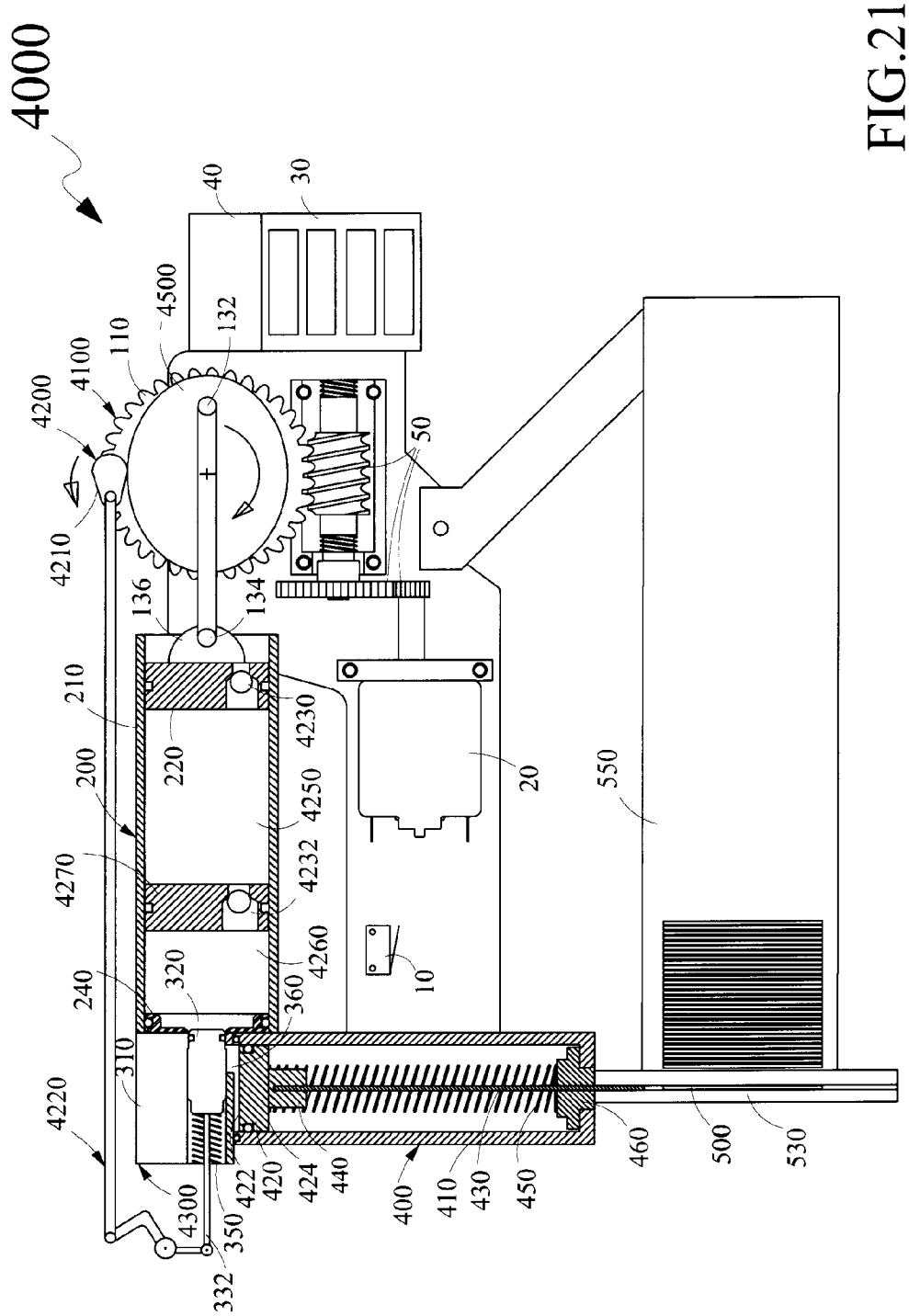

Referring to FIG. 21, the first piston 220 is shown in the second position (bottom dead center). In the second position, the crank link 4400 is horizontal and the first check valve 4230 is closed. The closing of the first check valve 4230 enables in accommodating the gas in the primary gas chamber 4250 and prevents any exit of gas from the primary gas chamber 4250. The further clockwise rotation of the crank wheel 4500 (about 90 degrees) rotates the cam 4210 (about 45 degrees) in the anticlockwise direction.

Figure 22:
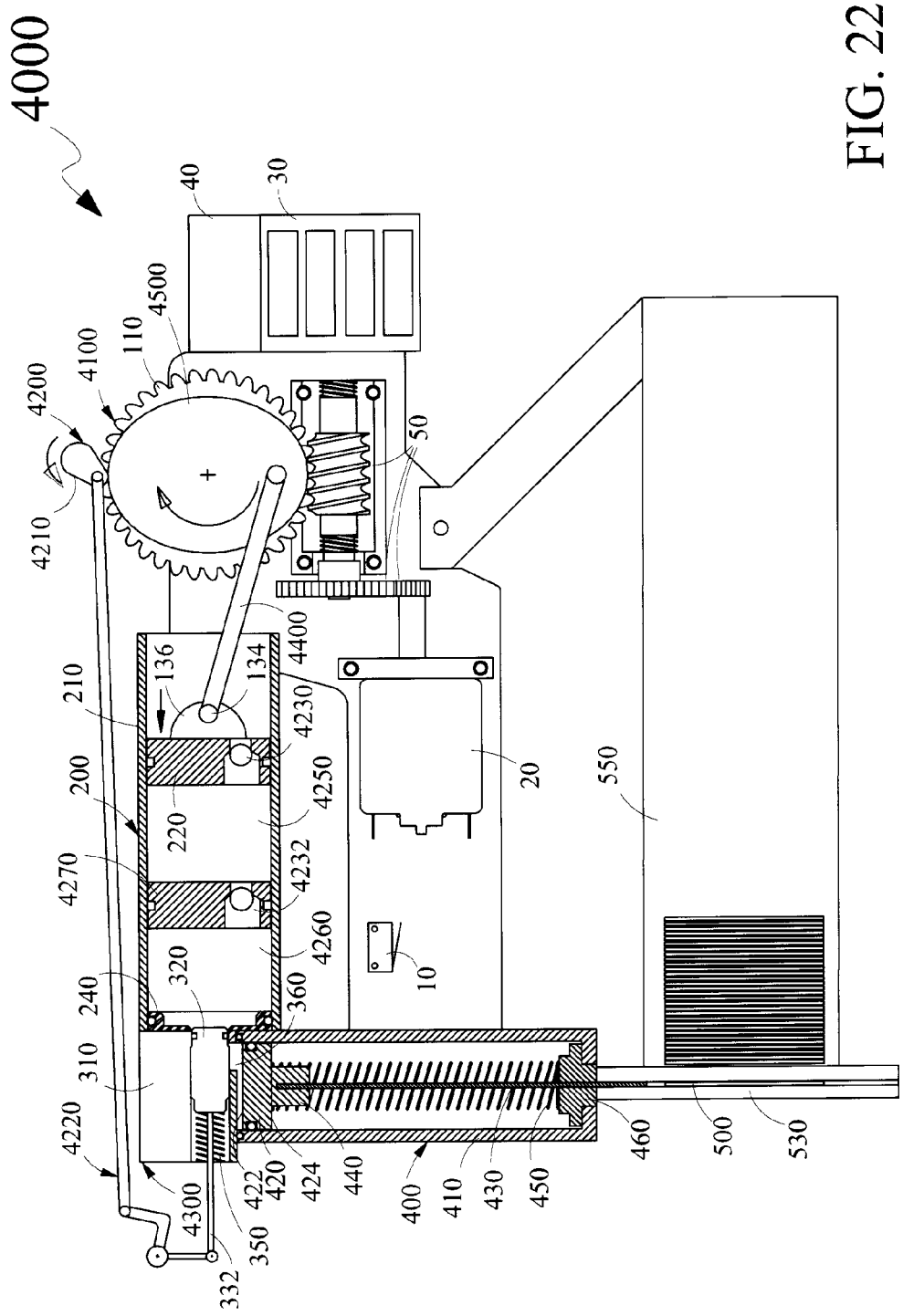

Referring to the FIG. 22, the first piston 220 is shown in the intermediate position. In the intermediate position, the first piston 220 with the closed first check valve 4230 compresses the gas in primary gas chamber 4250 such that the compression exponent of the compressed gas within the primary gas chamber 4250 reaches at least 1.05. The further clockwise rotation of the crank wheel 4500 rotates the cam 4210 in the anticlockwise direction.

Figure 23:
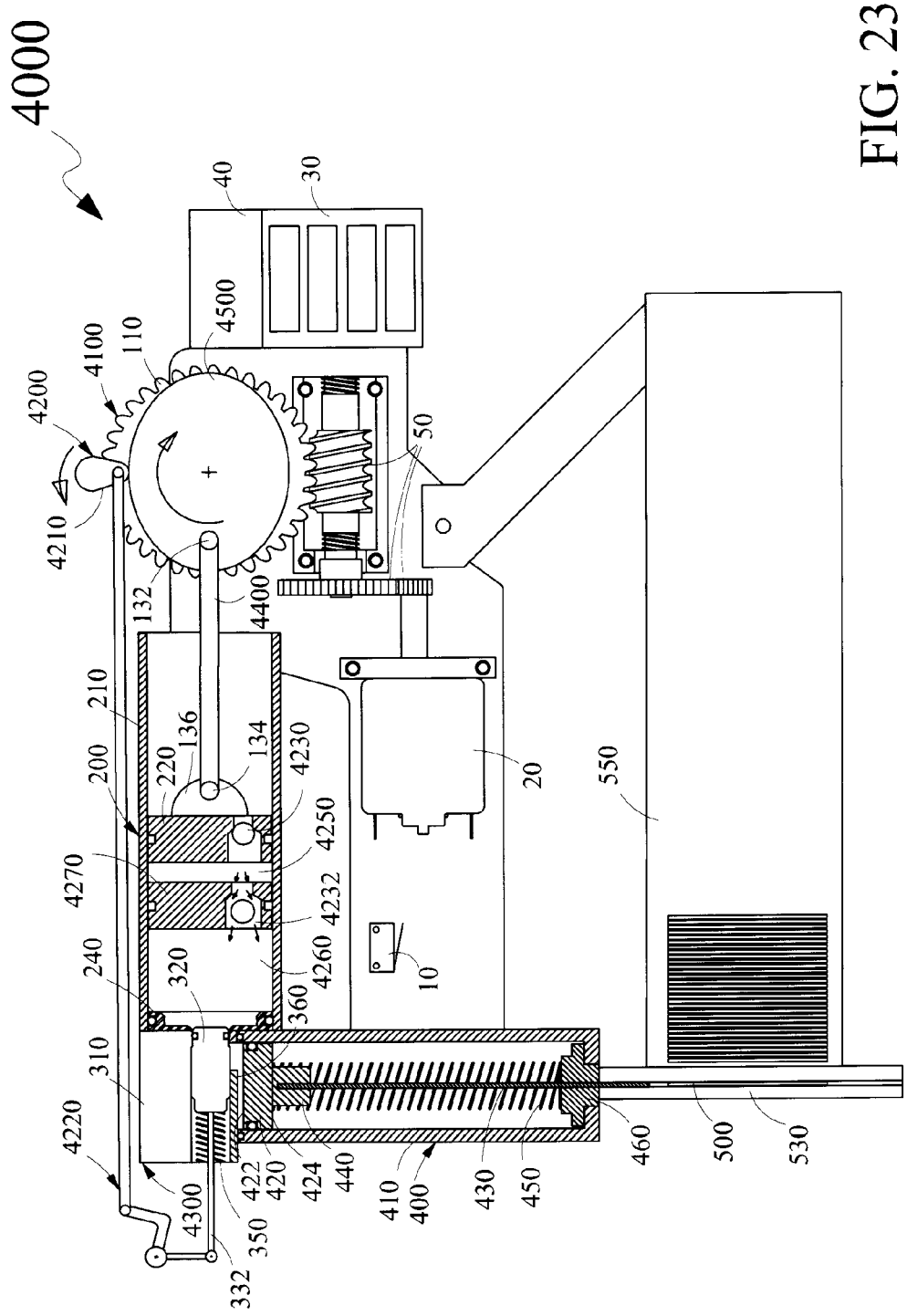
Figure 24:
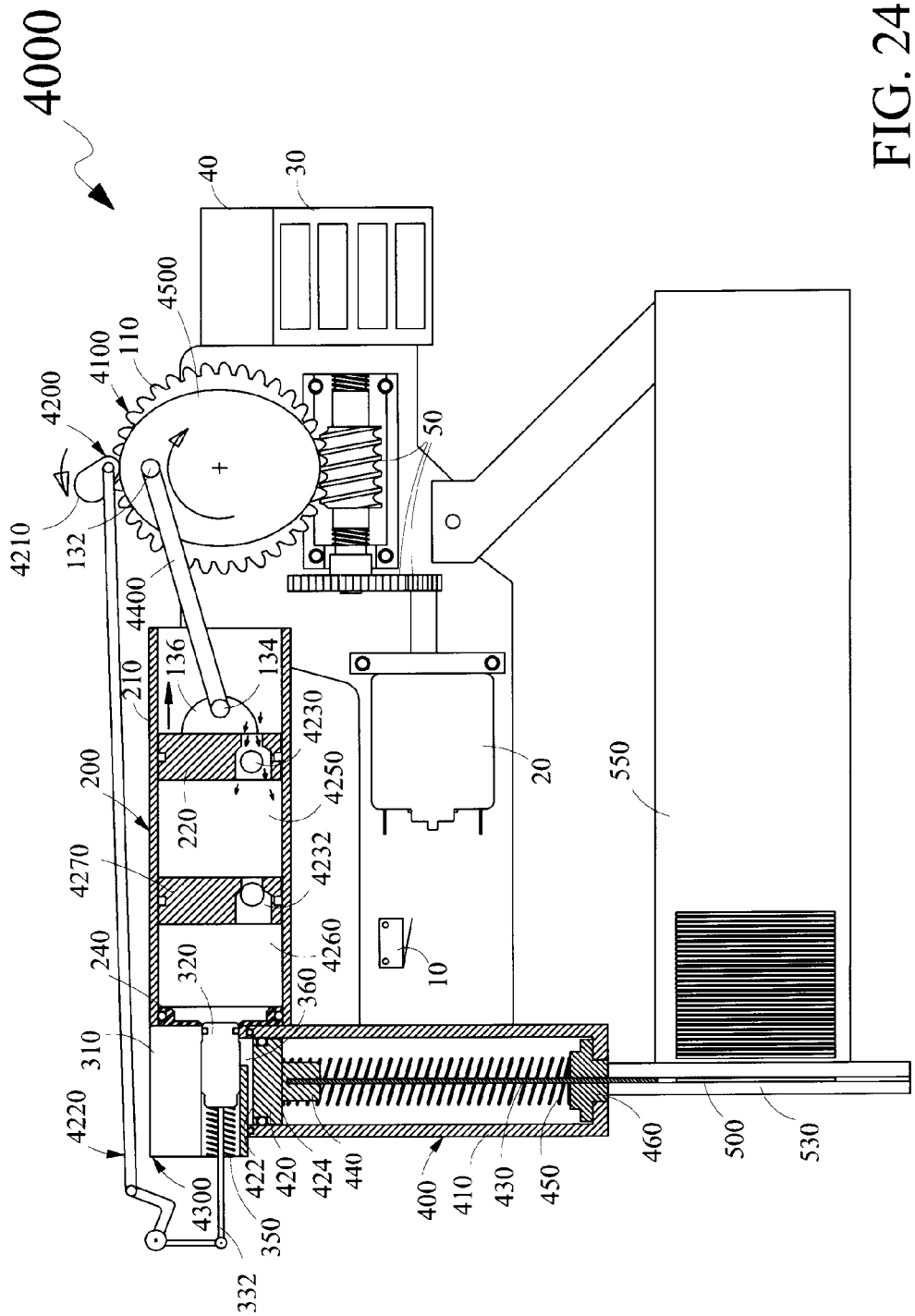

Referring to the FIG. 23, a completion of the first stroke is shown, when the first piston 220 is at first position. In the first position when the first piston 220 reaches near to the separator 4270, the first piston 220 compresses the gas in the primary gas chamber 4250 to an extent such that the second check valve 4232 of separator 4270 opens for receiving the compressed gas into the secondary gas chamber 4260. The compressed gas of the primary gas chamber 4250 has the compression exponent of greater than 1.05. Thereby, the compressed gas transferred to the secondary gas chamber 4260 also has the compression exponent of greater than 1.05. In the completion of the first stroke, the crank wheel 4500 completes one rotation (360 degrees) and the cam 4210 completes half a rotation (180 degrees).

Referring to FIGS. 24-28, the second stroke of the fastener driving apparatus 4000 incorporating the cam arrangement 4200 and slider crank arrangement 4100 is shown. More specifically, referring to FIG. 24, a starting of the second stroke is shown, when the first piston 220 is moving from the first position towards the second position. The starting of the second stroke enables in the opening of the first check valve 4230, at which moment the secondary valve causing atmospheric air to enter the primary gas chamber 4250. The intake of atmospheric air through the first check valve 4230 continues until the first piston 220 reaches the second position. The crank wheel 4500 further rotates in a clockwise direction and rotating the cam 4210 in an anticlockwise direction.

Figure 25:
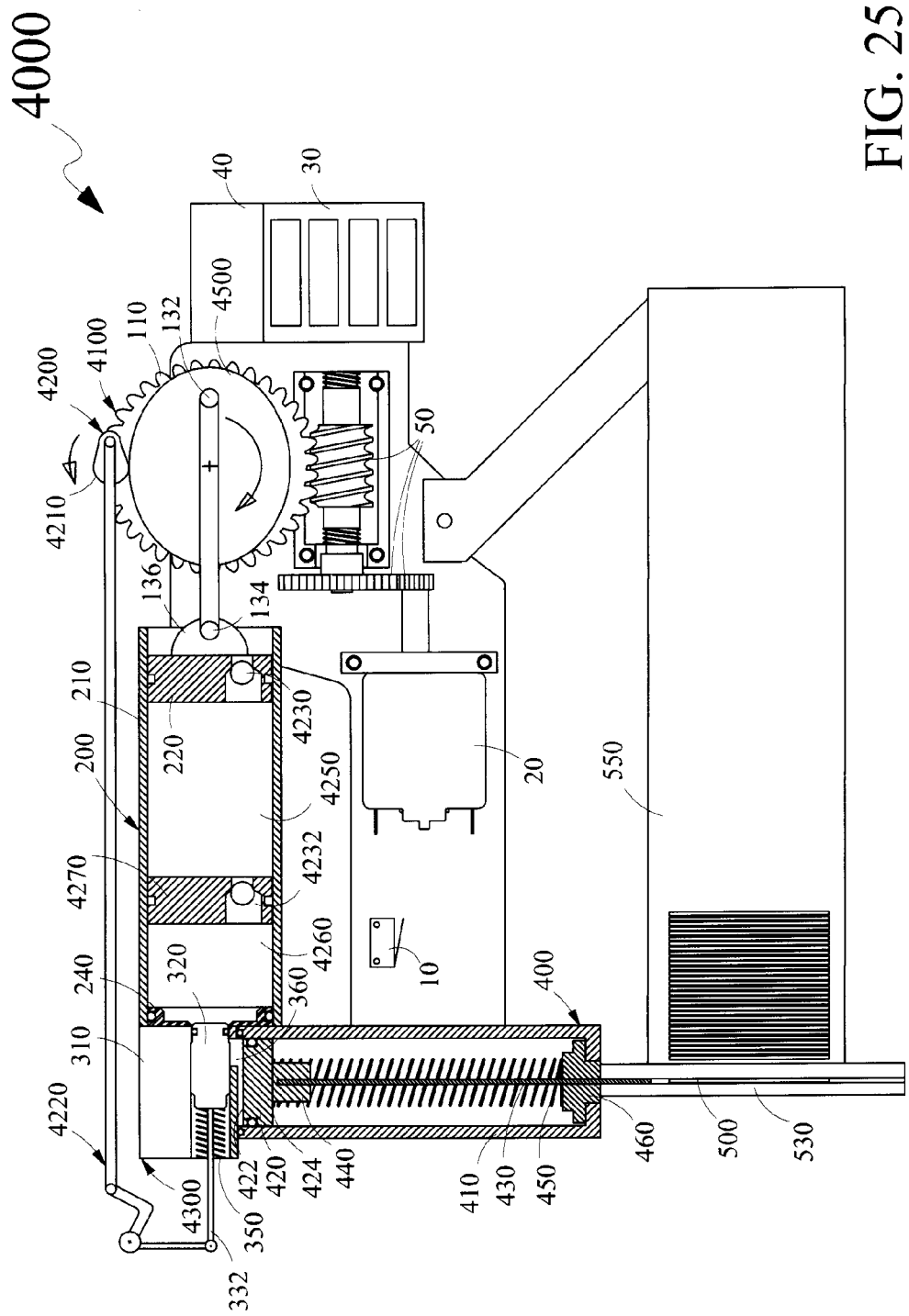

Referring to FIG. 25, the first piston 220 is shown in the second position (bottom dead center). In the second position, the crank link 4400 is horizontal and the first check valve 4230 is closed. The closing of the first check valve 4230 enables in accommodating the gas in the primary gas chamber 4250 and preventing any exit of gas from the primary gas chamber 4250. The further clockwise rotation of the crank wheel 4500 rotates the cam 4210 in the anticlockwise direction.

Figure 26:
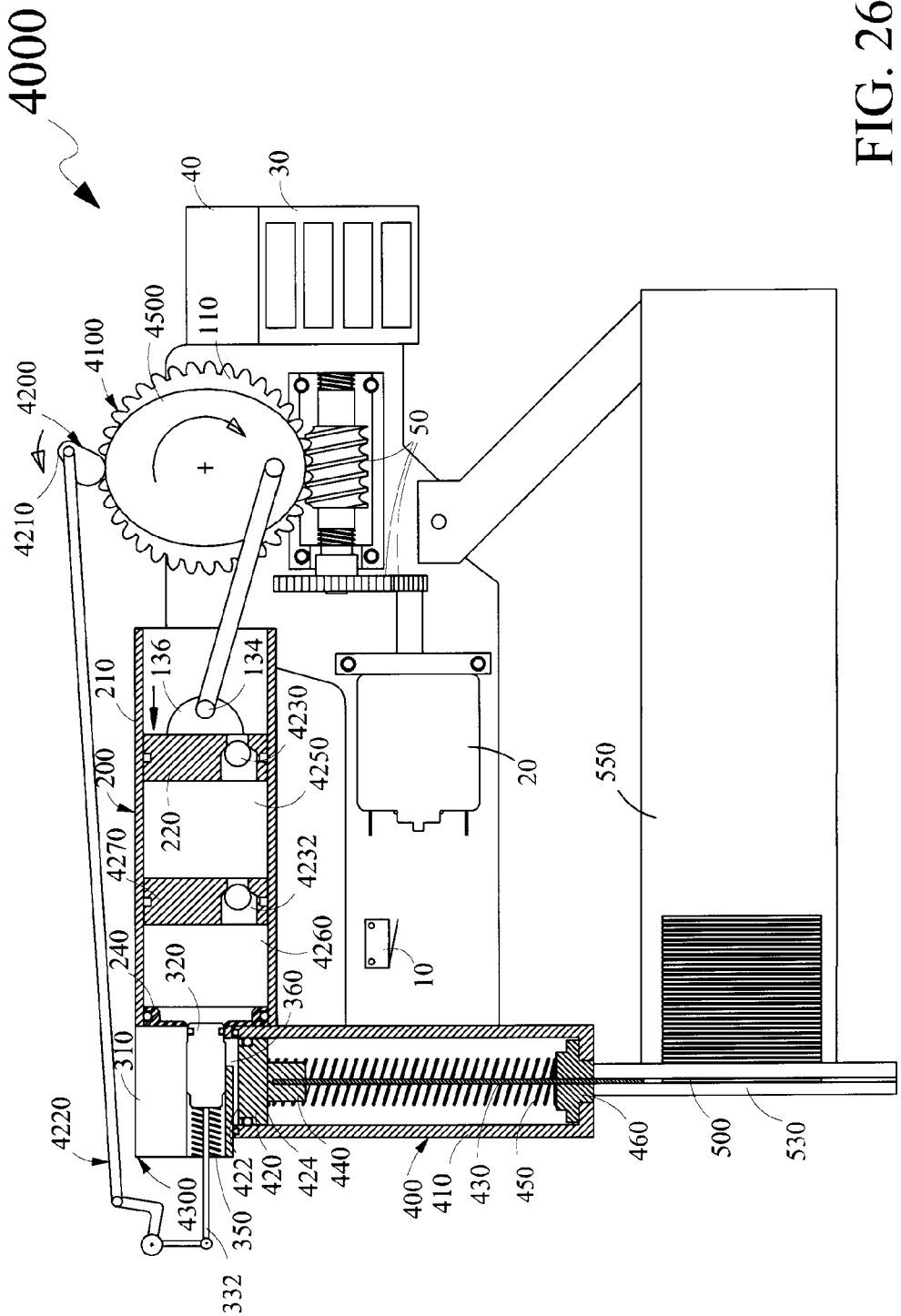

Referring to the FIG. 26, the first piston 220 is shown in an intermediate position. In the intermediate position, the first piston 220 with the closed first check valve 4230 compresses the gas in primary gas chamber 4250 such that the compression exponent of the compressed gas within the primary gas chamber 4250 reaches at least 1.05. The further clockwise rotation of the crank wheel 4500 rotates the cam 4210 in the anticlockwise direction.

Figure 27:
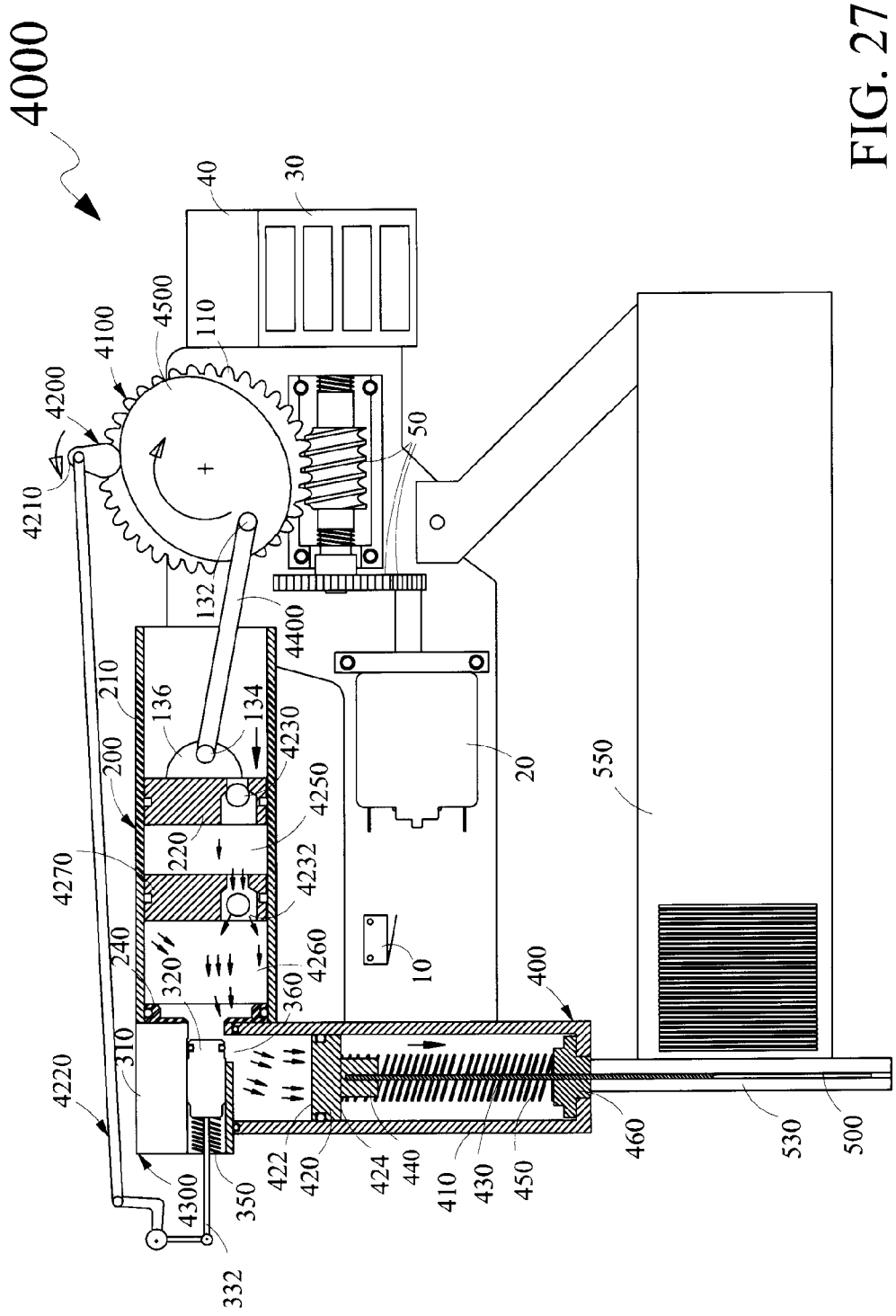

Referring to the FIG. 27, the first piston 220 is shown in an intermediate position near to the separator 4270 with a partial opening of the valve arrangement 4300. Towards the first position, when the first piston 220 reaches near to the separator 4270, the first piston 220 compresses the gas in the primary gas chamber 4250 to an extent such that the second check valve 4232 of the separator 4270 opens and the cam arrangement 4200 enables in partial opening of the valve arrangement 4300. In the intermediate position when the valve arrangement 4300 is in the partial opened state, the cam arrangement 4200 enables in opening the valve spool 320 of the valve arrangement 4300. In this condition, the crank wheel 4500 is about to complete two rotations (720 degrees) and the cam 4210 is about to complete a one rotation (360 degrees).

The valve arrangement 4300 opens either when the gas pressure inside the secondary gas chamber 4260 exceeds the maintaining force of the valve spool 320 or when valve arrangement 4300 is made to open by the cam arrangement 4200. In a preferred embodiment, the valve arrangement 4300 is referred to as a snap acting valve in which the valve spool has an opening speed of less then 20 milliseconds from initial cracking to greater than substantially 70 percent of full flow of the compressed gas. More specifically, the opening time of the valve spool 320, i.e. the time from being closed until the time the valve is at least 70 percent open, should be less than 20 milliseconds (0.020 seconds). The valve spool 320 needs to open fully and quickly such that the energy of expansion is not lost to the spool 320 and the valve retainers 340.

In the above mentioned condition, when the valve arrangement 4300 is partially opened, a further linear movement of the first piston 220 causes it to move towards the first position, i.e. towards the separator 4270. In such a situation, the plurality of links 4220 coupled to the cam arrangement 4200 pulls the valve spool stem 332 thereby causing the valve spool 320 to move linearly inside the central groove 312 of the valve body 310 in a manner such that, the valve spool 320 opens the central hollow portion 242 and substantially the gas passageway 360. The valve spool 320 opens the central hollow portion 242, and the retention balls 344 cross a tipping point 370, refer to FIG. 30. The tipping point 370, as used herein, refers to a point of contact between the retention balls 344 and the valve spool 320, when the valve retainers 340 and the retention balls 344 provide minimal resistance to the linear movement of the valve spool 320, thereby resulting in an opening of the gas passageway 360. At the tipping point 370, the retention balls 344 provide minimal resistance to the linear movement of the valve spool 320, thereby resulting in an opening of the gas passageway 360. This enables the compressed gas within the secondary gas chamber 4260 to be released into the second cylinder 400 through the valve arrangement 4300 and, more specifically, through the gas passageway 360.

The compressed gas reaching the second cylinder starts expanding, thereby applying pressure on the front face 422 of the second piston 420 which causes the second piston 420 to move axially towards the anvil drive bumper 460. The anvil 430 accordingly moves axially into the fastener guide 530. The anvil retracting mechanism 450 gets compressed thereby storing energy into the anvil retracting mechanism 450.

Figure 28:
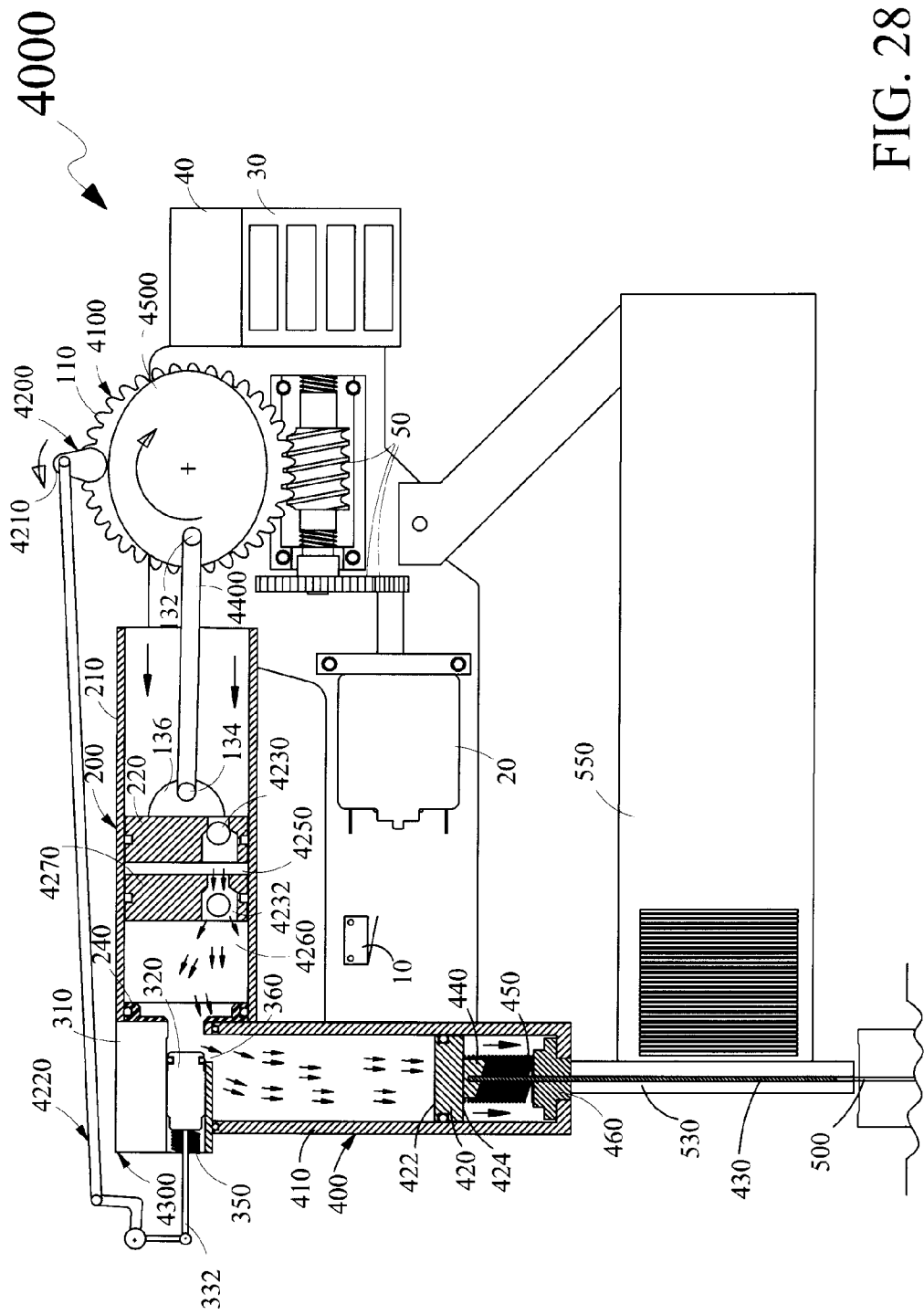

Referring to the FIG. 28, a completion of the second stroke is shown; when the first piston 220 is at first position with a complete opening of the valve arrangement 4300, (see FIG. 31). In the completion of the second stroke, the first piston 220 compresses the gas in the primary gas chamber 4250 to an extent, such that, the second check valve 4232 of separator 4270 remains open and the cam arrangement 4200 enables in complete opening of the valve arrangement 4300. In this condition, the crank wheel 4500 completes two rotations and the cam 4210 completes one rotation, thereby opening the valve arrangement 4300 completely.

Upon completion of the second stroke (i.e. the first piston 220 reaching the first position) a maximum amount of compressed gas is delivered to the second cylinder 400. The compressed gas in the second cylinder 400 expands therein and applies pressure on the second piston 420 causing it to move axially further towards the anvil drive bumper 460. The anvil 430 axially moves further into the fastener guide 530 and applies pressure on the fastener 500 disposed from the fastener feeder 550 into the fastener guide 530. Due to the applied pressure by the anvil 430, the fastener 500 is driven into the substrate 600, such that, the fastener driving device 4000 completes the operational cycle (the first stroke and the second stroke) of driving the single fastener 500 into the substrate 600.

In yet another embodiment, the fastener driving apparatus 4000 may be coupled with a clutch (not shown). Generally the operation begins with the motor 20 starting to rotate slider crank arrangement 4100, firing the valve arrangement 4300 and then stopping. If a clutch is used, the motor 20 may be allowed to run continuously. For example, when a nosepiece (i.e., a fastener guide 530) of the fastener driving apparatus 4000 is positioned against the substrate 600, the motor 20 may be started. In this way, all the energy needed is in the motor 20 before transferred to the slider crank arrangement 4100. When the user pulls the start switch (trigger), this engages the clutch which in turn engages the slider crank arrangement 4100. Because the motor is not starting from a "dead stop," energy can be extracted right away and much more quickly.

Motors generally have the most power in the midrange of their operating range of revolutions per minute (RPMs). These motors deliver no power at the start (as they are not rotating yet) and are less efficient at lower RPMs than at higher RPMs. If the fastener driving apparatus 4000 is engaged in this fashion, the fastener driving apparatus 4000 has a much more responsive feel. For example, by using the fastener driving apparatus 4000 of the present invention, the time from a trigger pull to driving an 18 gage fastener may be reduced from about 100 milliseconds to about 50 milliseconds while creating a much more responsive tool feel to the professional user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present invention.

We claim:

1. A fastener driving apparatus, comprising:
   a power source;
   a motor electrically connected to the power source;
   a first cylinder comprising
      a first piston reciprocally movable within the first cylinder, the first piston defining a gas chamber within the first cylinder, the gas chamber capable of accommodating gas therein;
      a first cylinder end cap configured at a first end of the first cylinder, the first cylinder end cap configuring the gas chamber between the cylinder guide, the first piston and the first cylinder end cap, the first cylinder end cap having a hollow portion,
   a slider crank arrangement driven by the motor, the slider crank arrangement operationally coupled to the first piston and configured to cause the first piston to reciprocally move within the first cylinder;
   a second cylinder comprising
      a cylinder guide,
      a second piston disposed within the cylinder guide, the second piston having a front face and a rear face, and
      an anvil coupled to the rear face of the second piston, wherein the second piston is capable of linearly moving within the cylinder guide, thereby enabling the anvil to move in a driving direction; and
   a valve arrangement operationally disposed between the first cylinder and the second cylinder, the valve arrangement defining a gas passageway for communicating the gas from the first cylinder to the second cylinder and the valve arrangement capable of assuming one of an open position and a closed position;
   wherein the gas received within the gas chamber is compressed by the first piston in a single stroke of the slider crank arrangement in a manner such that the compressed gas is communicated into the second cylinder through the gas passageway of the valve arrangement, causing the compressed gas to expand in the second cylinder thereby causing the second piston to move linearly and enabling the anvil to drive a fastener into a substrate in the driving direction in the single stroke of the slider crank arrangement.

2. The fastener driving apparatus of claim 1, wherein the slider crank arrangement is driven by the motor through a reduction mechanism.

3. The fastener driving apparatus of claim 1, wherein the first cylinder further comprises
   a cylinder guide configured to dispose the first piston there within,
   and
   a check valve, such that in an open position the check valve enables the entry of gas into the gas chamber and in a closed position prevents exit of gas from the gas chamber.

4. The fastener driving apparatus of claim 1, wherein the gas compressed by the first piston achieves a pressure consistent with a compression exponent equal to or greater than 1.05 before the valve opens.

5. The fastener driving apparatus of claim 1, wherein the valve arrangement comprises
   a valve body having a groove,
   a valve spool disposed within the groove, the valve spool having
      a front face portion,
      a rear face portion, and
      a valve spool stem extending outwardly from the front face portion,
   a valve return spring disposed within the groove and towards a rear end portion of the groove, and
   a gas passageway extending from the groove to the second cylinder, the gas passageway configuring a duct for communicating the gas from the gas chamber of the first cylinder to the second cylinder.

6. The fastener driving apparatus of claim 5, wherein the valve is mechanically tripped by a single stroke of the first piston by at least one of an electric motor, an electric signal, the first piston, and a cam.

7. The fastener driving apparatus of claim 5, wherein a closed position of the valve arrangement comprises
   the valve spool being disposed in the hollow portion of the first cylinder end cap,
   the valve spool stem extending into the gas chamber, and
   the valve spool closing the gas passageway.

8. The fastener driving apparatus of claim 5, wherein the volume of the gas passageway is less than 15% of the gas chamber volume in the first cylinder.

9. The fastener driving apparatus of claim 5, wherein the valve arrangement is a snap acting valve and the valve spool has an opening time of less than or equal to about 20 milliseconds for opening from the initial closed position to greater than or equal to about 70 percent of full flow of the compressed gas.

10. The fastener driving apparatus of claim 1, wherein the second cylinder further comprises
an anvil drive bumper configured at an end of the second cylinder away from an end coupling the valve arrangement, and
an anvil retracting mechanism configured to retract the second piston to an original position.

11. The fastener driving apparatus of claim 10, wherein the original position is the position of the second piston towards an end of the second cylinder coupling the valve arrangement, and wherein the anvil retracting mechanism is in a substantially relaxed state.

12. The fastener driving apparatus of claim 1, further comprising a clutch configured to allow the motor to run continuously and enables storing energy necessary to drive the fastener into the substrate in the motor before being transferred to the slider crank arrangement.

13. The fastener driving apparatus of claim 1, further comprising at least one sensor configured to sense and locate the positions of the first piston within the first cylinder during the single stroke of the slider crank arrangement.

14. A fastener driving apparatus comprising:
a power source;
a motor electrically connected to the power source;
a first cylinder comprising
a first piston reciprocally movable within the first cylinder, the first piston defining a gas chamber within the first cylinder, the gas chamber capable of accommodating gas therein;
a first cylinder end cap configured at a first end of the first cylinder, the first cylinder end cap configuring the gas chamber between the cylinder guide, the first piston and the first cylinder end cap, the first cylinder end cap having a hollow portion,
a linear motion converter driven by the motor, the linear motion converter operationally coupled to the first piston and configured to cause the first piston to reciprocally move within the first cylinder;
a second cylinder comprising
a cylinder guide,
a second piston disposed within the cylinder guide, the second piston having a front face and a rear face, and
an anvil coupled to the rear face of the second piston, wherein the second piston is capable of linearly moving within the cylinder guide, thereby enabling the anvil to move in a driving direction; and
a valve arrangement operationally disposed between the first cylinder and the second cylinder, the valve arrangement defining a gas passageway for communicating the gas from the first cylinder to the second cylinder and the valve arrangement capable of assuming one of an open position and a closed position;
wherein the gas received within the gas chamber is compressed by the first piston in a single stroke of the linear motion converter in a manner such that the compressed gas is communicated into the second cylinder through the gas passageway of the valve arrangement, causing the compressed gas to expand in the second cylinder thereby causing the second piston to move linearly and enabling the anvil to drive a fastener into a substrate in the driving direction in the single stroke of the linear motion converter.

15. The fastener driving apparatus of claim 14, wherein the linear motion converter is one of an eccentric, a cam, a rack and pinion arrangement, a slider crank, a four-bar linkage, and a lead screw.

16. The fastener driving apparatus of claim 15, wherein the linear motion converter is driven by the motor through a gear reduction mechanism.

17. The fastener driving apparatus of claim 14, wherein the first cylinder further comprises
a cylinder guide configured to dispose the first piston there within,
and
a check valve.

18. The fastener driving apparatus of claim 14, wherein the valve arrangement comprises
a valve body having a groove,
a valve spool disposed within the groove, the valve spool having
a front face portion,
a rear face portion, and
a valve spool stem extending outwardly from the front face portion,
a valve return spring disposed within the groove and towards a rear end portion of the groove, and
a gas passageway extending from the groove to the second cylinder, the gas passageway configuring a duct for communicating the gas from the gas chamber of the first cylinder to the second cylinder.

19. The fastener driving apparatus of claim 18, wherein the valve arrangement is disposed between the first cylinder and the second cylinder in a manner such that the valve spool is disposed in the hollow portion of the first cylinder end cap.

20. The fastener driving apparatus of claim 18, wherein a closed position of the valve arrangement comprises
the valve spool being disposed in the hollow portion of the first cylinder end cap,
the valve spool stem extending into the gas chamber, and
the valve spool closing the gas passageway.

21. The fastener driving apparatus of claim 18, wherein an open position of the valve arrangement comprises
the valve spool moving linearly within the groove in a manner such that the hollow portion of the first cylinder end cap and at least a portion of the gas passageway is open.

22. The fastener driving apparatus of claim 18, wherein the volume contained in the gas passageway is less than 15% of the first cylinder gas chamber volume.

23. The fastener driving apparatus of claim 14, wherein the second cylinder further comprises
an anvil drive bumper configured at an end of the second cylinder away from an end coupling the valve arrangement, and
an anvil retracting mechanism configured to retract the second piston to an original position.

24. The fastener driving apparatus of claim 23, wherein the original position is the position of the second piston towards the end of the second cylinder coupling the valve arrangement and the anvil retracting mechanism is in a substantially relaxed state.

25. The fastener driving apparatus of claim 14, wherein the valve arrangement is a snap acting valve and the valve spool has an opening time of less than or equal to about 20 milliseconds for opening from the initial closed position to greater than or equal to about 70 percent of full flow of the compressed gas.

26. The fastener driving apparatus of claim 14, further comprising a clutch configured to allow the motor to run continuously and enables storing energy necessary to drive the fastener into the substrate in the motor before being transferred to the linear motion converter arrangement.

27. The fastener driving apparatus of claim 14, further comprising
   at least one sensor configured to locate the position of the first piston and enabling the motor to be braked.

* * * * *